US011706000B2

(12) United States Patent
Sun et al.

(10) Patent No.: US 11,706,000 B2
(45) Date of Patent: Jul. 18, 2023

(54) TECHNIQUES FOR MANAGING SOUNDING REFERENCE SIGNAL (SRS) TRANSMISSIONS IN SHARED RADIO FREQUENCY SPECTRUM

(71) Applicant: QUALCOMM Incorporated, San Diego, CA (US)

(72) Inventors: Jing Sun, San Diego, CA (US); Xiaoxia Zhang, San Diego, CA (US); Kapil Bhattad, Bangalore (IN); Tanumay Datta, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 137 days.

(21) Appl. No.: 16/819,543

(22) Filed: Mar. 16, 2020

(65) Prior Publication Data
US 2020/0313816 A1 Oct. 1, 2020

(30) Foreign Application Priority Data
Mar. 29, 2019 (IN) .............................. 201921012552

(51) Int. Cl.
*H04L 5/00* (2006.01)
*H04W 74/08* (2009.01)
(Continued)

(52) U.S. Cl.
CPC ............ *H04L 5/0048* (2013.01); *H04L 5/001* (2013.01); *H04L 27/2607* (2013.01);
(Continued)

(58) Field of Classification Search
CPC ... H04L 5/0048; H04L 27/2607; H04L 5/001; H04L 27/26025; H04L 27/261;
(Continued)

(56) References Cited

U.S. PATENT DOCUMENTS

2019/0013909 A1 1/2019 Li et al.
2019/0132103 A1* 5/2019 Yang ................... H04W 72/042
2019/0215110 A1 7/2019 Yang et al.

FOREIGN PATENT DOCUMENTS

WO  WO-2017167304 A1  10/2017

OTHER PUBLICATIONS

M. Elsaadany, A. Ali and W. Hamouda, "Cellular LTE-A Technologies for the Future Internet-of-Things: Physical Layer Features and Challenges," in IEEE Communications Surveys & Tutorials, vol. 19, No. 4, pp. 2544-2572, Fourthquarter 2017, doi: 10.1109/COMST. 2017.2728013. (Year: 2017).*

(Continued)

*Primary Examiner* — Justin T Van Roie
(74) *Attorney, Agent, or Firm* — Dalei Dong; Holland & Hart LLP

(57) ABSTRACT

Methods, systems, and devices for wireless communications are described for managing sounding reference signal (SRS) transmissions in shared radio frequency spectrum. Described techniques provide for increased occasions at which a SRS may be transmitted, enhance likelihood of a successful listen-before-talk (LBT) procedure, or any combinations thereof. Increased occasions for SRS may be provided through multiple transmission times that are available in the event of an earlier LBT failure. Enhanced likelihood of successful LBT may be provided through one or more timing offsets that may be randomly selected from a set of available timing offsets, selection of a cyclic prefix length for a SRS based on whether the SRS transmission is within or outside of a channel occupancy time of a base station, providing an initial SRS transmission time for an initial periodic time interval, triggering of an aperiodic SRS within the channel occupancy time, or any combinations thereof.

26 Claims, 24 Drawing Sheets

(51) Int. Cl.
    *H04L 27/26* (2006.01)
    *H04W 72/0446* (2023.01)
    *H04W 16/14* (2009.01)
(52) U.S. Cl.
    CPC ....... *H04W 16/14* (2013.01); *H04W 72/0446* (2013.01); *H04W 74/0808* (2013.01)
(58) Field of Classification Search
    CPC .............. H04L 5/0051; H04L 5/0094; H04W 74/0808; H04W 72/0446; H04W 16/14
    See application file for complete search history.

(56) References Cited

OTHER PUBLICATIONS

H.-J. Kwon et al., "Licensed-Assisted Access to Unlicensed Spectrum in LTE Release 13," in IEEE Communications Magazine, vol. 55, No. 2, pp. 201-207, Feb. 2017, doi: 10.1109/MCOM.2016.1500698CM. (Year: 2017).*
Sony, "Summary of SRS", Jan. 2018, 3GPP Tsg Ran WG1 Ad Hoc-1801 Meeting R1-1801178 (Year: 2018).*
International Search Report and Written Opinion - PCT/US2020/023119 -Isa/Epo - 2020-06-08 (191996WO).

* cited by examiner

☒ SRS Configuration 215

▨ SRS 220

TECHNIQUES FOR MANAGING SOUNDING REFERENCE SIGNAL (SRS) TRANSMISSIONS IN SHARED RADIO FREQUENCY SPECTRUM

CROSS REFERENCE

The present application for patent claims the benefit of India Provisional Patent Application No. 201921012552 by SUN et al., entitled "P-SRS ENHANCEMENT FOR NR-U," filed Mar. 29, 2019, assigned to the assignee hereof, and expressly incorporated by reference herein.

FIELD OF THE DISCLOSURE

The following relates generally to wireless communications, and more specifically to techniques for managing sounding reference signal (SRS) transmissions in shared radio frequency spectrum.

DESCRIPTION OF RELATED ART

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some deployments, a base station may configure one or more UEs to transmit a sounding reference signal (SRS) using SRS resources, which may be used to measure signals transmitted by the UE and determine one or more channel metrics of the UE. Additionally, in some cases the UE and the base station may communicate using a shared radio frequency spectrum band (e.g., an unlicensed radio frequency spectrum band). A wireless device which wants to transmit on the shared radio frequency spectrum band may first perform a listen before talk (LBT) procedure, such as a clear channel assessment (CCA) procedure, before transmitting to determine whether any other wireless device is currently transmitting in the shared radio frequency spectrum band. If the shared radio frequency spectrum band is available, the wireless device may transmit after completing the LBT procedure. If unavailable, the wireless device may perform a subsequent LBT procedure at a later time before attempting to transmit on the shared radio frequency spectrum band. In cases where the base station configures SRS resources, a UE may perform a LBT procedure prior to SRS transmission. In the event that the LBT procedure does not pass, the UE refrains from transmitting the SRS until a successful LBT, which may result in inaccurate or out-of-date metrics at the base station regarding the UE channel quality. Thus, techniques to enhance likelihood of successful LBT and/or provide additional instances where an SRS may be transmitted may help to enhance network efficiency and capacity.

SUMMARY

The described techniques relate to improved methods, systems, devices, and apparatuses that support managing sounding reference signal (SRS) transmissions in shared radio frequency spectrum. In various aspects, the described techniques provide for increased occasions at which a SRS may be transmitted in the event of an unsuccessful listen-before-talk procedure, enhanced likelihood of successful LBT, or any combinations thereof. In some cases, a user equipment (UE) may be configured with an SRS configuration that provides a number of periodic time intervals during which SRS is to be transmitted. In some cases, a SRS transmission may start at a timing offset from a start of a periodic time interval (e.g., at an indicated slot offset in a SRS slot period), and one or more extra offset values may be provided that indicate available transmission times for SRS transmission in the event that one or more prior LBT procedures in a time interval failed. In some cases, one or more timing offsets may be randomly selected from a set of available timing offsets. In some cases, two or more UEs in a group of UEs may be configured to select a same timing offset from the set of available timing offsets.

Additionally or alternatively, an initial SRS transmission time for an initial periodic time interval may be provided to a UE with SRS configuration information. Further, in some cases, a cyclic prefix length for a SRS transmission may be selected from two or more available cyclic prefix lengths based on whether the SRS transmission is within or outside of a channel occupancy time of a base station. Additionally or alternatively, in some cases a base station may trigger an aperiodic SRS transmission, and the UE may skip a subsequent persistent of semi-persistent SRS configured by the SRS configuration based on the aperiodic SRS transmission (e.g., if the aperiodic SRS transmission was within a predetermined time threshold of the subsequent persistent or semi-persistent SRS).

A method of wireless communication at a UE is described. The method may include identifying a sounding reference signal configuration for transmission of one or more sounding reference signals to a base station, the sounding reference signal configuration providing periodic intervals for transmitting the one or more sounding reference signals, a first offset value from a starting time of each of the periodic intervals that indicates a first transmission time that is available for the one or more sounding reference signal transmissions, and at least a second offset value from the starting time of each of the periodic intervals or from the first transmission time that indicates a second transmission time within each of the periodic intervals that is available for transmitting the one or more sounding reference signals if a first listen-before-talk procedure for the first transmission time is unsuccessful, determining, based on the first listen-before-talk procedure for the first transmission time, that a wireless channel in a shared radio frequency spectrum band is unavailable for transmitting a first sounding reference signal at the first transmission time, and performing at least a second listen-before-talk procedure for at least the second transmission time to determine whether the wireless channel in the shared radio frequency spectrum band is available for transmitting the first sounding reference signal.

An apparatus for wireless communication at a UE is described. The apparatus may include a processor, memory in electronic communication with the processor, and instructions stored in the memory. The instructions may be executable by the processor to cause the apparatus to identify a sounding reference signal configuration for transmission of one or more sounding reference signals to a base station, the sounding reference signal configuration providing periodic intervals for transmitting the one or more sounding reference signals, a first offset value from a starting time of each of the periodic intervals that indicates a first transmission time that is available for the one or more sounding reference signal transmissions, and at least a second offset value from the starting time of each of the periodic intervals or from the first transmission time that indicates a second transmission time within each of the periodic intervals that is available for transmitting the one or more sounding reference signals if a first listen-before-talk procedure for the first transmission time is unsuccessful, determine, based on the first listen-before-talk procedure for the first transmission time, that a wireless channel in a shared radio frequency spectrum band is unavailable for transmitting a first sounding reference signal at the first transmission time, and perform at least a second listen-before-talk procedure for at least the second transmission time to determine whether the wireless channel in the shared radio frequency spectrum band is available for transmitting the first sounding reference signal.

Another apparatus for wireless communication at a UE is described. The apparatus may include means for identifying a sounding reference signal configuration for transmission of one or more sounding reference signals to a base station, the sounding reference signal configuration providing periodic intervals for transmitting the one or more sounding reference signals, a first offset value from a starting time of each of the periodic intervals that indicates a first transmission time that is available for the one or more sounding reference signal transmissions, and at least a second offset value from the starting time of each of the periodic intervals or from the first transmission time that indicates a second transmission time within each of the periodic intervals that is available for transmitting the one or more sounding reference signals if a first listen-before-talk procedure for the first transmission time is unsuccessful, determining, based on the first listen-before-talk procedure for the first transmission time, that a wireless channel in a shared radio frequency spectrum band is unavailable for transmitting a first sounding reference signal at the first transmission time, and performing at least a second listen-before-talk procedure for at least the second transmission time to determine whether the wireless channel in the shared radio frequency spectrum band is available for transmitting the first sounding reference signal.

A non-transitory computer-readable medium storing code for wireless communication at a UE is described. The code may include instructions executable by a processor to identify a sounding reference signal configuration for transmission of one or more sounding reference signals to a base station, the sounding reference signal configuration providing periodic intervals for transmitting the one or more sounding reference signals, a first offset value from a starting time of each of the periodic intervals that indicates a first transmission time that is available for the one or more sounding reference signal transmissions, and at least a second offset value from the starting time of each of the periodic intervals or from the first transmission time that indicates a second transmission time within each of the periodic intervals that is available for transmitting the one or more sounding reference signals if a first listen-before-talk procedure for the first transmission time is unsuccessful, determine, based on the first listen-before-talk procedure for the first transmission time, that a wireless channel in a shared radio frequency spectrum band is unavailable for transmitting a first sounding reference signal at the first transmission time, and perform at least a second listen-before-talk procedure for at least the second transmission time to determine whether the wireless channel in the shared radio frequency spectrum band is available for transmitting the first sounding reference signal.

Some examples of the method, apparatuses, and non-transitory computer-readable medium described herein may further include operations, features, means, or instructions for transmitting the first sounding reference signal at the second transmission time responsive to a successful second listen-before-talk procedure, or transmitting the first sounding reference signal at a third transmission time indicated by a third offset value responsive to an unsuccessful second listen-before-talk procedure.

In some examples of the method, apparatuses, and non-transitory computer-readable medium described herein, the identifying the sounding reference signal configuration further may include operations, features, means, or instructions for receiving a list of offsets from the base station that provides at least the second offset value and the third offset value, and where the second offset value and third offset value indicate time offsets relative to the first offset value.

In some examples of the method, apparatuses, and non-transitory computer-readable medium described herein, the periodic intervals correspond to sounding reference signal slot periods defined by a number of slots in each sounding reference signal slot period, where the first offset corresponds to a first number of slots from a starting slot of each sounding reference signal slot period, and where at least the second offset value corresponds to one or more additional slot offsets that identify additional slots within each of the sounding reference signal slot periods available for sounding reference signal transmissions.

In some examples of the method, apparatuses, and non-transitory computer-readable medium described herein, the sounding reference signal configuration may be received from the base station in radio resource control signaling.

In some examples of the method, apparatuses, and non-transitory computer-readable medium described herein, one of more of the first offset value or the second offset value may be determined based on a random selection from a set of available offset values.

A method of wireless communication at a UE is described. The method may include identifying a sounding reference signal configuration for transmission of a sounding reference signal to a base station, the sounding reference signal configuration providing periodic intervals for transmissions of the sounding reference signal, determining, as a random selection from a set of available offset values, a first offset value from a starting time of each of the periodic intervals, where the first offset value indicates a first transmission time within each of the periodic intervals that is available for transmissions of the sounding reference signal, and transmitting one or more sounding reference signals to the base station at the first transmission time within one or more of the periodic intervals based on the determining.

An apparatus for wireless communication at a UE is described. The apparatus may include a processor, memory in electronic communication with the processor, and instructions stored in the memory. The instructions may be executable by the processor to cause the apparatus to identify a sounding reference signal configuration for transmission of a sounding reference signal to a base station, the sounding reference signal configuration providing periodic intervals for transmissions of the sounding reference signal, determine, as a random selection from a set of available offset values, a first offset value from a starting time of each of the periodic intervals, where the first offset value indicates a first transmission time within each of the periodic intervals that is available for transmissions of the sounding reference signal, and transmit one or more sounding reference signals to the base station at the first transmission time within one or more of the periodic intervals based on the determining.

Another apparatus for wireless communication at a UE is described. The apparatus may include means for identifying a sounding reference signal configuration for transmission of a sounding reference signal to a base station, the sounding reference signal configuration providing periodic intervals for transmissions of the sounding reference signal, determining, as a random selection from a set of available offset values, a first offset value from a starting time of each of the periodic intervals, where the first offset value indicates a first transmission time within each of the periodic intervals that is available for transmissions of the sounding reference signal, and transmitting one or more sounding reference signals to the base station at the first transmission time within one or more of the periodic intervals based on the determining.

A non-transitory computer-readable medium storing code for wireless communication at a UE is described. The code may include instructions executable by a processor to identify a sounding reference signal configuration for transmission of a sounding reference signal to a base station, the sounding reference signal configuration providing periodic intervals for transmissions of the sounding reference signal, determine, as a random selection from a set of available offset values, a first offset value from a starting time of each of the periodic intervals, where the first offset value indicates a first transmission time within each of the periodic intervals that is available for transmissions of the sounding reference signal, and transmit one or more sounding reference signals to the base station at the first transmission time within one or more of the periodic intervals based on the determining.

In some examples of the method, apparatuses, and non-transitory computer-readable medium described herein, the determining the first offset value further may include operations, features, means, or instructions for identifying, as part of the sounding reference signal configuration, a seed value for use in randomly selecting the first offset value from the set of available offset values, and where the seed value determines which offset value of the set of available offset values will be determined in the random selection.

In some examples of the method, apparatuses, and non-transitory computer-readable medium described herein, the seed value may be received from the base station and may be a same seed value as may be provided to one or more other UEs in a group of UEs to provide that each UE in the group of UEs uses a same first offset value.

In some examples of the method, apparatuses, and non-transitory computer-readable medium described herein, the seed value may be determined based on one or more of a cell identification of the base station, a configured identification of the UE, a time index value, or any combinations thereof.

In some examples of the method, apparatuses, and non-transitory computer-readable medium described herein, the sounding reference signal configuration further provides at least a second offset value that may be added to the first offset value to determine at least a second transmission time within each of the periodic intervals that may be available for transmissions of the sounding reference signal if a first listen-before-talk procedure for the first transmission time may be unsuccessful.

In some examples of the method, apparatuses, and non-transitory computer-readable medium described herein, the sounding reference signal configuration further provides a frequency resource of a set of available frequency resources that may be available for sounding reference signal transmissions, and where at least one other UE transmits a concurrent sounding reference signal in a different frequency resource of the set of available frequency resources during the first transmission time.

A method of wireless communication at a UE is described. The method may include identifying a sounding reference signal configuration for transmission of a sounding reference signal to a base station, the sounding reference signal configuration providing periodic intervals for sounding reference signal transmissions, an offset value from a starting time of each of the periodic intervals that indicates one or more times during each periodic interval that are available for the sounding reference signal transmissions, and an initial offset value from a starting time of an initial periodic interval for transmitting an initial sounding reference signal from the UE, determining a first transmission time within the initial periodic interval for transmitting the initial sounding reference signal based on the initial offset value, and transmitting the initial sounding reference signal to the base station at the first transmission time responsive to a successful listen-before-talk procedure for the first transmission time.

An apparatus for wireless communication at a UE is described. The apparatus may include a processor, memory in electronic communication with the processor, and instructions stored in the memory. The instructions may be executable by the processor to cause the apparatus to identify a sounding reference signal configuration for transmission of a sounding reference signal to a base station, the sounding reference signal configuration providing periodic intervals for sounding reference signal transmissions, an offset value from a starting time of each of the periodic intervals that indicates one or more times during each periodic interval that are available for the sounding reference signal transmissions, and an initial offset value from a starting time of an initial periodic interval for transmitting an initial sounding reference signal from the UE, determine a first transmission time within the initial periodic interval for transmitting the initial sounding reference signal based on the initial offset value, and transmit the initial sounding reference signal to the base station at the first transmission time responsive to a successful listen-before-talk procedure for the first transmission time.

Another apparatus for wireless communication at a UE is described. The apparatus may include means for identifying a sounding reference signal configuration for transmission of a sounding reference signal to a base station, the sounding reference signal configuration providing periodic intervals for sounding reference signal transmissions, an offset value from a starting time of each of the periodic intervals that indicates one or more times during each periodic interval that are available for the sounding reference signal transmissions, and an initial offset value from a starting time of an initial periodic interval for transmitting an initial sounding reference signal from the UE, determining a first transmission time within the initial periodic interval for transmitting the initial sounding reference signal based on the initial offset value, and transmitting the initial sounding reference signal to the base station at the first transmission time responsive to a successful listen-before-talk procedure for the first transmission time.

A non-transitory computer-readable medium storing code for wireless communication at a UE is described. The code may include instructions executable by a processor to identify a sounding reference signal configuration for transmission of a sounding reference signal to a base station, the sounding reference signal configuration providing periodic intervals for sounding reference signal transmissions, an offset value from a starting time of each of the periodic intervals that indicates one or more times during each periodic interval that are available for the sounding reference signal transmissions, and an initial offset value from a starting time of an initial periodic interval for transmitting an initial sounding reference signal from the UE, determine a first transmission time within the initial periodic interval for transmitting the initial sounding reference signal based on the initial offset value, and transmit the initial sounding reference signal to the base station at the first transmission time responsive to a successful listen-before-talk procedure for the first transmission time.

In some examples of the method, apparatuses, and non-transitory computer-readable medium described herein, the identifying the sounding reference signal configuration further may include operations, features, means, or instructions for receiving the sounding reference signal configuration from the base station in radio resource control signaling.

Some examples of the method, apparatuses, and non-transitory computer-readable medium described herein may further include operations, features, means, or instructions for receiving, from the base station, downlink control information that indicates allocated resources for one or more of an uplink shared channel transmission, an uplink control channel transmission, or any combinations thereof, and where a starting time of the allocated resources may be aligned with the first transmission time.

In some examples of the method, apparatuses, and non-transitory computer-readable medium described herein, the listen-before-talk procedure applies to each of the initial sounding reference signal and uplink communications using the allocated resources.

A method of wireless communication at a UE is described. The method may include identifying a sounding reference signal configuration for sounding reference signal transmissions to a base station, the sounding reference signal configuration providing periodic intervals for the sounding reference signal transmissions, a first cyclic prefix length for the sounding reference signal transmissions that are within a channel occupancy time of the base station, and a second cyclic prefix length for the sounding reference signal transmissions that are outside of the channel occupancy time of the base station, determining a first transmission time for transmitting a first sounding reference signal based on the sounding reference signal configuration, determining, based on the sounding reference signal configuration, to use the first cyclic prefix length for the first sounding reference signal based on the first transmission time being within the channel occupancy time of the base station, or to use the second cyclic prefix length for the first sounding reference signal based on the first transmission time being outside of the channel occupancy time of the base station, and transmitting the first sounding reference signal to the base station using the determined first cyclic prefix length or second cyclic prefix length responsive to a successful listen-before-talk procedure associated with the first transmission time.

An apparatus for wireless communication at a UE is described. The apparatus may include a processor, memory in electronic communication with the processor, and instructions stored in the memory. The instructions may be executable by the processor to cause the apparatus to identify a sounding reference signal configuration for sounding reference signal transmissions to a base station, the sounding reference signal configuration providing periodic intervals for the sounding reference signal transmissions, a first cyclic prefix length for the sounding reference signal transmissions that are within a channel occupancy time of the base station, and a second cyclic prefix length for the sounding reference signal transmissions that are outside of the channel occupancy time of the base station, determine a first transmission time for transmitting a first sounding reference signal based on the sounding reference signal configuration, determine, based on the sounding reference signal configuration, to use the first cyclic prefix length for the first sounding reference signal based on the first transmission time being within the channel occupancy time of the base station, or to use the second cyclic prefix length for the first sounding reference signal based on the first transmission time being outside of the channel occupancy time of the base station, and transmit the first sounding reference signal to the base station using the determined first cyclic prefix length or second cyclic prefix length responsive to a successful listen-before-talk procedure associated with the first transmission time.

Another apparatus for wireless communication at a UE is described. The apparatus may include means for identifying a sounding reference signal configuration for sounding reference signal transmissions to a base station, the sounding reference signal configuration providing periodic intervals for the sounding reference signal transmissions, a first cyclic prefix length for the sounding reference signal transmissions that are within a channel occupancy time of the base station, and a second cyclic prefix length for the sounding reference signal transmissions that are outside of the channel occupancy time of the base station, determining a first transmission time for transmitting a first sounding reference signal based on the sounding reference signal configuration, determining, based on the sounding reference signal configuration, to use the first cyclic prefix length for the first sounding reference signal based on the first transmission time being within the channel occupancy time of the base station, or to use the second cyclic prefix length for the first sounding reference signal based on the first transmission time being outside of the channel occupancy time of the base station, and transmitting the first sounding reference signal to the base station using the determined first cyclic prefix length or second cyclic prefix length responsive to a successful listen-before-talk procedure associated with the first transmission time.

A non-transitory computer-readable medium storing code for wireless communication at a UE is described. The code may include instructions executable by a processor to identify a sounding reference signal configuration for sounding reference signal transmissions to a base station, the sounding reference signal configuration providing periodic intervals for the sounding reference signal transmissions, a first cyclic prefix length for the sounding reference signal transmissions that are within a channel occupancy time of the base station, and a second cyclic prefix length for the sounding reference signal transmissions that are outside of the channel occupancy time of the base station, determine a first transmission time for transmitting a first sounding reference signal based on the sounding reference signal configuration, determine, based on the sounding reference signal configuration, to use the first cyclic prefix length for the first sounding reference signal based on the first transmission time being within the channel occupancy time of the base station, or to use the second cyclic prefix length for the first sounding reference signal based on the first transmission time being outside of the channel occupancy time of the base station, and transmit the first sounding reference signal to the base station using the determined first cyclic prefix length or second cyclic prefix length responsive to a successful listen-before-talk procedure associated with the first transmission time.

In some examples of the method, apparatuses, and non-transitory computer-readable medium described herein, the second cyclic prefix length may be shorter than the first cyclic prefix length.

In some examples of the method, apparatuses, and non-transitory computer-readable medium described herein, a first listen-before-talk procedure may be used for transmitting the first sounding reference signal when the first transmission time may be within the channel occupancy time of the base station, and a second listen-before-talk procedure may be used for transmitting the first sounding reference signal when the first transmission time may be outside of the channel occupancy time of the base station, and where the first listen-before-talk procedure may be shorter than the second listen-before-talk procedure.

In some examples of the method, apparatuses, and non-transitory computer-readable medium described herein, the first cyclic prefix length may be determined based on a first difference between a duration of one or more symbols allocated to provide a first gap in communications before transmitting the first sounding reference signal and a maximum first listen-before-talk procedure duration, and where the second cyclic prefix length may be determined based on a second difference between a duration of a number of symbols allocated to provide a second gap in communications before transmitting the first sounding reference signal and a maximum second listen-before-talk procedure duration.

In some examples of the method, apparatuses, and non-transitory computer-readable medium described herein, the first listen-before-talk procedure may be a one-shot listen-before-talk procedure, and the second listen-before-talk procedure may be a category 4 listen-before-talk procedure.

A method of wireless communication at a UE is described. The method may include identifying a persistent or semi-persistent sounding reference signal configuration for sounding reference signal transmissions to a base station, the persistent or semi-persistent sounding reference signal configuration providing periodic intervals for persistent or semi-persistent sounding reference signal transmissions, transmitting an aperiodic sounding reference signal to the base station based on a trigger for the aperiodic sounding reference signal, determining a first transmission time for transmitting a first persistent or semi-persistent sounding reference signal based on the persistent or semi-persistent sounding reference signal configuration, and skipping the transmitting of the first persistent or semi-persistent sounding reference signal during the first transmission time based on the transmission of the aperiodic sounding reference signal.

An apparatus for wireless communication at a UE is described. The apparatus may include a processor, memory in electronic communication with the processor, and instructions stored in the memory. The instructions may be executable by the processor to cause the apparatus to identify a persistent or semi-persistent sounding reference signal configuration for sounding reference signal transmissions to a base station, the persistent or semi-persistent sounding reference signal configuration providing periodic intervals for persistent or semi-persistent sounding reference signal transmissions, transmit an aperiodic sounding reference signal to the base station based on a trigger for the aperiodic sounding reference signal, determine a first transmission time for transmitting a first persistent or semi-persistent sounding reference signal based on the persistent or semi-persistent sounding reference signal configuration, and skip the transmitting of the first persistent or semi-persistent sounding reference signal during the first transmission time based on the transmission of the aperiodic sounding reference signal.

Another apparatus for wireless communication at a UE is described. The apparatus may include means for identifying a persistent or semi-persistent sounding reference signal configuration for sounding reference signal transmissions to a base station, the persistent or semi-persistent sounding reference signal configuration providing periodic intervals for persistent or semi-persistent sounding reference signal transmissions, transmitting an aperiodic sounding reference signal to the base station based on a trigger for the aperiodic sounding reference signal, determining a first transmission time for transmitting a first persistent or semi-persistent sounding reference signal based on the persistent or semi-persistent sounding reference signal configuration, and skipping the transmitting of the first persistent or semi-persistent sounding reference signal during the first transmission time based on the transmission of the aperiodic sounding reference signal.

A non-transitory computer-readable medium storing code for wireless communication at a UE is described. The code may include instructions executable by a processor to identify a persistent or semi-persistent sounding reference signal configuration for sounding reference signal transmissions to a base station, the persistent or semi-persistent sounding reference signal configuration providing periodic intervals for persistent or semi-persistent sounding reference signal transmissions, transmit an aperiodic sounding reference signal to the base station based on a trigger for the aperiodic sounding reference signal, determine a first transmission time for transmitting a first persistent or semi-persistent sounding reference signal based on the persistent or semi-persistent sounding reference signal configuration, and skip the transmitting of the first persistent or semi-persistent sounding reference signal during the first transmission time based on the transmission of the aperiodic sounding reference signal.

In some examples of the method, apparatuses, and non-transitory computer-readable medium described herein, the persistent or semi-persistent sounding reference signal configuration further provides an aperiodic sounding reference signal resource set index, and where the skipping the transmitting of the first persistent or semi-persistent sounding reference signal may be based on the aperiodic sounding reference signal being transmitted using resources identified in the aperiodic sounding reference signal resource set index.

In some examples of the method, apparatuses, and non-transitory computer-readable medium described herein, the persistent or semi-persistent sounding reference signal configuration further provides an aperiodic sounding reference signal widow, and where the skipping the transmitting of the first persistent or semi-persistent sounding reference signal may be based on the aperiodic sounding reference signal being transmitted within the aperiodic sounding reference signal widow in advance of the first transmission time.

In some examples of the method, apparatuses, and non-transitory computer-readable medium described herein, the aperiodic sounding reference signal widow corresponds to a predetermined number of slots ahead of a first slot associated with the first transmission time.

In some examples of the method, apparatuses, and non-transitory computer-readable medium described herein, the aperiodic sounding reference signal may be within a channel occupancy time of the base station for a shared radio frequency spectrum band, and the first transmission time may be outside of the channel occupancy time of the base station for the shared radio frequency spectrum band.

A method of wireless communication at a base station is described. The method may include identifying a sounding reference signal configuration for receiving one or more sounding reference signals from a UE, the sounding reference signal configuration providing periodic intervals for sounding reference signal transmissions, a first offset value from a starting time of each periodic interval that indicates a first transmission time within each periodic interval that is available for the sounding reference signal transmissions, and at least a second offset value from the starting time of each of the periodic intervals or from the first transmission time that indicates a second transmission time within each periodic interval that is available for sounding reference signal transmissions if a first listen-before-talk procedure for the first transmission time is unsuccessful, monitoring the first transmission time for a first sounding reference signal from the UE, and monitoring, responsive to the first sounding reference signal being undetected during the first transmission time, at least the second transmission time for the first sounding reference signal from the UE.

An apparatus for wireless communication at a base station is described. The apparatus may include a processor, memory in electronic communication with the processor, and instructions stored in the memory. The instructions may be executable by the processor to cause the apparatus to identify a sounding reference signal configuration for receiving one or more sounding reference signals from a UE, the sounding reference signal configuration providing periodic intervals for sounding reference signal transmissions, a first offset value from a starting time of each periodic interval that indicates a first transmission time within each periodic interval that is available for the sounding reference signal transmissions, and at least a second offset value from the starting time of each of the periodic intervals or from the first transmission time that indicates a second transmission time within each periodic interval that is available for sounding reference signal transmissions if a first listen-before-talk procedure for the first transmission time is unsuccessful, monitor the first transmission time for a first sounding reference signal from the UE, and monitor, responsive to the first sounding reference signal being undetected during the first transmission time, at least the second transmission time for the first sounding reference signal from the UE.

Another apparatus for wireless communication at a base station is described. The apparatus may include means for identifying a sounding reference signal configuration for receiving one or more sounding reference signals from a UE, the sounding reference signal configuration providing periodic intervals for sounding reference signal transmissions, a first offset value from a starting time of each periodic interval that indicates a first transmission time within each periodic interval that is available for the sounding reference signal transmissions, and at least a second offset value from the starting time of each of the periodic intervals or from the first transmission time that indicates a second transmission time within each periodic interval that is available for sounding reference signal transmissions if a first listen-before-talk procedure for the first transmission time is unsuccessful, monitoring the first transmission time for a first sounding reference signal from the UE, and monitoring, responsive to the first sounding reference signal being undetected during the first transmission time, at least the second transmission time for the first sounding reference signal from the UE.

A non-transitory computer-readable medium storing code for wireless communication at a base station is described. The code may include instructions executable by a processor to identify a sounding reference signal configuration for receiving one or more sounding reference signals from a UE, the sounding reference signal configuration providing periodic intervals for sounding reference signal transmissions, a first offset value from a starting time of each periodic interval that indicates a first transmission time within each periodic interval that is available for the sounding reference signal transmissions, and at least a second offset value from the starting time of each of the periodic intervals or from the first transmission time that indicates a second transmission time within each periodic interval that is available for sounding reference signal transmissions if a first listen-before-talk procedure for the first transmission time is unsuccessful, monitor the first transmission time for a first sounding reference signal from the UE, and monitor, responsive to the first sounding reference signal being undetected during the first transmission time, at least the second transmission time for the first sounding reference signal from the UE.

Some examples of the method, apparatuses, and non-transitory computer-readable medium described herein may further include operations, features, means, or instructions for discontinuing monitoring for the first sounding reference signal from the UE responsive to detecting the first sounding reference signal during one of the first transmission time or the second transmission time.

In some examples of the method, apparatuses, and non-transitory computer-readable medium described herein, the sounding reference signal configuration further provides a list of offsets that indicates at least the second offset value.

In some examples of the method, apparatuses, and non-transitory computer-readable medium described herein, the periodic intervals correspond to sounding reference signal slot periods defined by a number of slots in each sounding reference signal slot period, where the first offset value indicates a number of slots from a starting time of each periodic interval, and where at least the second offset value corresponds to one or more additional slot offsets that identify additional slots within the sounding reference signal slot period available for the sounding reference signal transmissions.

In some examples of the method, apparatuses, and non-transitory computer-readable medium described herein, the sounding reference signal configuration may be transmitted from the base station to the UE in radio resource control signaling.

In some examples of the method, apparatuses, and non-transitory computer-readable medium described herein, one of more of the first offset value or second offset value may be determined based on a random selection from a set of available offset values.

A method of wireless communication at a base station is described. The method may include identifying a sounding reference signal configuration for receiving a sounding reference signal from a UE, the sounding reference signal configuration providing periodic intervals for sounding reference signal transmissions, determining a first offset value as a random selection from a set of available offset values, where the first offset value indicates a first transmission time from a starting time of each of the periodic intervals that is available for sounding reference signal transmissions, and monitoring for one or more sounding reference signal transmissions from the UE at the first transmission time within one or more of the periodic intervals based on the determining.

An apparatus for wireless communication at a base station is described. The apparatus may include a processor, memory in electronic communication with the processor, and instructions stored in the memory. The instructions may be executable by the processor to cause the apparatus to identify a sounding reference signal configuration for receiving a sounding reference signal from a UE, the sounding reference signal configuration providing periodic intervals for sounding reference signal transmissions, determine a first offset value as a random selection from a set of available offset values, where the first offset value indicates a first transmission time from a starting time of each of the periodic intervals that is available for sounding reference signal transmissions, and monitor for one or more sounding reference signal transmissions from the UE at the first transmission time within one or more of the periodic intervals based on the determining.

Another apparatus for wireless communication at a base station is described. The apparatus may include means for identifying a sounding reference signal configuration for receiving a sounding reference signal from a UE, the sounding reference signal configuration providing periodic intervals for sounding reference signal transmissions, determining a first offset value as a random selection from a set of available offset values, where the first offset value indicates a first transmission time from a starting time of each of the periodic intervals that is available for sounding reference signal transmissions, and monitoring for one or more sounding reference signal transmissions from the UE at the first transmission time within one or more of the periodic intervals based on the determining.

A non-transitory computer-readable medium storing code for wireless communication at a base station is described. The code may include instructions executable by a processor to identify a sounding reference signal configuration for receiving a sounding reference signal from a UE, the sounding reference signal configuration providing periodic intervals for sounding reference signal transmissions, determine a first offset value as a random selection from a set of available offset values, where the first offset value indicates a first transmission time from a starting time of each of the periodic intervals that is available for sounding reference signal transmissions, and monitor for one or more sounding reference signal transmissions from the UE at the first transmission time within one or more of the periodic intervals based on the determining.

In some examples of the method, apparatuses, and non-transitory computer-readable medium described herein, the determining the first offset value further may include operations, features, means, or instructions for providing the UE with a seed value for use in randomly selecting the first offset value from the set of available offset values, and where the seed value determines which offset value of the set of available offset values will be determined in the random selection.

In some examples of the method, apparatuses, and non-transitory computer-readable medium described herein, a same seed value may be provided to each of a set of UEs in a group of UEs to provide that each UE in the group of UEs uses a same first offset value and transmits a sounding reference signal at the first transmission time within one or more of the periodic intervals.

In some examples of the method, apparatuses, and non-transitory computer-readable medium described herein, the seed value may be determined based on one or more of a cell identification of the base station, a configured identification of the UE, a time index value, or any combinations thereof.

In some examples of the method, apparatuses, and non-transitory computer-readable medium described herein, the sounding reference signal configuration further provides one or more additional offset values that may be added to the first offset value to determine at least a second transmission time within each of the periodic intervals that may be available for sounding reference signal transmissions if a first listen-before-talk procedure at the UE for the first transmission time may be unsuccessful.

In some examples of the method, apparatuses, and non-transitory computer-readable medium described herein, the sounding reference signal configuration further provides a frequency resource of a set of available frequency resources that may be available for sounding reference signal transmissions, and where at least one other UE transmits a concurrent sounding reference signal in a different frequency resource of the set of available frequency resources during the first transmission time.

A method of wireless communication at a base station is described. The method may include identifying a sounding reference signal configuration for receiving a sounding reference signal from a UE, the sounding reference signal configuration providing periodic intervals for sounding reference signal transmissions, an offset value from a starting time of each periodic interval that indicates one or more times during each periodic interval that are available for sounding reference signal transmissions, and an initial offset value from a starting time of an initial periodic interval for transmitting an initial sounding reference signal from the UE, determining a first transmission time within the initial periodic interval for receiving the initial sounding reference signal based on the initial offset value, and receiving the initial sounding reference signal from the UE at the first transmission time.

An apparatus for wireless communication at a base station is described. The apparatus may include a processor, memory in electronic communication with the processor, and instructions stored in the memory. The instructions may be executable by the processor to cause the apparatus to identify a sounding reference signal configuration for receiving a sounding reference signal from a UE, the sounding reference signal configuration providing periodic intervals for sounding reference signal transmissions, an offset value from a starting time of each periodic interval that indicates one or more times during each periodic interval that are available for sounding reference signal transmissions, and an initial offset value from a starting time of an initial periodic interval for transmitting an initial sounding reference signal from the UE, determine a first transmission time within the initial periodic interval for receiving the initial sounding reference signal based on the initial offset value, and receive the initial sounding reference signal from the UE at the first transmission time.

Another apparatus for wireless communication at a base station is described. The apparatus may include means for identifying a sounding reference signal configuration for receiving a sounding reference signal from a UE, the sounding reference signal configuration providing periodic intervals for sounding reference signal transmissions, an offset value from a starting time of each periodic interval that indicates one or more times during each periodic interval that are available for sounding reference signal transmissions, and an initial offset value from a starting time of an initial periodic interval for transmitting an initial sounding reference signal from the UE, determining a first transmission time within the initial periodic interval for receiving the initial sounding reference signal based on the initial offset value, and receiving the initial sounding reference signal from the UE at the first transmission time.

A non-transitory computer-readable medium storing code for wireless communication at a base station is described. The code may include instructions executable by a processor to identify a sounding reference signal configuration for receiving a sounding reference signal from a UE, the sounding reference signal configuration providing periodic intervals for sounding reference signal transmissions, an offset value from a starting time of each periodic interval that indicates one or more times during each periodic interval that are available for sounding reference signal transmissions, and an initial offset value from a starting time of an initial periodic interval for transmitting an initial sounding reference signal from the UE, determine a first transmission time within the initial periodic interval for receiving the initial sounding reference signal based on the initial offset value, and receive the initial sounding reference signal from the UE at the first transmission time.

Some examples of the method, apparatuses, and non-transitory computer-readable medium described herein may further include operations, features, means, or instructions for transmitting the sounding reference signal configuration to the UE in radio resource control signaling. Some examples of the method, apparatuses, and non-transitory computer-readable medium described herein may further include operations, features, means, or instructions for transmitting, to the UE, downlink control information that indicates allocated resources for one or more of an uplink shared channel transmission, an uplink control channel transmission, or any combinations thereof, and where a starting time of the allocated resources may be aligned with the first transmission time.

A method of wireless communication at a base station is described. The method may include identifying a sounding reference signal configuration for receiving a sounding reference signal from a user equipment, the sounding reference signal configuration providing periodic intervals for sounding reference signal transmissions, a first cyclic prefix length for sounding reference signal transmissions within a channel occupancy time of the base station, and a second cyclic prefix length for sounding reference signal transmissions outside of the channel occupancy time of the base station, transmitting the sounding reference signal configuration to the UE, determining a first transmission time for receiving a first sounding reference signal based on the sounding reference signal configuration, and receiving the first sounding reference signal during the first transmission time, where the first sounding reference signal uses the first cyclic prefix length when the first transmission time is within the channel occupancy time of the base station, or uses the second cyclic prefix length when the first transmission time is outside of the channel occupancy time of the base station.

An apparatus for wireless communication at a base station is described. The apparatus may include a processor, memory in electronic communication with the processor, and instructions stored in the memory. The instructions may be executable by the processor to cause the apparatus to identify a sounding reference signal configuration for receiving a sounding reference signal from a user equipment, the sounding reference signal configuration providing periodic intervals for sounding reference signal transmissions, a first cyclic prefix length for sounding reference signal transmissions within a channel occupancy time of the base station, and a second cyclic prefix length for sounding reference signal transmissions outside of the channel occupancy time of the base station, transmit the sounding reference signal configuration to the UE, determine a first transmission time for receiving a first sounding reference signal based on the sounding reference signal configuration, and receive the first sounding reference signal during the first transmission time, where the first sounding reference signal uses the first cyclic prefix length when the first transmission time is within the channel occupancy time of the base station, or uses the second cyclic prefix length when the first transmission time is outside of the channel occupancy time of the base station.

Another apparatus for wireless communication at a base station is described. The apparatus may include means for identifying a sounding reference signal configuration for receiving a sounding reference signal from a user equipment, the sounding reference signal configuration providing periodic intervals for sounding reference signal transmissions, a first cyclic prefix length for sounding reference signal transmissions within a channel occupancy time of the base station, and a second cyclic prefix length for sounding reference signal transmissions outside of the channel occupancy time of the base station, transmitting the sounding reference signal configuration to the UE, determining a first transmission time for receiving a first sounding reference signal based on the sounding reference signal configuration, and receiving the first sounding reference signal during the first transmission time, where the first sounding reference signal uses the first cyclic prefix length when the first transmission time is within the channel occupancy time of the base station, or uses the second cyclic prefix length when the first transmission time is outside of the channel occupancy time of the base station.

A non-transitory computer-readable medium storing code for wireless communication at a base station is described. The code may include instructions executable by a processor to identify a sounding reference signal configuration for receiving a sounding reference signal from a user equipment, the sounding reference signal configuration providing periodic intervals for sounding reference signal transmissions, a first cyclic prefix length for sounding reference signal transmissions within a channel occupancy time of the base station, and a second cyclic prefix length for sounding reference signal transmissions outside of the channel occupancy time of the base station, transmit the sounding reference signal configuration to the UE, determine a first transmission time for receiving a first sounding reference signal based on the sounding reference signal configuration, and receive the first sounding reference signal during the first transmission time, where the first sounding reference signal uses the first cyclic prefix length when the first transmission time is within the channel occupancy time of the base station, or uses the second cyclic prefix length when the first transmission time is outside of the channel occupancy time of the base station.

In some examples of the method, apparatuses, and non-transitory computer-readable medium described herein, the second cyclic prefix length may be shorter than the first cyclic prefix length.

In some examples of the method, apparatuses, and non-transitory computer-readable medium described herein, a first listen-before-talk procedure may be used by the UE for transmitting the first sounding reference signal when the first transmission time may be within the channel occupancy time of the base station, and a second listen-before-talk procedure may be used by the UE for transmitting the first sounding reference signal when the first transmission time may be outside of the channel occupancy time of the base station, and where the first listen-before-talk procedure may be shorter than the second listen-before-talk procedure.

In some examples of the method, apparatuses, and non-transitory computer-readable medium described herein, the first cyclic prefix length may be determined based on a first difference between a duration of one or more symbols allocated to provide a first gap in communications before transmitting the first sounding reference signal and a maximum first listen-before-talk procedure duration, and where the second cyclic prefix length may be determined based on a second difference between a duration of a number of symbols allocated to provide a second gap in communications before transmitting the first sounding reference signal and a maximum second listen-before-talk procedure duration. In some examples of the method, apparatuses, and non-transitory computer-readable medium described herein, the first listen-before-talk procedure may be a one-shot listen-before-talk procedure, and the second listen-before-talk procedure may be a category 4 listen-before-talk procedure.

A method of wireless communication at a base station is described. The method may include identifying a persistent or semi-persistent sounding reference signal configuration for receiving a sounding reference signal from a UE, the persistent or semi-persistent sounding reference signal configuration providing periodic intervals for persistent or semi-persistent sounding reference signal transmissions, determining a first transmission time for a first persistent or semi-persistent sounding reference signal transmission from the UE based on the persistent or semi-persistent sounding reference signal configuration, transmitting a trigger to the UE to transmit an aperiodic sounding reference signal prior to the first transmission time, and skipping an attempt to receive the first persistent or semi-persistent sounding reference signal during the first transmission time based on the transmitting the trigger to the UE to transmit the aperiodic sounding reference signal.

An apparatus for wireless communication at a base station is described. The apparatus may include a processor, memory in electronic communication with the processor, and instructions stored in the memory. The instructions may be executable by the processor to cause the apparatus to identify a persistent or semi-persistent sounding reference signal configuration for receiving a sounding reference signal from a UE, the persistent or semi-persistent sounding reference signal configuration providing periodic intervals for persistent or semi-persistent sounding reference signal transmissions, determine a first transmission time for a first persistent or semi-persistent sounding reference signal transmission from the UE based on the persistent or semi-persistent sounding reference signal configuration, transmit a trigger to the UE to transmit an aperiodic sounding reference signal prior to the first transmission time, and skip an attempt to receive the first persistent or semi-persistent sounding reference signal during the first transmission time based on the transmitting the trigger to the UE to transmit the aperiodic sounding reference signal.

Another apparatus for wireless communication at a base station is described. The apparatus may include means for identifying a persistent or semi-persistent sounding reference signal configuration for receiving a sounding reference signal from a UE, the persistent or semi-persistent sounding reference signal configuration providing periodic intervals for persistent or semi-persistent sounding reference signal transmissions, determining a first transmission time for a first persistent or semi-persistent sounding reference signal transmission from the UE based on the persistent or semi-persistent sounding reference signal configuration, transmitting a trigger to the UE to transmit an aperiodic sounding reference signal prior to the first transmission time, and skipping an attempt to receive the first persistent or semi-persistent sounding reference signal during the first transmission time based on the transmitting the trigger to the UE to transmit the aperiodic sounding reference signal.

A non-transitory computer-readable medium storing code for wireless communication at a base station is described. The code may include instructions executable by a processor to identify a persistent or semi-persistent sounding reference signal configuration for receiving a sounding reference signal from a UE, the persistent or semi-persistent sounding reference signal configuration providing periodic intervals for persistent or semi-persistent sounding reference signal transmissions, determine a first transmission time for a first persistent or semi-persistent sounding reference signal transmission from the UE based on the persistent or semi-persistent sounding reference signal configuration, transmit a trigger to the UE to transmit an aperiodic sounding reference signal prior to the first transmission time, and skip an attempt to receive the first persistent or semi-persistent sounding reference signal during the first transmission time based on the transmitting the trigger to the UE to transmit the aperiodic sounding reference signal.

In some examples of the method, apparatuses, and non-transitory computer-readable medium described herein, the persistent or semi-persistent sounding reference signal configuration further provides an aperiodic sounding reference signal resource set index, and where the skipping the attempt to receive the first persistent or semi-persistent sounding reference signal may be based on the aperiodic sounding reference signal being transmitted using resources identified in the aperiodic sounding reference signal resource set index.

In some examples of the method, apparatuses, and non-transitory computer-readable medium described herein, the persistent or semi-persistent sounding reference signal configuration further provides an aperiodic sounding reference signal widow, and where the skipping the attempt to receive the first persistent or semi-persistent sounding reference signal may be based on the aperiodic sounding reference signal being transmitted within the aperiodic sounding reference signal widow in advance of the first transmission time.

In some examples of the method, apparatuses, and non-transitory computer-readable medium described herein, the aperiodic sounding reference signal widow corresponds to a predetermined number of slots ahead of a first slot associated with the first transmission time. In some examples of the method, apparatuses, and non-transitory computer-readable medium described herein, the aperiodic sounding reference signal may be within a channel occupancy time of the base station for a shared radio frequency spectrum band, and the first transmission time may be outside of the channel occupancy time of the base station for the shared radio frequency spectrum band.

DETAILED DESCRIPTION

Figure 1:
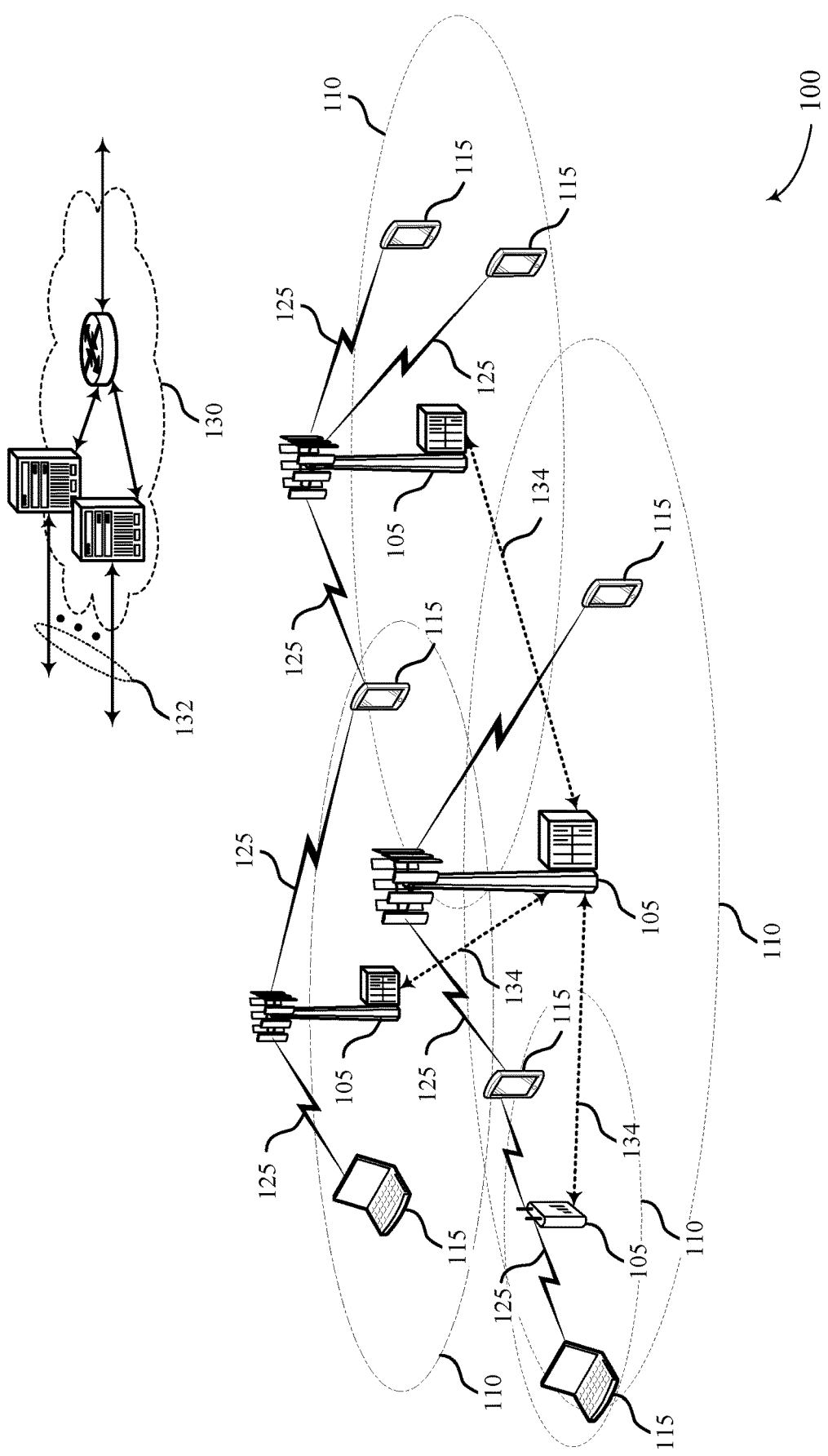
FIG. 1 illustrates an example of a system for wireless communications that supports techniques for managing sounding reference signal transmissions in shared radio frequency spectrum in accordance with aspects of the present disclosure.

Various aspects of the present disclosure provide techniques for sounding reference signal (SRS) management to provide for increased occasions at which a SRS may be transmitted, enhanced likelihood of successful listen-before-talk (LBT) procedures, or any combinations thereof. In some cases, increased occasions at which a SRS may be transmitted may be provided through multiple SRS transmission times within a periodic time interval for transmitting SRS, and one or more later transmission times may be used in the event that one or more prior LBT procedures in the periodic time interval fail. In some cases, enhanced likelihood of successful LBT procedures may be provided through one or more timing offsets that may be randomly selected from a set of available timing offsets, an initial SRS transmission time for an initial periodic time interval, a cyclic prefix length that is selected based on whether the SRS transmission is within or outside of a channel occupancy time of a base station, an aperiodic SRS transmission, or any combinations thereof.

As indicated above, in some deployments wireless communications systems may use shared radio frequency spectrum for some or all communications between a UE and a base station. Prior to initiating a transmission in the shared radio frequency spectrum band, a transmitting wireless device (e.g., a UE or base station) performs a LBT procedure, and the wireless device may transmit after completing the LBT procedure. In cases where the base station obtains a channel for a channel occupancy time (COT), a UE may perform a shortened LBT procedure (e.g., a one-shot LBT if the UE transmission is within a COT, versus a Category 4 (CAT4) high priority LBT procedure if the UE transmission is outside of a COT). In some cases, SRS may be configured by a base station, in which SRS slot periods are identified that provide a number of slots in the SRS slot period, and a slot offset value that indicates a number of slots from a starting slot at which the UE is to initiate a SRS transmission (i.e., perform LBT and transmit SRS if the LBT is successful). In some prior cases, in the event that the LBT procedure fails, the UE may wait until the next SRS slot period and attempt LBT and SRS transmission again. In some cases, if one or more subsequent LBTs fail, a relatively long period of time may elapse between SRS transmissions. Further, in some cases, one or more other transmitters may be transmitting at periodic intervals which may result in persistent interference in SRS slot periods. Various techniques as discussed herein provide enhanced procedures that may enhance likelihood of successful LBT, additional opportunities within a SRS slot period for SRS transmission, or any combinations thereof. Such techniques may provide more consistent and reliable transmission of a SRS which may help to maintain suitable transmission parameters for communications between the base station and UE, which may thus enhance system reliability and capacity.

Aspects of the disclosure are initially described in the context of a wireless communications system. Various examples of SRS configurations are then discussed. Aspects of the disclosure are further illustrated by and described with reference to apparatus diagrams, system diagrams, and flowcharts that relate to techniques for managing sounding reference signal transmissions in shared radio frequency spectrum.

FIG. 1 illustrates an example of a wireless communications system 100 that supports techniques for managing sounding reference signal transmissions in shared radio frequency spectrum in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. For example, a transmitting device may perform a clear channel assessment (CCA). A CCA may include an energy detection or energy sensing procedure to determine whether there are any other active transmissions on a channel. For example, each UE 115 may randomly choose a backoff counter (with may be a certain duration or a number of symbols) and listen to the channel including resources the UEs 115 are contending for until the counter decrements to zero. If the counter reaches zero for a certain UE 115 and no other transmissions are detected, the UE 115 may start transmitting. If the counter does not reach zero before another signal is detected, the UE 115 has lost contention for resource and refrains from transmitting. In some examples, a UE 115 may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals (e.g., SRS transmissions) multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

In some cases, UEs 115 may transmit SRSs to base stations 105 in accordance with a SRS configuration. For example, a base station 105 may provide a SRS configuration to a UE 115 that indicates, for example, a SRS slot period and a slot offset to indicate which slot within the SRS slot period is to be used by the UE 115 for SRS transmissions. In some cases, the SRS configuration may provide for increased occasions at which a SRS may be transmitted, enhance likelihood of a successful LBT procedure, or any combinations thereof. Increased occasions for SRS may be provided through configuration of a first slot offset and at least a second slot offset that is available for SRS transmissions in the event that LBT at the first slot offset fails. In some cases, a third or even more additional slot offsets may be provided and used for the SRS transmission in the event that each of the earlier LBTs fail. Once the UE 115 transmits the SRS in a SRS slot period, any later slot offsets may be disregarded and the process repeated in a subsequent SRS slot period.

In some cases, the SRS configuration may provide enhanced likelihood of successful LBT through one or more slot offsets that may be randomly selected from a set of available slot offsets, selection of a cyclic prefix length for a SRS based on whether the SRS transmission is within or outside of a channel occupancy time (COT) of the base station 105 (e.g., a SRS subsequent to a one-shot LBT within the COT may use a longer cyclic prefix and a SRS subsequent to a CAT4 LBT outside of the COT may use a shorter cyclic prefix), providing an initial SRS transmission time for an initial periodic time interval (e.g., to align with a starting time of a PUSCH or PUCCH transmission), triggering of an aperiodic SRS within the COT and skipping a subsequent SRS (e.g., to avoid performing LBT outside of the COT), or any combinations thereof.

Figure 2:
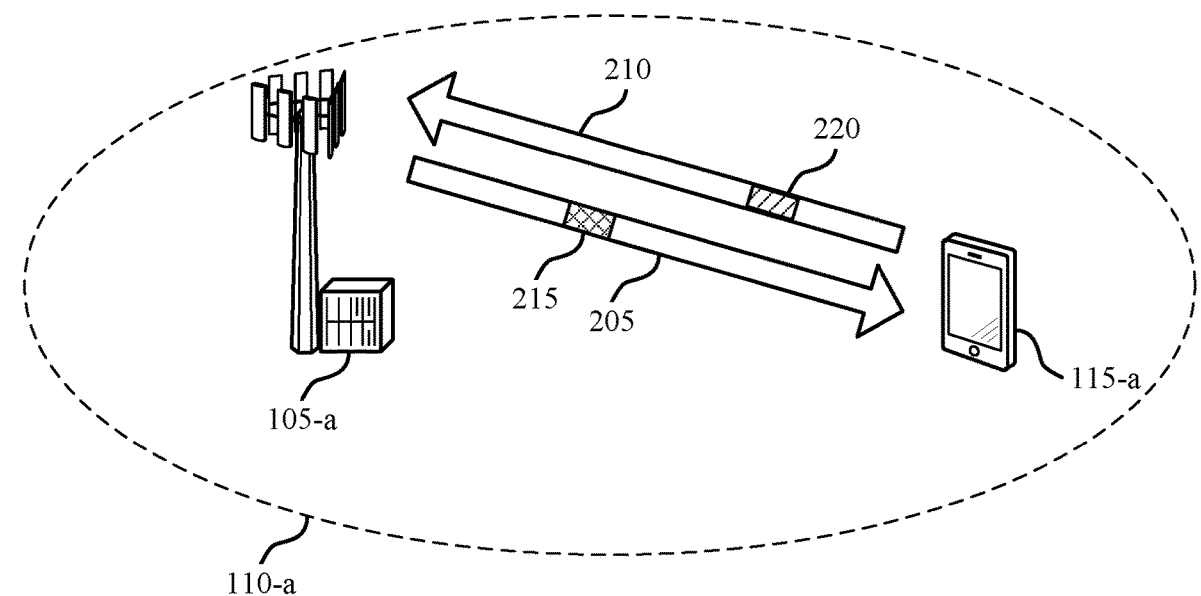
FIG. 2 illustrates an example of a portion of a wireless communications system that supports techniques for managing sounding reference signal transmissions in shared radio frequency spectrum in accordance with aspects of the present disclosure.

FIG. 2 illustrates an example of a portion of a wireless communications system 200 that supports techniques for managing sounding reference signal transmissions in shared radio frequency spectrum in accordance with aspects of the present disclosure. In some examples, wireless communications system 200 may implement aspects of wireless communications system 100. In this example, wireless communications system 200 includes a base station 105-a and a UE 115-a, which may be examples of corresponding devices as discussed with respect to FIG. 1. The base station 105-a may transmit data and control information to the UE 115-a via downlink communications 205, and the UE 115-a may transmit data and control information to the base station 105-a via uplink communications 210. In this example, the base station 105-*a* may transmit SRS configuration information 215 to the UE 115-*a*, which may configure one or more SRS transmissions 220 by the UE 115-*a*.

In accordance with techniques discussed herein, the SRS configuration information 215 may indicate a number of periodic time intervals during which SRS is to be transmitted. In some cases, the SRS configuration information 215 may provide a SRS slot period that indicates a number of slots in each SRS period. In some cases, a SRS transmission 220 may start at a timing offset from a start of a periodic time interval (e.g., at an indicated slot offset in a SRS slot period), and one or more extra offset values may be provided that indicate one or more extra transmission times for SRS transmission 220 in the event that one or more prior LBT procedures in the periodic interval failed. SRS configuration information 215 may also provide one or more other indications, such as an interlace or frequency resources within one or more uplink slots to be used for the SRS transmission 220, a number of repetitions of the SRS transmission 220, a number of symbols that the SRS transmission 220 is to span, frequency hopping within or between SRS transmissions 220, and the like.

In some cases, one or more timing offsets may be randomly selected from a set of available timing offsets. For example, the UE 115-*a* may receive SRS configuration information 220 that indicates a nominal slot offset and an indication of a number of slots before or after the nominal slot offset that may be selected at random for the SRS transmission 220. In some cases, the SRS configuration information 220 may identify a set of available slot indices that may be selected at random for the SRS transmission 220. In some cases, the base station 105-*a* may also provide a seed that is to be used in a random selection process, and the value of the seed may determine the result of the random selection. In some cases, the base station 105-*a* may provide a same seed value to multiple UEs in a group of UEs such that each UE in the group transmits SRS in a same slot, and using different frequency resources or SRS interlaces. The base station 105-*a*, in such cases, may have flexibility in allocating uplink and downlink resources around SRS resources.

In some cases, the SRS configuration information 215 may provide an initial SRS transmission time for an initial periodic time interval to the UE 115-*a*. In such cases, the base station 105-*a* may allocate other uplink resources (e.g., PUCCH or PUSCH) resources to be transmitted in a same symbol as the SRS transmission 220. By providing the initial SRS transmission time that matches other uplink transmissions, a single LBT may be performed for the uplink transmissions.

Further, in some cases, the SRS configuration information 215 may provide that a cyclic prefix length for the SRS transmission 220 may be selected from two or more available cyclic prefix lengths based on whether the SRS transmission 220 is within or outside of a channel occupancy time of a base station 105-*a*. Additionally, in some cases the base station 105-*a* may trigger an aperiodic SRS transmission, and the UE 115-*a* may skip a subsequent SRS transmission 220 (e.g., a subsequent persistent or semi-persistent SRS configured by the SRS configuration) based on the aperiodic SRS transmission (e.g., if the aperiodic SRS transmission was within a predetermined time threshold of the subsequent persistent of semi-persistent SRS).

Figure 3:
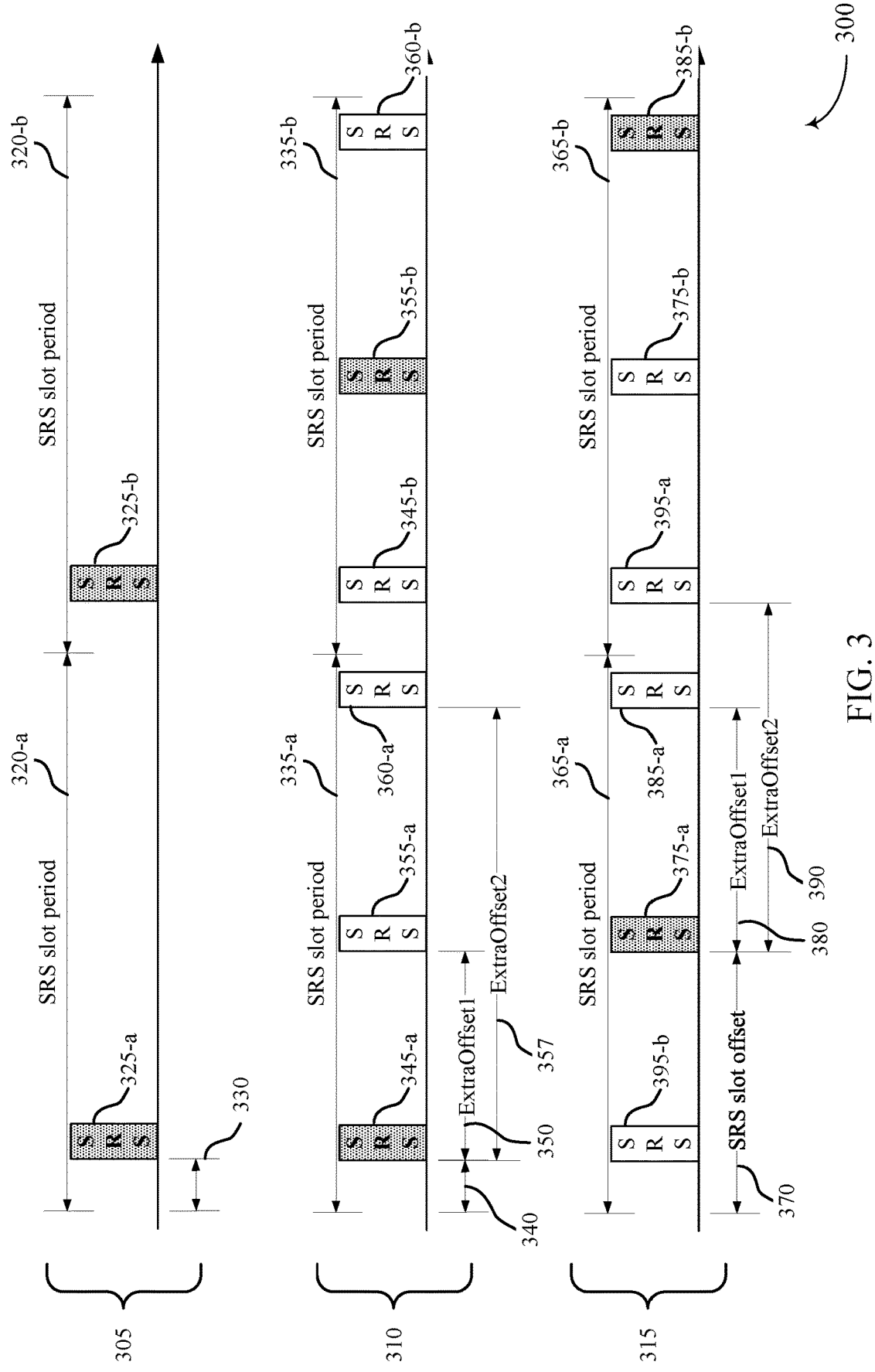
FIG. 3 illustrates an example of SRS configurations with additional offsets that supports techniques for managing sounding reference signal transmissions in shared radio frequency spectrum in accordance with aspects of the present disclosure.

FIG. 3 illustrates an example of SRS configurations with additional offsets 300 that supports techniques for managing sounding reference signal transmissions in shared radio frequency spectrum in accordance with aspects of the present disclosure. In some examples, SRS configurations with additional offsets 300 may implement aspects of wireless communications system 100 or 200. In this example, a first SRS configuration 305, a second SRS configuration 310, and a third SRS configuration 315 are illustrated. The first SRS configuration 305 includes a first SRS slot period 320-*a* and a second SRS slot period 320-*b* that each include resources for a corresponding first SRS 325-*a* and a second SRS 325-*b* that start at a slot offset 330 after the start of each SRS slot period 320. As indicated above, in such cases, if a UE fails LBT at the time for transmission of SRS 325, the UE may attempt another transmission in a subsequent SRS slot period 320. Second SRS configuration 310 and third SRS configuration 315 illustrate examples of additional opportunities for SRS transmissions in accordance with techniques provided herein.

In the example second SRS configuration 310, a first SRS slot period 335-*a* and a second SRS slot period 335-*b* may each include multiple SRS opportunities. In this example, a first SRS 345 within each of the first SRS slot period 335-*a* and second SRS slot period 335-*b* may be determined based on a slot offset 340, which may be referred to as a first offset. In this example, a second offset 350 and a third offset 357 may also be provided, which provides opportunities for a second SRS 355 and a third SRS 360 within each of first SRS slot period 335-*a* and second SRS slot period 335-*b*. A UE, based on such a configuration, may attempt LBT, within each SRS slot period 335 to attempt to transmit first SRS 345. If the LBT succeeds, the UE may transmit the first SRS 345 and disregard the second SRS 355 and third SRS 360 within the SRS slot period 335. If the LBT for the first SRS 345 fails, the UE may attempt a second LBT to attempt to transmit the second SRS 355. If the second LBT passes, the UE may transmit the second SRS 355 begin the process again in the subsequent SRS slot period 335. If the second LBT fails the UE may attempt a third LBT to attempt to transmit the third SRS 360. Such processes may continue for the number of slot offsets that are configured per SRS slot period 335. If the LBT fails on each attempt, the UE may again attempt SRS transmissions in a subsequent SRS slot period 335.

In the example third SRS configuration 315, a first SRS slot period 365-*a* and a second SRS slot period 365-*b* may each include multiple SRS opportunities. In this example, a first SRS 375 within each of the first SRS slot period 365-*a* and second SRS slot period 365-*b* may be determined based on a slot offset 370 (i.e., the first offset). In this example, the first offset occurs relatively late in the SRS slot period 365, and a second offset 380 and a third offset 390 may also be provided, where the second offset 380 provides second SRS 385, and the third offset 390 provides a third SRS 395 that is beyond the end of the SRS slot period 365 and thus wraps around to the beginning of the SRS slot period 365. A UE, based on such a configuration, may attempt LBT and transmit in a similar manner as discussed with respect to the second SRS configuration 310. In some cases, the LBT procedures may be CAT4 LBT procedures.

In some cases, the SRS configuration may be provided via RRC signaling, which may include an additional extra offset field relative to the original offset. In some cases, the length of extra offset is the number of additional opportunities, on top of the original offset, and the values of the extra offsets are offsets from the original slot offset. In some cases, the maximum offset value may not exceed a slot period, and thus each of the extra offsets occurs prior to the next regular offset. For example, a 40 slot period with offset 10 may be indicated in field 'ExtraOffsets={5, 20}' which implies additional opportunities at slot 15 and 30. In another example, a 40 slot period with offset 30 may be indicated as ExtraOffsets={5, 20}, which implies additional SRS opportunities at slot 35 and 10 (one 40 slot period later).

Figure 4:
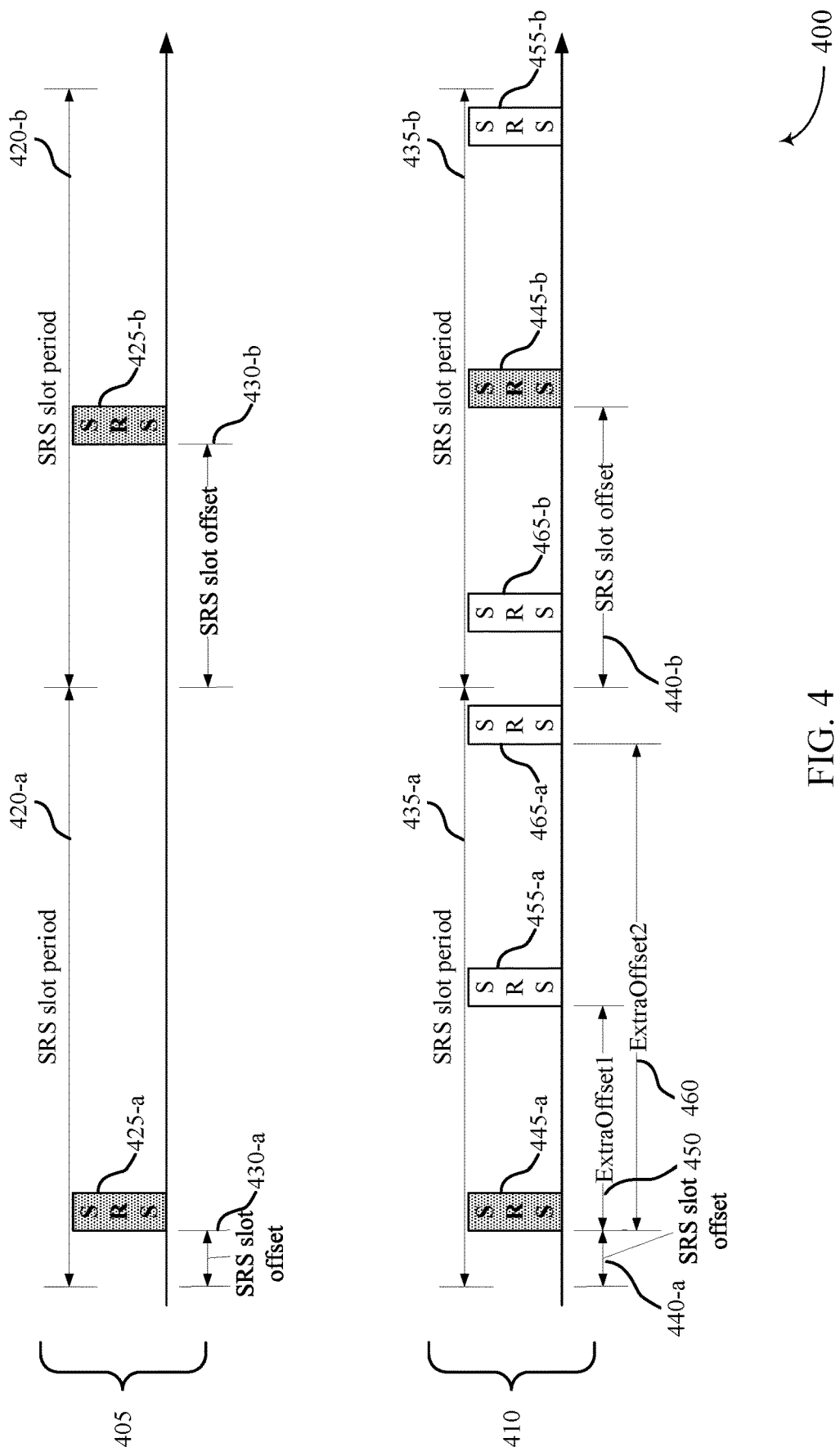
FIG. 4 illustrates an example of a SRS configuration with randomized offsets that supports techniques for managing sounding reference signal transmissions in shared radio frequency spectrum in accordance with aspects of the present disclosure.

FIG. 4 illustrates an example of a SRS configuration with randomized offsets 400 that supports techniques for managing sounding reference signal transmissions in shared radio frequency spectrum in accordance with aspects of the present disclosure. In some examples, SRS configuration with randomized offsets 400 may implement aspects of wireless communications system 100 or 200. In this example, a first SRS configuration 405, and a second SRS configuration 410 are illustrated. The first SRS configuration 405 includes a first SRS slot period 420-a and a second SRS slot period 420-b that each include resources for a corresponding first SRS 425-a and a second SRS 425-b. In this example, a first SRS slot offset 430-a may indicate a transmission slot for first SRS 425-a, and a second SRS slot offset 430-b may indicate a transmission slot for second SRS 425-b. In this example, each of the SRS slot offsets 430 may be randomly selected from a set of available SRS offsets (e.g., that are provided in SRS configuration via RRC signaling), and thus occur at different locations within a SRS slot period 420.

In the example second SRS configuration 410, a first SRS slot period 435-a and a second SRS slot period 435-b may each include multiple SRS opportunities. In this example, a first SRS 445 within each of the first SRS slot period 435-a and second SRS slot period 435-b may be determined based on a random slot offset selection 440. In this example, a second offset 450 and a third offset 460 may also be provided, which provides opportunities for a second SRS 455 and a third SRS 465 within each of first SRS slot period 435-a and second SRS slot period 435-b.

A UE, based on such configurations, may attempt LBT and transmit in the SRS opportunities as discussed with respect to FIG. 3. In some cases, the SRS configuration may be provided in a persistent or semi-persistent SRS configuration. Compared to SRS configurations with a fixed slot level period and offset, which can create a fixed traffic pattern that may be subject to fixed pattern interference and generates a fixed interference pattern (e.g., when a neighbor base station deploys a discovery reference signal at the fixed SRS locations), randomized offsets may avoid such persistent interference. In some examples, the SRS configuration may configure a list of slot level offsets and the UE randomly chooses one from the list and use that as the SRS transmission offset. In some cases, the random selection may be controlled by a random seed that is provided by the base station, which may allow the base station to configure the same random seed to multiple UEs, so the randomly chosen SRS offsets from these UEs will be the same. In some cases, the random seed may be a function of cell ID, a configured ID, a time index, or any combinations thereof. Such a configuration may allow UEs to be configured with a frequency division multiplexed SRS pattern, so the SRS transmissions happen at the same time to avoid excessively using the channel.

In some cases, the SRS configuration may also include a timing offset for an initial SRS transmission of the UE. In some cases, the base station may determine to frequency division multiplex SRS with PUSCH, PUCCH, or both, and may provide aligned starting offsets of SRS and PUCCH/PUSCH, which may prevent an earlier transmission from blocking a later transmission due to LBT failure. In some cases, the starting offset of the initial SRS transmission may be RRC configured as part of a SRS-Resource configuration information element (IE). Such techniques allow the base station to control the PUSCH/PUCCH starting offset to match the configured SRS starting offset to avoid blocking.

In some cases, the SRS configuration may also indicate starting offsets for SRS transmissions both inside and outside of a COT of a base station. In some cases, persistent or semi-persistent SRS transmissions may occur outside of the base station COT. In such cases, if there are time division multiplexed (TDM) SRS transmission opportunities, enough of a gap needs to be kept between the TDM SRS transmission opportunities such that the LBT associated with the SRS transmissions has a higher likelihood of passing. For example, a CAT4 LBT with a highest priority may be used for SRS transmission, which may provide an LBT gap of up to 16 μs+18 μs+n*9 μs, where n is a random number with n=0, . . . , 3 or n=0, . . . , 7, depending on contention window size. Thus, up to 61 μs or 97 μs, or 2 or 3 symbols for 30 KHz subcarrier spacing (SCS), and 1 or 2 symbols for 15 KHz SCS. To allow SRS transmission, the base station may configure the TDM SRS to have a long enough gap for CAT4 to finish, but may make the gap as small as possible to reduce the chance some other nodes occupy the channel during the gap. For example, the base station may leave a two symbol gap at 30 KHz SCS (71.4 us) and ask the UE to use a cyclic prefix length of 71.4-61=10.4 μs, so the gap is just enough to allow CAT4 LBT to pass with the worst n, (assuming CW=3). In other cases, if the SRS transmission time is in the base station COT, only a one-shot LBT may be performed with a much smaller gap (e.g., 25 μs, instead of 61 μs). Since this is a gap between SRS transmissions, the base station may not schedule anything to narrow the gap, and instead the UE may use a different ECP length. For example, the base station may leave a two symbol gap at 30 KHz SCS (71.4 us) and the UE may use a cyclic prefix of 71.4-25=46.4 μs to narrow the gap. Accordingly, in such cases, the base station may configure two cyclic prefix lengths, such as lengths A and B, with A<B, where A is used if the SRS transmission is outside the base station COT with CAT4 LBT, and B is used if the SRS transmission is inside the base station COT with CAT2 or one-shot LBT.

Figure 5:
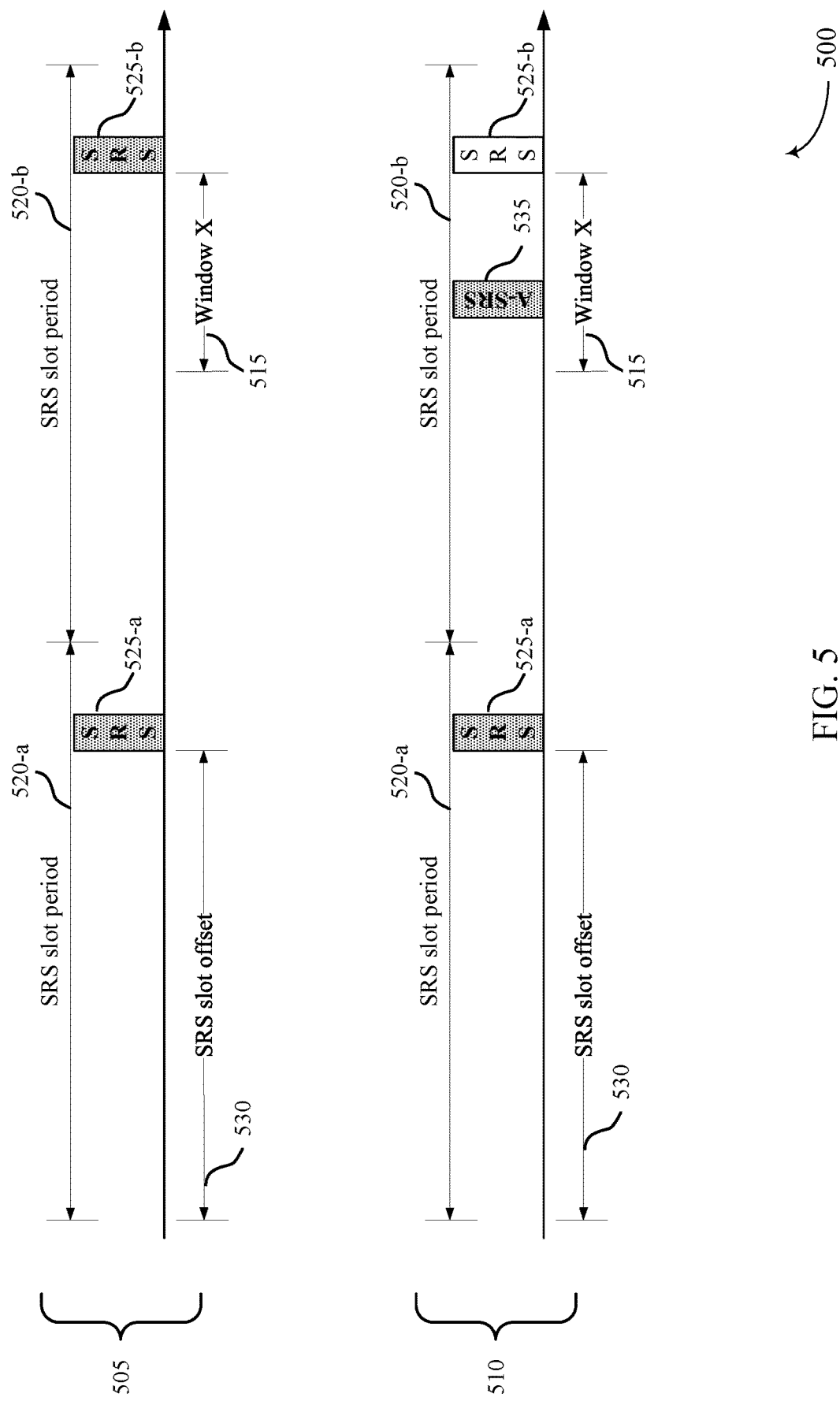
FIG. 5 illustrates an example of a SRS configuration with aperiodic SRS that supports techniques for managing sounding reference signal transmissions in shared radio frequency spectrum in accordance with aspects of the present disclosure.

FIG. 5 illustrates an example of a SRS configuration with aperiodic SRS 500 that supports techniques for managing sounding reference signal transmissions in shared radio frequency spectrum in accordance with aspects of the present disclosure. In some examples, SRS configuration with aperiodic SRS 500 may implement aspects of wireless communications system 100 or 200. In this example, a first SRS pattern 505, and a second SRS pattern 510 are illustrated.

The first SRS pattern 505 includes a first SRS slot period 520-a and a second SRS slot period 520-b that each include resources for a corresponding first SRS 525-a and a second SRS 525-b. In this example, a SRS slot offset 530 may indicate a transmission slot for first SRS 525-a and a second SRS 525-b. In this example, a time window 515 is provided that corresponds to a time threshold in advance of a SRS 525 in which, if an aperiodic SRS is transmitted, the UE may skip the configured SRS 525. In the first SRS pattern 505, an aperiodic SRS is not present, and the UE transmits the second SRS 525-b. In the second SRS pattern 510, which includes the first SRS slot period 520-a and second SRS slot period 520-b that each include resources for a corresponding first SRS 525-a and a second SRS 525-b, an aperiodic SRS 535 is transmitted within window 515, and the UE may skip the second SRS transmission 525-b.

In some cases, the SRS configuration may include a reference in a persistent or semi-persistent SRS resource set configuration that points to an aperiodic SRS resource set index. If the aperiodic SRS has an index value in an aperiodic SRS resource set index, the UE may skip the subsequent regular SRS transmission. In other cases, the SRS configuration may provide a value of the window 515 (e.g., within X slots ahead of the slot offset of persistent or semi-persistent SRS transmissions). In such cases, if the base station wins a COT, it may trigger the aperiodic SRS transmission from the UE in the COT, instead of risking the UE to try a separate LBT after the COT. In some cases, the base station does not need to explicitly cancel the UE configured SRS, because the UE is aware of the aperiodic SRS.

Figure 6:
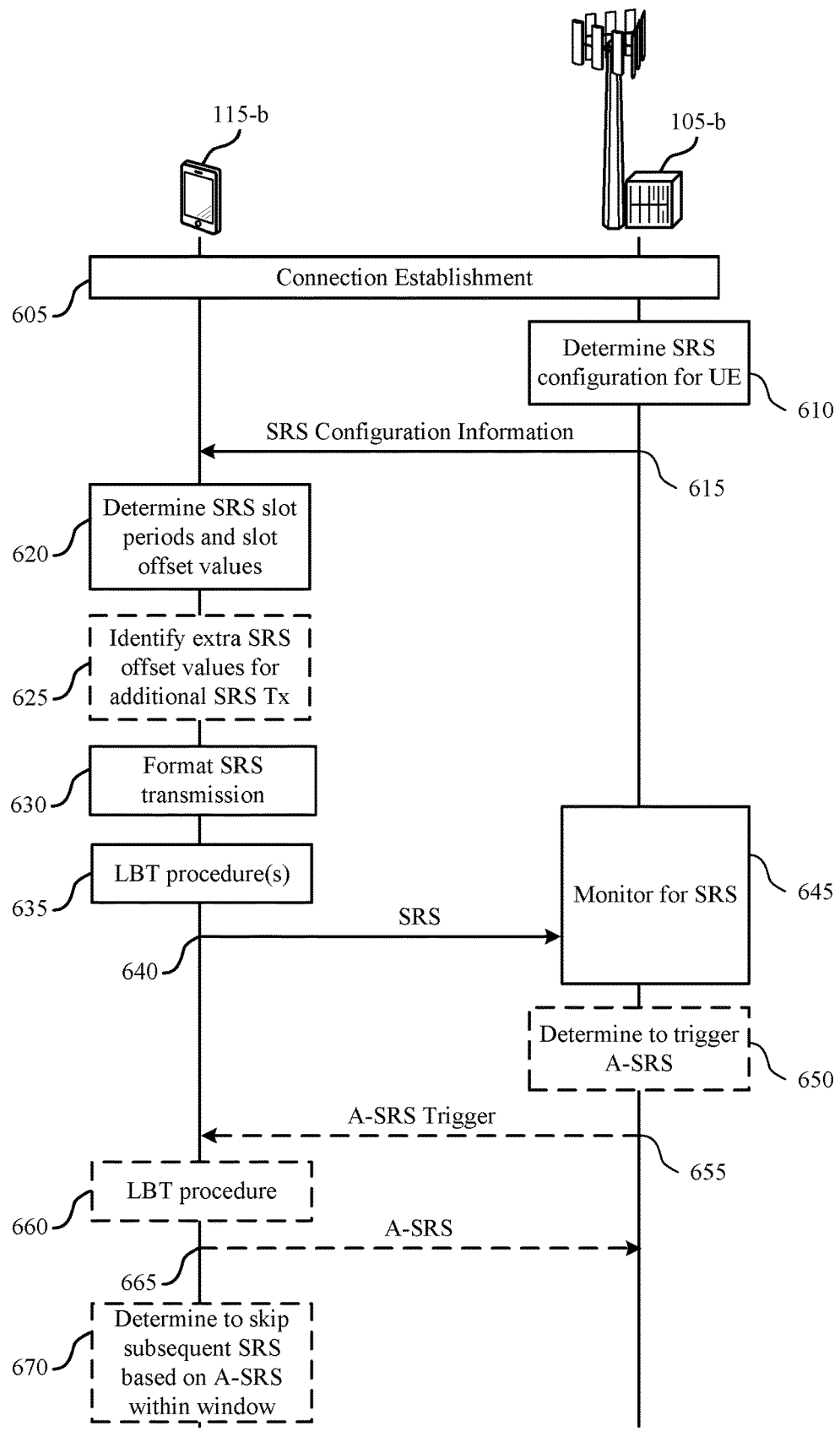
FIG. 6 illustrates an example of a process flow that supports techniques for managing sounding reference signal transmissions in shared radio frequency spectrum in accordance with aspects of the present disclosure.

FIG. 6 illustrates an example of a process flow 600 that supports techniques for managing sounding reference signal transmissions in shared radio frequency spectrum in accordance with aspects of the present disclosure. In some examples, process flow 600 may implement aspects of wireless communications system 100 or 200. The process flow 600 may include a base station 105-*b* and a UE 115-*b*, which may be examples of the corresponding devices described with reference to FIGS. 1 and 2. The base station 105-*a* may provide a SRS configuration and UE 115-*b* may transmit SRSs based on the SRS configuration as discussed herein. Alternative examples of the following may be implemented, where some steps are performed in a different order than described or are not performed at all. In some cases, operations may include additional features not mentioned below, or further operations may be added.

At 605, UE 115-*b* and base station 105-*b* may establish a connection. The connection may be established according to established RRC connection establishment techniques. The base station 105-*b*, at 610, may determine a SRS configuration for the UE 115-*b*, and may transmit SRS configuration information to the UE 115-*b* at 615. In some cases, the configuration information may include information related to SRS slot periods, timing offsets, extra timing offsets, sets of SRS resources for random selection at the UE, an initial SRS transmission time, a cyclic prefix length, an aperiodic SRS cancellation procedure, or any combinations thereof. In some cases, the configuration information may be provided as part on the connection establishment.

At 620, the UE 115-*b* may determine the SRS configuration, including SRS slot periods and slot offsets. In some cases, the SRS configuration may also include an indication of one or more extra slot offsets that are available for SRS transmissions in the event that an earlier SRS within a SRS slot period fails. In some cases, the SRS configuration may additionally or alternatively indicate a set of slot offsets for random selection by the UE 115-*b*. In some cases, the SRS configuration may additionally or alternatively indicate an initial SRS start time of an initial SRS slot period. Additionally or alternatively, the SRS configuration may indicate one or more of a cyclic prefix length or an aperiodic SRS configuration for skipping a configured SRS transmission.

At 625, the UE 115-*b* may optionally identify one or more extra SRS offset values for additional SRS transmission opportunities (e.g., in cases where the SRS configuration provides one or more extra slot offsets). In some cases, the one or more extra SRS offset values may be based on a randomly selected SRS offset value in accordance with the SRS configuration.

At 630, the UE may format the SRS transmission. In some cases, the UE may format the SRS transmission with a cyclic prefix length that is determined based on whether the SRS is to be transmitted within a COT of the base station or outside of the COT. At 640, the UE 115-*b* may transmit the SRS following a successful LBT procedure at 635. The base station 105-*b* may, at 645, monitor for SRS from the UE 115-*b* based on the SRS configuration.

Optionally, at 650, the base station 105-*b* may determine to trigger an aperiodic SRS. In some cases, the base station 105-*b* may make the determination based on a COT of the base station 105-*b* and a next SRS transmission time of the UE 115-*b*. In some cases, if the next SRS transmission time of the UE 115-*b* occurs outside of the COT, the base station 105-*b* may determine to trigger the aperiodic SRS, in order for the UE 115-*b* to make the transmission inside of the COT without having to contend for channel access using a longer LBT procedure according to the regular SRS transmission time. At 655, the base station 105-*b* may optionally transmit the aperiodic SRS trigger to the UE 115-*b*.

At 660, in cases where the base station 105-*b* transmits the aperiodic SRS, the UE 115-*b* may perform a LBT procedure. In some cases, the LBT procedure may be within the COT of the base station 105-*b*, and the UE 115-*b* may perform a one-shot LBT. In cases where the LBT passes, the UE 115-*b* may, at 665, transmit the aperiodic SRS to the base station 105-*b*.

At 670, in cases where the UE 115-*b* transmits an aperiodic SRS, the UE 115-*b* may determine to skip the subsequent SRS transmission of the SRS configuration based on the aperiodic SRS transmission. In some cases, the UE 115-*b* may determine to skip the subsequent SRS transmission based on the aperiodic SRS being within a predefined window prior to the subsequent SRS transmission (e.g., within a predetermined threshold value of a number of slots prior to the subsequent SRS transmission).

Figure 7:
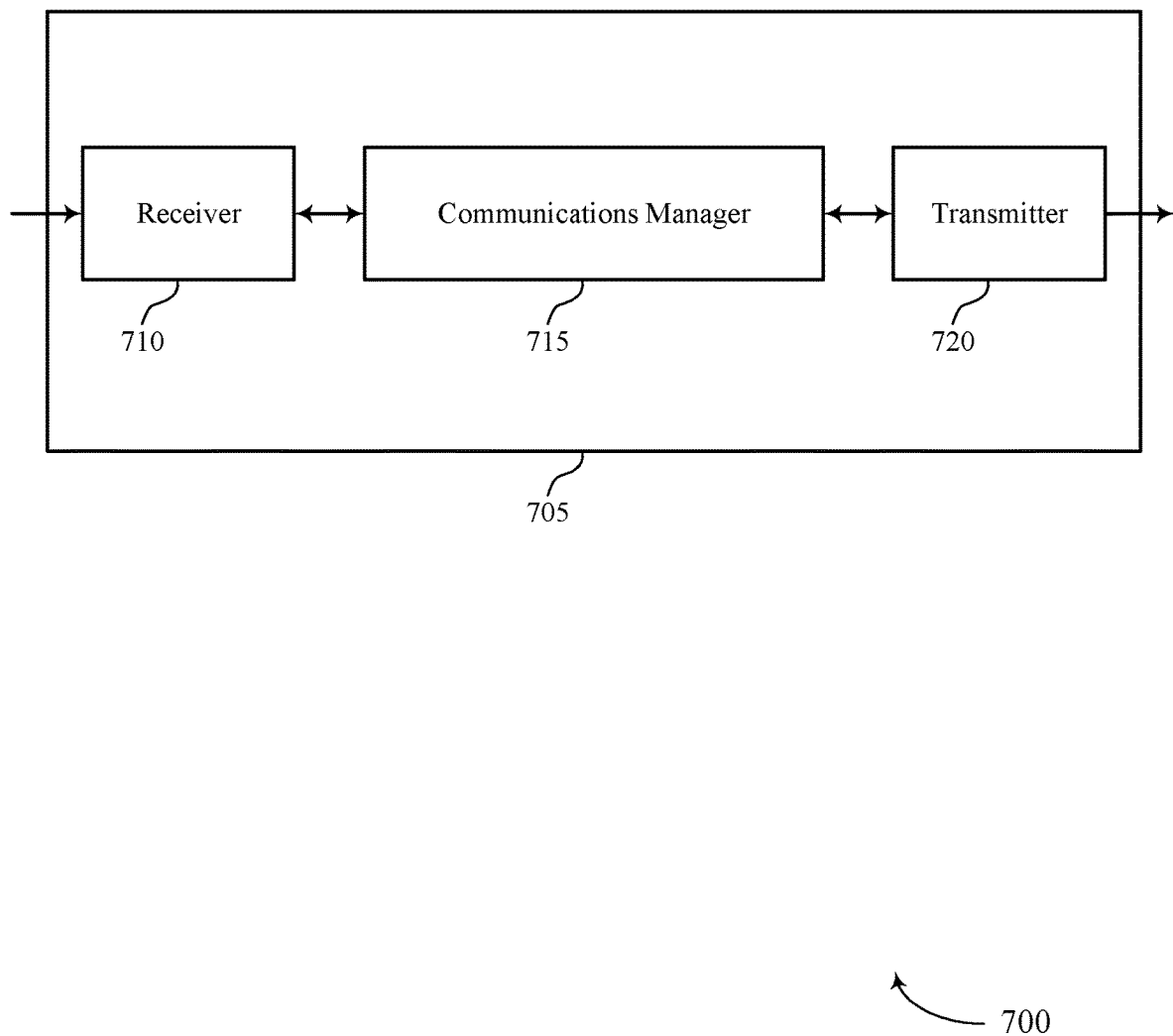
FIGS. 7 and 8 show block diagrams of devices that support techniques for managing sounding reference signal transmissions in shared radio frequency spectrum in accordance with aspects of the present disclosure.

FIG. 7 shows a block diagram 700 of a device 705 that supports techniques for managing sounding reference signal transmissions in shared radio frequency spectrum in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to techniques for managing sounding reference signal transmissions in shared radio frequency spectrum, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may identify a sounding reference signal configuration for transmission of one or more sounding reference signals to a base station, the sounding reference signal configuration providing periodic intervals for transmitting the one or more sounding reference signals, a first offset value from a starting time of each of the periodic intervals that indicates a first transmission time that is available for the one or more sounding reference signal transmissions, and at least a second offset value from the starting time of each of the periodic intervals or from the first transmission time that indicates a second transmission time within each of the periodic intervals that is available for sounding reference signal transmissions if a first listen-before-talk procedure for the first transmission time is unsuccessful, determine, based on the first listen-before-talk procedure for the first transmission time, that a wireless channel in a shared radio frequency spectrum band is unavailable for transmitting a first sounding reference signal at the first transmission time, and perform at least a second listen-before-talk procedure for at least the second transmission time to determine whether the wireless channel in the shared radio frequency spectrum band is available for transmitting the first sounding reference signal.

The communications manager 715 may also identify a sounding reference signal configuration for transmission of a sounding reference signal to a base station, the sounding reference signal configuration providing periodic intervals for transmissions of the sounding reference signal, determine, as a random selection from a set of available offset values, a first offset value from a starting time of each of the periodic intervals, where the first offset value indicates a first transmission time within each of the periodic intervals that is available for transmissions of the sounding reference signal, and transmit one or more sounding reference signals to the base station at the first transmission time within one or more of the periodic intervals based on the determining.

The communications manager 715 may also identify a sounding reference signal configuration for transmission of a sounding reference signal to a base station, the sounding reference signal configuration providing periodic intervals for sounding reference signal transmissions, an offset value from a starting time of each of the periodic intervals that indicates one or more times during each periodic interval that are available for the sounding reference signal transmissions, and an initial offset value from a starting time of an initial periodic interval for transmitting an initial sounding reference signal from the UE, determine a first transmission time within the initial periodic interval for transmitting the initial sounding reference signal based on the initial offset value, and transmit the initial sounding reference signal to the base station at the first transmission time responsive to a successful listen-before-talk procedure for the first transmission time.

The communications manager 715 may also identify a sounding reference signal configuration for sounding reference signal transmissions to a base station, the sounding reference signal configuration providing periodic intervals for the sounding reference signal transmissions, a first cyclic prefix length for the sounding reference signal transmissions that are within a channel occupancy time of the base station, and a second cyclic prefix length for the sounding reference signal transmissions that are outside of the channel occupancy time of the base station, determine a first transmission time for transmitting a first sounding reference signal based on the sounding reference signal configuration, determine, based on the sounding reference signal configuration, to use the first cyclic prefix length for the first sounding reference signal based on the first transmission time being within the channel occupancy time of the base station, or to use the second cyclic prefix length for the first sounding reference signal based on the first transmission time being outside of the channel occupancy time of the base station, and transmit the first sounding reference signal to the base station using the determined first cyclic prefix length or second cyclic prefix length responsive to a successful listen-before-talk procedure associated with the first transmission time.

The communications manager 715 may also identify a persistent or semi-persistent sounding reference signal configuration for sounding reference signal transmissions to a base station, the persistent or semi-persistent sounding reference signal configuration providing periodic intervals for persistent or semi-persistent sounding reference signal transmissions, transmit an aperiodic sounding reference signal to the base station based on a trigger for the aperiodic sounding reference signal, skip the transmitting of the first persistent or semi-persistent sounding reference signal during the first transmission time based on the transmission of the aperiodic sounding reference signal, and determine a first transmission time for transmitting a first persistent or semi-persistent sounding reference signal based on the persistent or semi-persistent sounding reference signal configuration. The communications manager 715 may be an example of aspects of the communications manager 1010 described herein.

The actions performed by the communications manager 715 as described herein may be implemented to realize one or more potential advantages. For example, some implementations may provide a UE with enhanced procedures that may enhance likelihood of successful LBT. Further, some implementations may provide additional opportunities within a SRS slot period for SRS transmission. Such techniques may provide more consistent and reliable transmission of a SRS which may help to maintain suitable transmission parameters for communications between the base station and UE, which may thus enhance system reliability and capacity.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
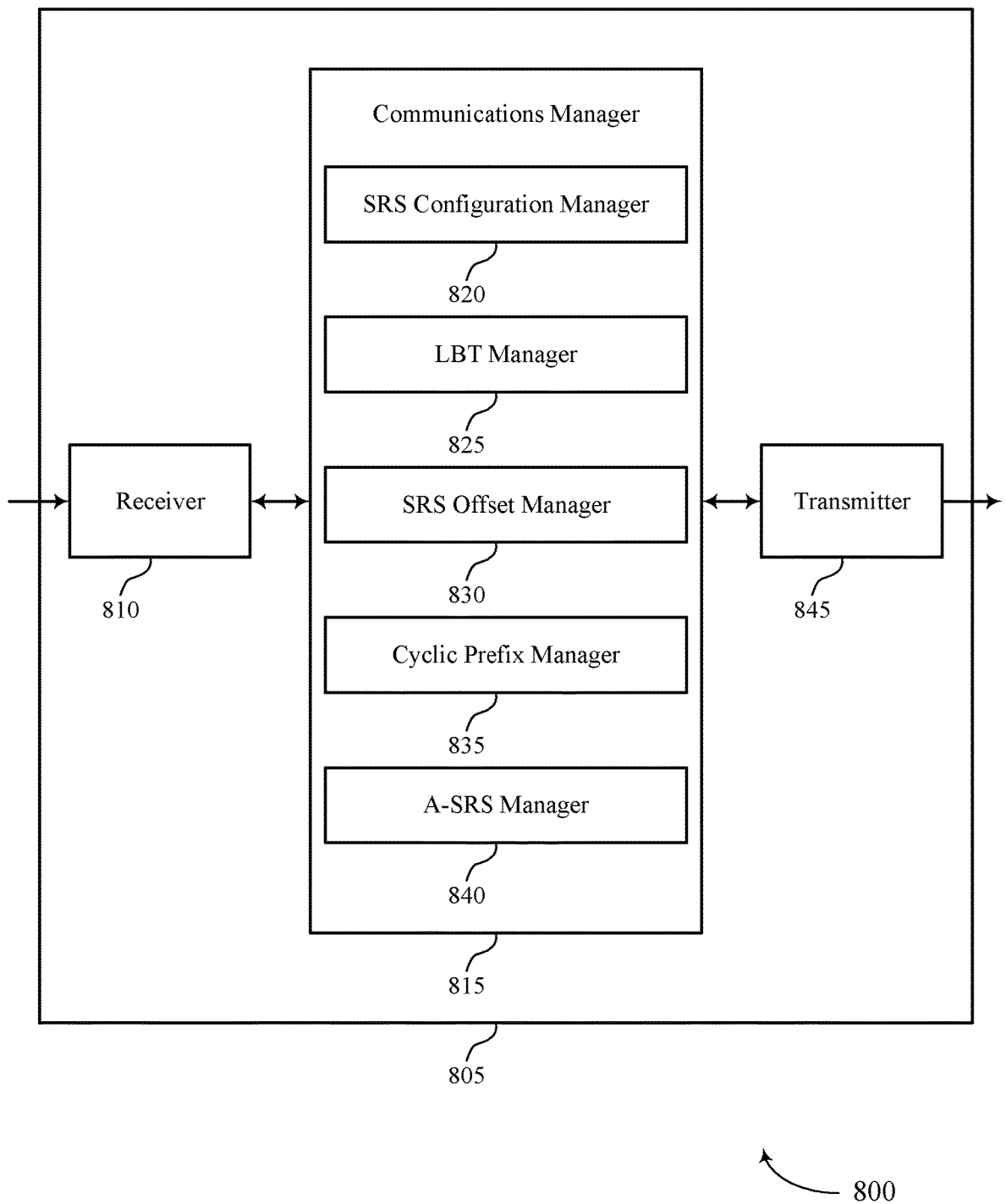

FIG. 8 shows a block diagram 800 of a device 805 that supports techniques for managing sounding reference signal transmissions in shared radio frequency spectrum in accordance with aspects of the present disclosure. The device 805 may be an example of aspects of a device 705, or a UE 115 as described herein. The device 805 may include a receiver 810, a communications manager 815, and a transmitter 845. The device 805 may also include a processor. Each of these components may be in communication with one another (e.g., via one or more buses).

The receiver 810 may receive information such as packets, user data, or control information associated with various information channels (e.g., control channels, data channels, and information related to techniques for managing sounding reference signal transmissions in shared radio frequency spectrum, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a SRS configuration manager 820, a LBT manager 825, a SRS offset manager 830, a cyclic prefix manager 835, and an A-SRS manager 840. The communications manager 815 may be an example of aspects of the communications manager 1010 described herein.

The SRS configuration manager 820 may identify a sounding reference signal configuration for transmission of one or more sounding reference signals to a base station, the sounding reference signal configuration providing periodic intervals for transmitting the one or more sounding reference signals, a first offset value from a starting time of each of the periodic intervals that indicates a first transmission time that is available for the one or more sounding reference signal transmissions, and at least a second offset value from the starting time of each of the periodic intervals or from the first transmission time that indicates a second transmission time within each of the periodic intervals that is available for sounding reference signal transmissions if a first listen-before-talk procedure for the first transmission time is unsuccessful.

The LBT manager 825 may determine, based on the first listen-before-talk procedure for the first transmission time, that a wireless channel in a shared radio frequency spectrum band is unavailable for transmitting a first sounding reference signal at the first transmission time and perform at least a second listen-before-talk procedure for at least the second transmission time to determine whether the wireless channel in the shared radio frequency spectrum band is available for transmitting the first sounding reference signal.

Additionally or alternatively, the SRS configuration manager 820 may identify a sounding reference signal configuration for transmission of a sounding reference signal to a base station, the sounding reference signal configuration providing periodic intervals for transmissions of the sounding reference signal. The SRS offset manager 830 may determine, as a random selection from a set of available offset values, a first offset value from a starting time of each of the periodic intervals, where the first offset value indicates a first transmission time within each of the periodic intervals that is available for transmissions of the sounding reference signal. The LBT manager 825 may transmit one or more sounding reference signals to the base station at the first transmission time within one or more of the periodic intervals based on the determining.

Additionally or alternatively, the SRS configuration manager 820 may identify a sounding reference signal configuration for transmission of a sounding reference signal to a base station, the sounding reference signal configuration providing periodic intervals for sounding reference signal transmissions, an offset value from a starting time of each of the periodic intervals that indicates one or more times during each periodic interval that are available for the sounding reference signal transmissions, and an initial offset value from a starting time of an initial periodic interval for transmitting an initial sounding reference signal from the UE. The SRS offset manager 830 may determine a first transmission time within the initial periodic interval for transmitting the initial sounding reference signal based on the initial offset value. The LBT manager 825 may transmit the initial sounding reference signal to the base station at the first transmission time responsive to a successful listen-before-talk procedure for the first transmission time.

Additionally or alternatively, the SRS configuration manager 820 may identify a sounding reference signal configuration for sounding reference signal transmissions to a base station, the sounding reference signal configuration providing periodic intervals for the sounding reference signal transmissions, a first cyclic prefix length for the sounding reference signal transmissions that are within a channel occupancy time of the base station, and a second cyclic prefix length for the sounding reference signal transmissions that are outside of the channel occupancy time of the base station. The SRS offset manager 830 may determine a first transmission time for transmitting a first sounding reference signal based on the sounding reference signal configuration. The cyclic prefix manager 835 may determine, based on the sounding reference signal configuration, to use the first cyclic prefix length for the first sounding reference signal based on the first transmission time being within the channel occupancy time of the base station, or to use the second cyclic prefix length for the first sounding reference signal based on the first transmission time being outside of the channel occupancy time of the base station. The LBT manager 825 may transmit the first sounding reference signal to the base station using the determined first cyclic prefix length or second cyclic prefix length responsive to a successful listen-before-talk procedure associated with the first transmission time.

Additionally or alternatively, the SRS configuration manager 820 may identify a persistent or semi-persistent sounding reference signal configuration for sounding reference signal transmissions to a base station, the persistent or semi-persistent sounding reference signal configuration providing periodic intervals for persistent or semi-persistent sounding reference signal transmissions. The A-SRS manager 840 may transmit an aperiodic sounding reference signal to the base station based on a trigger for the aperiodic sounding reference signal and skip the transmitting of the first persistent or semi-persistent sounding reference signal during the first transmission time based on the transmission of the aperiodic sounding reference signal. The SRS offset manager 830 may determine a first transmission time for transmitting a first persistent or semi-persistent sounding reference signal based on the persistent or semi-persistent sounding reference signal configuration.

The transmitter 845 may transmit signals generated by other components of the device 805. In some examples, the transmitter 845 may be collocated with a receiver 810 in a transceiver module. For example, the transmitter 845 may be an example of aspects of the transceiver 1020 described with reference to FIG. 10. The transmitter 845 may utilize a single antenna or a set of antennas.

Figure 9:
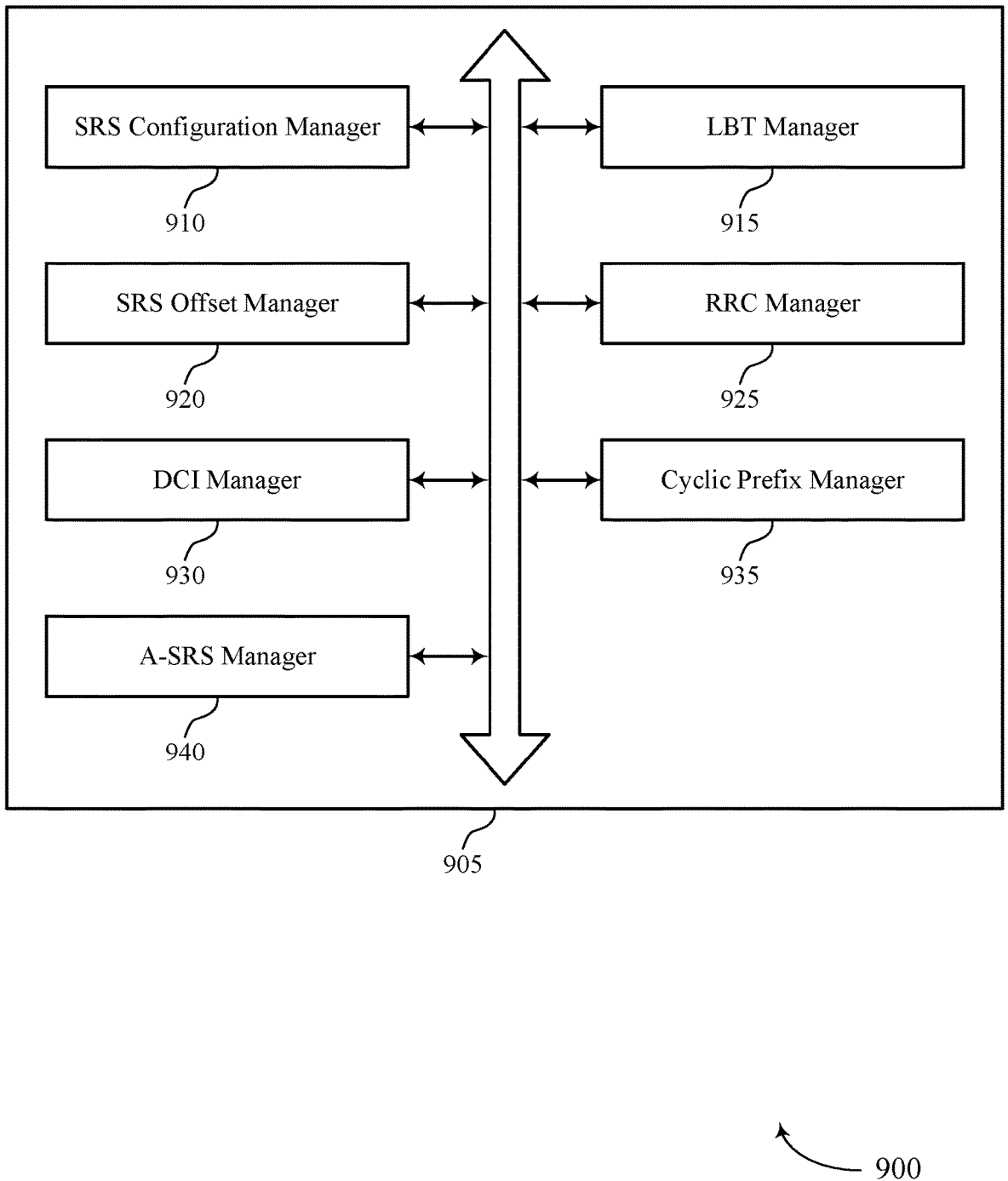
FIG. 9 shows a block diagram of a communications manager that supports techniques for managing sounding reference signal transmissions in shared radio frequency spectrum in accordance with aspects of the present disclosure.

FIG. 9 shows a block diagram 900 of a communications manager 905 that supports techniques for managing sounding reference signal transmissions in shared radio frequency spectrum in accordance with aspects of the present disclosure. The communications manager 905 may be an example of aspects of a communications manager 715, a communications manager 815, or a communications manager 1010 described herein. The communications manager 905 may include a SRS configuration manager 910, a LBT manager 915, a SRS offset manager 920, a RRC manager 925, a DCI manager 930, a cyclic prefix manager 935, and an A-SRS manager 940. Each of these modules may communicate, directly or indirectly, with one another (e.g., via one or more buses).

The SRS configuration manager 910 may identify a sounding reference signal configuration for transmission of one or more sounding reference signals to a base station, the sounding reference signal configuration providing periodic intervals for transmitting the one or more sounding reference signals, a first offset value from a starting time of each of the periodic intervals that indicates a first transmission time that is available for the one or more sounding reference signal transmissions, and at least a second offset value from the starting time of each of the periodic intervals or from the first transmission time that indicates a second transmission time within each of the periodic intervals that is available for sounding reference signal transmissions if a first listen-before-talk procedure for the first transmission time is unsuccessful.

In some examples, the SRS configuration manager 910 may identify a sounding reference signal configuration for transmission of a sounding reference signal to a base station, the sounding reference signal configuration providing periodic intervals for transmissions of the sounding reference signal.

In some examples, the SRS configuration manager 910 may identify a sounding reference signal configuration for transmission of a sounding reference signal to a base station, the sounding reference signal configuration providing periodic intervals for sounding reference signal transmissions, an offset value from a starting time of each of the periodic intervals that indicates one or more times during each periodic interval that are available for the sounding reference signal transmissions, and an initial offset value from a starting time of an initial periodic interval for transmitting an initial sounding reference signal from the UE.

In some examples, the SRS configuration manager 910 may identify a sounding reference signal configuration for sounding reference signal transmissions to a base station, the sounding reference signal configuration providing periodic intervals for the sounding reference signal transmissions, a first cyclic prefix length for the sounding reference signal transmissions that are within a channel occupancy time of the base station, and a second cyclic prefix length for the sounding reference signal transmissions that are outside of the channel occupancy time of the base station.

In some examples, the SRS configuration manager 910 may identify a persistent or semi-persistent sounding reference signal configuration for sounding reference signal transmissions to a base station, the persistent or semi-persistent sounding reference signal configuration providing periodic intervals for persistent or semi-persistent sounding reference signal transmissions.

In some cases, the sounding reference signal configuration further provides at least a second offset value that is added to the first offset value to determine at least a second transmission time within each of the periodic intervals that is available for transmissions of the sounding reference signal if a first listen-before-talk procedure for the first transmission time is unsuccessful.

In some cases, the sounding reference signal configuration further provides a frequency resource of a set of available frequency resources that are available for sounding reference signal transmissions, and where at least one other UE transmits a concurrent sounding reference signal in a different frequency resource of the set of available frequency resources during the first transmission time.

The LBT manager 915 may determine, based on the first listen-before-talk procedure for the first transmission time, that a wireless channel in a shared radio frequency spectrum band is unavailable for transmitting a first sounding reference signal at the first transmission time.

In some examples, the LBT manager 915 may perform at least a second listen-before-talk procedure for at least the second transmission time to determine whether the wireless channel in the shared radio frequency spectrum band is available for transmitting the first sounding reference signal.

In some examples, the LBT manager 915 may transmit one or more sounding reference signals to the base station at the first transmission time within one or more of the periodic intervals based on the determining.

In some examples, the LBT manager 915 may transmit the initial sounding reference signal to the base station at the first transmission time responsive to a successful listen-before-talk procedure for the first transmission time.

In some examples, the LBT manager 915 may transmit the first sounding reference signal to the base station using the determined first cyclic prefix length or second cyclic prefix length responsive to a successful listen-before-talk procedure associated with the first transmission time.

In some examples, the LBT manager 915 may transmit the first sounding reference signal at the second transmission time responsive to a successful second listen-before-talk procedure, or transmitting the first sounding reference signal at a third transmission time indicated by a third offset value responsive to an unsuccessful second listen-before-talk procedure.

In some cases, the listen-before-talk procedure applies to each of the initial sounding reference signal and uplink communications using the allocated resources. In some cases, a first listen-before-talk procedure is used for transmitting the first sounding reference signal when the first transmission time is within the channel occupancy time of the base station, and a second listen-before-talk procedure is used for transmitting the first sounding reference signal when the first transmission time is outside of the channel occupancy time of the base station, and where the first listen-before-talk procedure is shorter than the second listen-before-talk procedure. In some cases, the first listen-before-talk procedure is a one-shot listen-before-talk procedure, and the second listen-before-talk procedure is a category 4 listen-before-talk procedure.

The SRS offset manager 920 may determine, as a random selection from a set of available offset values, a first offset value from a starting time of each of the periodic intervals, where the first offset value indicates a first transmission time within each of the periodic intervals that is available for transmissions of the sounding reference signal.

In some examples, the SRS offset manager 920 may determine a first transmission time within the initial periodic interval for transmitting the initial sounding reference signal based on the initial offset value.

In some examples, the SRS offset manager 920 may determine a first transmission time for transmitting a first sounding reference signal based on the sounding reference signal configuration.

In some examples, the SRS offset manager 920 may determine a first transmission time for transmitting a first persistent or semi-persistent sounding reference signal based on the persistent or semi-persistent sounding reference signal configuration.

In some examples, the SRS offset manager 920 may receive a list of offsets from the base station that provides at least the second offset value and the third offset value, and where the second offset value and third offset value indicate time offsets relative to the first offset value. In some examples, the SRS offset manager 920 may identify, as part of the sounding reference signal configuration, a seed value for use in randomly selecting the first offset value from the set of available offset values, and where the seed value determines which offset value of the set of available offset values will be determined in the random selection.

In some cases, the periodic intervals correspond to sounding reference signal slot periods defined by a number of slots in each sounding reference signal slot period, where the first offset corresponds to a first number of slots from a starting slot of each sounding reference signal slot period, and where at least the second offset value corresponds to one or more additional slot offsets that identify additional slots within each of the sounding reference signal slot periods available for sounding reference signal transmissions.

In some cases, one of more of the first offset value or the second offset value is determined based on a random selection from a set of available offset values. In some cases, the seed value is received from the base station and is a same seed value as is provided to one or more other UEs in a group of UEs to provide that each UE in the group of UEs uses a same first offset value. In some cases, the seed value is determined based on one or more of a cell identification of the base station, a configured identification of the UE, a time index value, or any combinations thereof.

The cyclic prefix manager 935 may determine, based on the sounding reference signal configuration, to use the first cyclic prefix length for the first sounding reference signal based on the first transmission time being within the channel occupancy time of the base station, or to use the second cyclic prefix length for the first sounding reference signal based on the first transmission time being outside of the channel occupancy time of the base station. In some cases, the second cyclic prefix length is shorter than the first cyclic prefix length. In some cases, the first cyclic prefix length is determined based on a first difference between a duration of one or more symbols allocated to provide a first gap in communications before transmitting the first sounding reference signal and a maximum first listen-before-talk procedure duration, and where the second cyclic prefix length is determined based on a second difference between a duration of a number of symbols allocated to provide a second gap in communications before transmitting the first sounding reference signal and a maximum second listen-before-talk procedure duration.

The A-SRS manager 940 may transmit an aperiodic sounding reference signal to the base station based on a trigger for the aperiodic sounding reference signal.

In some examples, the A-SRS manager 940 may skip the transmitting of the first persistent or semi-persistent sounding reference signal during the first transmission time based on the transmission of the aperiodic sounding reference signal. In some cases, the persistent or semi-persistent sounding reference signal configuration further provides an aperiodic sounding reference signal resource set index, and where the skipping the transmitting of the first persistent or semi-persistent sounding reference signal is based on the aperiodic sounding reference signal being transmitted using resources identified in the aperiodic sounding reference signal resource set index.

In some cases, the persistent or semi-persistent sounding reference signal configuration further provides an aperiodic sounding reference signal widow, and where the skipping the transmitting of the first persistent or semi-persistent sounding reference signal is based on the aperiodic sounding reference signal being transmitted within the aperiodic sounding reference signal widow in advance of the first transmission time. In some cases, the aperiodic sounding reference signal widow corresponds to a predetermined number of slots ahead of a first slot associated with the first transmission time.

In some cases, the aperiodic sounding reference signal is within a channel occupancy time of the base station for a shared radio frequency spectrum band, and the first transmission time is outside of the channel occupancy time of the base station for the shared radio frequency spectrum band.

The RRC manager 925 may receive the sounding reference signal configuration from the base station in radio resource control signaling.

The DCI manager 930 may receive, from the base station, downlink control information that indicates allocated resources for one or more of an uplink shared channel transmission, an uplink control channel transmission, or any combinations thereof, and where a starting time of the allocated resources is aligned with the first transmission time.

Figure 10:
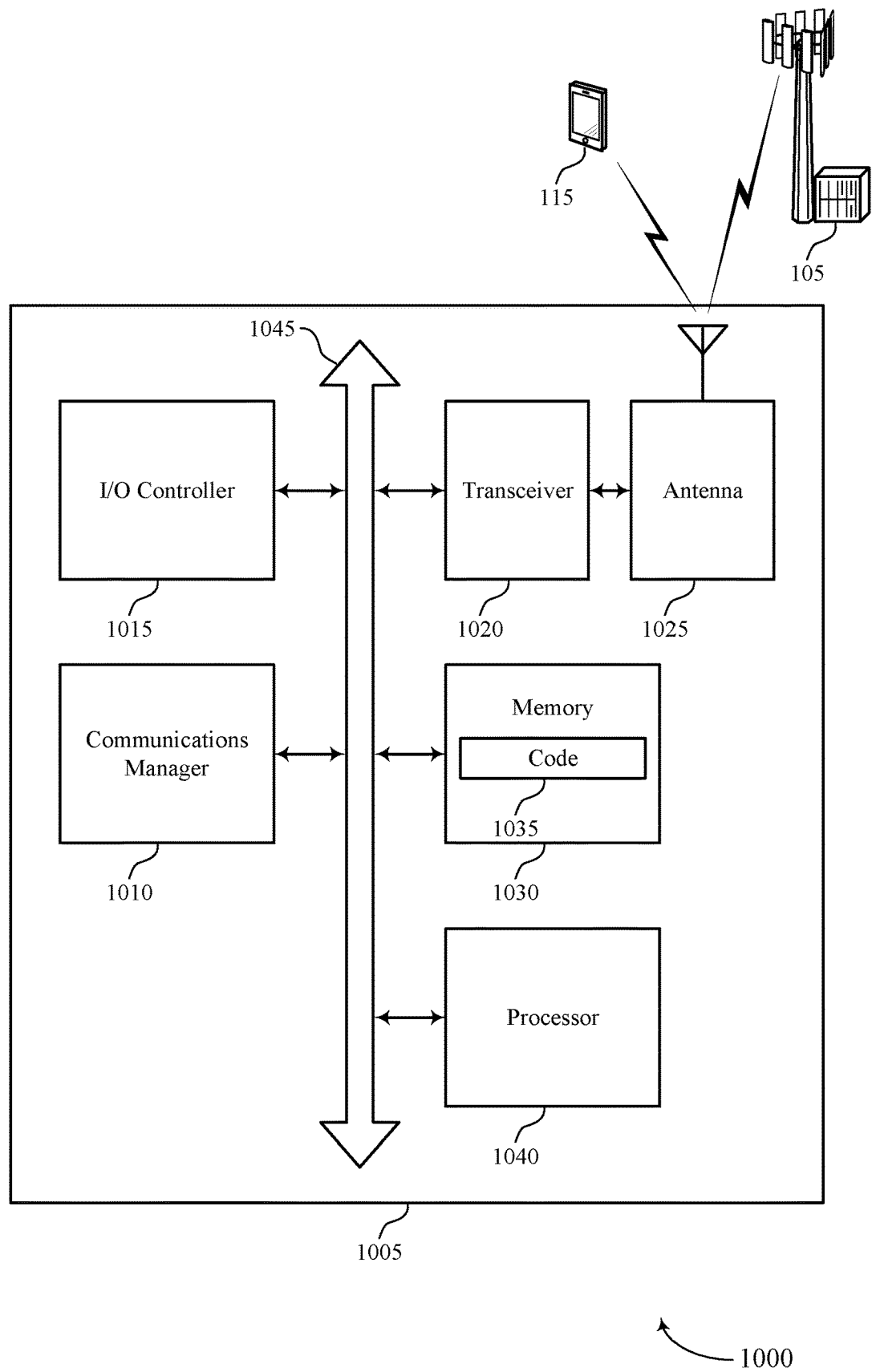
FIG. 10 shows a diagram of a system including a device that supports techniques for managing sounding reference signal transmissions in shared radio frequency spectrum in accordance with aspects of the present disclosure.

FIG. 10 shows a diagram of a system 1000 including a device 1005 that supports techniques for managing sounding reference signal transmissions in shared radio frequency spectrum in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may identify a sounding reference signal configuration for transmission of one or more sounding reference signals to a base station, the sounding reference signal configuration providing periodic intervals for transmitting the one or more sounding reference signals, a first offset value from a starting time of each of the periodic intervals that indicates a first transmission time that is available for the one or more sounding reference signal transmissions, and at least a second offset value from the starting time of each of the periodic intervals or from the first transmission time that indicates a second transmission time within each of the periodic intervals that is available for sounding reference signal transmissions if a first listen-before-talk procedure for the first transmission time is unsuccessful, determine, based on the first listen-before-talk procedure for the first transmission time, that a wireless channel in a shared radio frequency spectrum band is unavailable for transmitting a first sounding reference signal at the first transmission time, and perform at least a second listen-before-talk procedure for at least the second transmission time to determine whether the wireless channel in the shared radio frequency spectrum band is available for transmitting the first sounding reference signal.

The communications manager 1010 may also identify a sounding reference signal configuration for transmission of a sounding reference signal to a base station, the sounding reference signal configuration providing periodic intervals for transmissions of the sounding reference signal, determine, as a random selection from a set of available offset values, a first offset value from a starting time of each of the periodic intervals, where the first offset value indicates a first transmission time within each of the periodic intervals that is available for transmissions of the sounding reference signal, and transmit one or more sounding reference signals to the base station at the first transmission time within one or more of the periodic intervals based on the determining.

The communications manager 1010 may also identify a sounding reference signal configuration for transmission of a sounding reference signal to a base station, the sounding reference signal configuration providing periodic intervals for sounding reference signal transmissions, an offset value from a starting time of each of the periodic intervals that indicates one or more times during each periodic interval that are available for the sounding reference signal transmissions, and an initial offset value from a starting time of an initial periodic interval for transmitting an initial sounding reference signal from the UE, determine a first transmission time within the initial periodic interval for transmitting the initial sounding reference signal based on the initial offset value, and transmit the initial sounding reference signal to the base station at the first transmission time responsive to a successful listen-before-talk procedure for the first transmission time.

The communications manager 1010 may also identify a sounding reference signal configuration for sounding reference signal transmissions to a base station, the sounding reference signal configuration providing periodic intervals for the sounding reference signal transmissions, a first cyclic prefix length for the sounding reference signal transmissions that are within a channel occupancy time of the base station, and a second cyclic prefix length for the sounding reference signal transmissions that are outside of the channel occupancy time of the base station, determine a first transmission time for transmitting a first sounding reference signal based on the sounding reference signal configuration, determine, based on the sounding reference signal configuration, to use the first cyclic prefix length for the first sounding reference signal based on the first transmission time being within the channel occupancy time of the base station, or to use the second cyclic prefix length for the first sounding reference signal based on the first transmission time being outside of the channel occupancy time of the base station, and transmit the first sounding reference signal to the base station using the determined first cyclic prefix length or second cyclic prefix length responsive to a successful listen-before-talk procedure associated with the first transmission time.

The communications manager 1010 may also identify a persistent or semi-persistent sounding reference signal configuration for sounding reference signal transmissions to a base station, the persistent or semi-persistent sounding reference signal configuration providing periodic intervals for persistent or semi-persistent sounding reference signal transmissions, transmit an aperiodic sounding reference signal to the base station based on a trigger for the aperiodic sounding reference signal, skip the transmitting of the first persistent or semi-persistent sounding reference signal during the first transmission time based on the transmission of the aperiodic sounding reference signal, and determine a first transmission time for transmitting a first persistent or semi-persistent sounding reference signal based on the persistent or semi-persistent sounding reference signal configuration.

The actions performed by the communications manager 1010 as described herein may be implemented to realize one or more potential advantages. For example, some implementations may provide a UE with enhanced procedures that may enhance likelihood of successful LBT. Further, some implementations may provide additional opportunities within a SRS slot period for SRS transmission. Such techniques may provide more consistent and reliable transmission of a SRS which may help to maintain suitable transmission parameters for communications between the base station and UE, which may thus enhance system reliability and capacity.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for managing sounding reference signal transmissions in shared radio frequency spectrum).

The code 1035 may include instructions to implement aspects of the present disclosure, including instructions to support wireless communications. In some cases, the code 1035 may include instructions to implement the functions of FIGS. 15 to 19. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
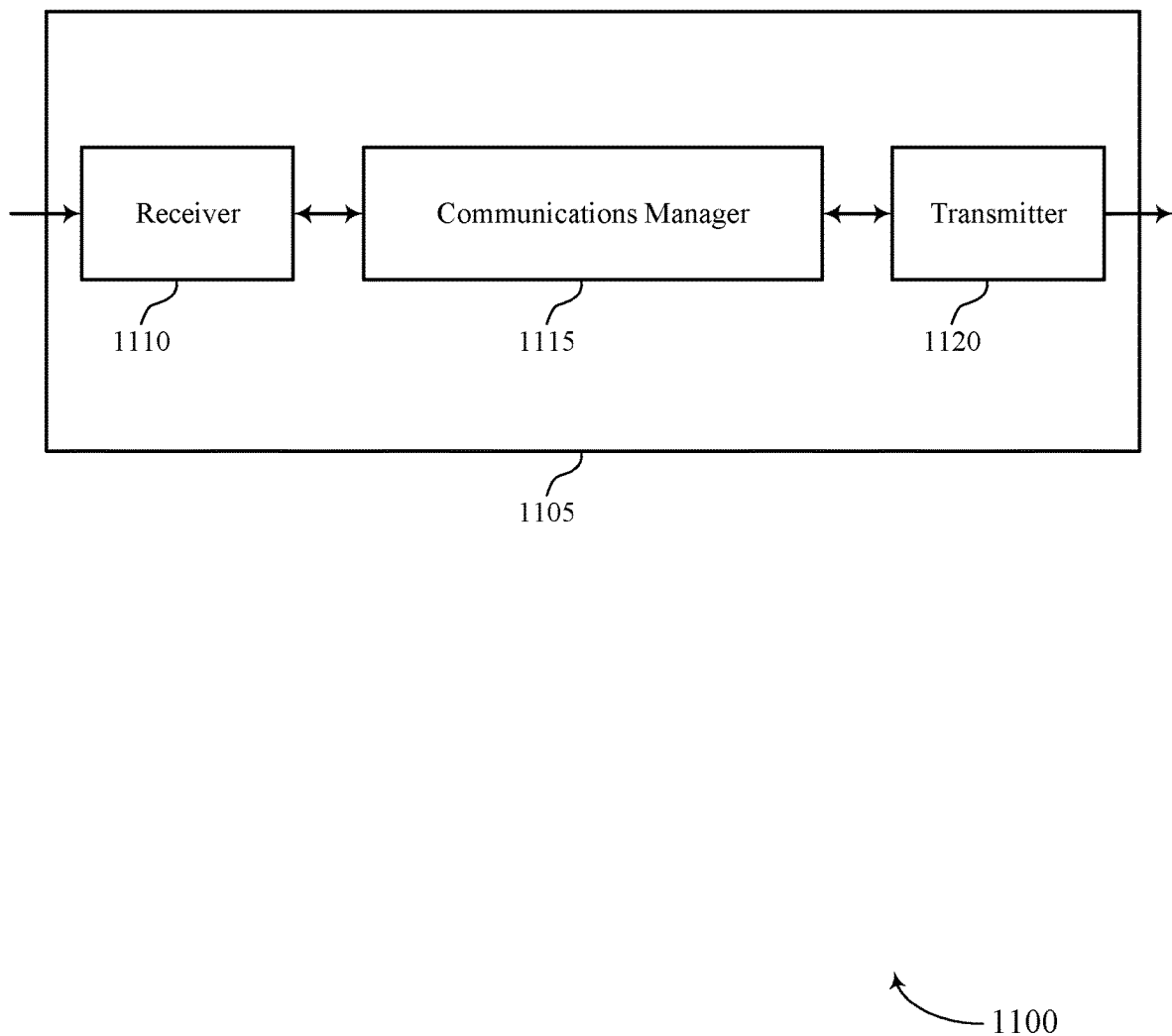
FIGS. 11 and 12 show block diagrams of devices that support techniques for managing sounding reference signal transmissions in shared radio frequency spectrum in accordance with aspects of the present disclosure.

FIG. 11 shows a block diagram 1100 of a device 1105 that supports techniques for managing sounding reference signal transmissions in shared radio frequency spectrum in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to techniques for managing sounding reference signal transmissions in shared radio frequency spectrum, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may identify a sounding reference signal configuration for receiving one or more sounding reference signals from a UE, the sounding reference signal configuration providing periodic intervals for sounding reference signal transmissions, a first offset value from a starting time of each periodic interval that indicates a first transmission time within each periodic interval that is available for the sounding reference signal transmissions, and at least a second offset value from the starting time of each of the periodic intervals or from the first transmission time that indicates a second transmission time within each periodic interval that is available for sounding reference signal transmissions if a first listen-before-talk procedure for the first transmission time is unsuccessful, monitor the first transmission time for a first sounding reference signal from the UE, and monitor, responsive to the first sounding reference signal being undetected during the first transmission time, at least the second transmission time for the first sounding reference signal from the UE.

The communications manager 1115 may also identify a sounding reference signal configuration for receiving a sounding reference signal from a UE, the sounding reference signal configuration providing periodic intervals for sounding reference signal transmissions, determine a first offset value as a random selection from a set of available offset values, where the first offset value indicates a first transmission time from a starting time of each of the periodic intervals that is available for sounding reference signal transmissions, and monitor for one or more sounding reference signal transmissions from the UE at the first transmission time within one or more of the periodic intervals based on the determining.

The communications manager 1115 may also identify a sounding reference signal configuration for receiving a sounding reference signal from a UE, the sounding reference signal configuration providing periodic intervals for sounding reference signal transmissions, an offset value from a starting time of each periodic interval that indicates one or more times during each periodic interval that are available for sounding reference signal transmissions, and an initial offset value from a starting time of an initial periodic interval for transmitting an initial sounding reference signal from the UE, determine a first transmission time within the initial periodic interval for receiving the initial sounding reference signal based on the initial offset value, and receive the initial sounding reference signal from the UE at the first transmission time.

The communications manager 1115 may also identify a sounding reference signal configuration for receiving a sounding reference signal from a user equipment, the sounding reference signal configuration providing periodic intervals for sounding reference signal transmissions, a first cyclic prefix length for sounding reference signal transmissions within a channel occupancy time of the base station, and a second cyclic prefix length for sounding reference signal transmissions outside of the channel occupancy time of the base station, transmit the sounding reference signal configuration to the UE, determine a first transmission time for receiving a first sounding reference signal based on the sounding reference signal configuration, and receive the first sounding reference signal during the first transmission time, where the first sounding reference signal uses the first cyclic prefix length when the first transmission time is within the channel occupancy time of the base station, or uses the second cyclic prefix length when the first transmission time is outside of the channel occupancy time of the base station.

The communications manager 1115 may also identify a persistent or semi-persistent sounding reference signal configuration for receiving a sounding reference signal from a UE, the persistent or semi-persistent sounding reference signal configuration providing periodic intervals for persistent or semi-persistent sounding reference signal transmissions, determine a first transmission time for a first persistent or semi-persistent sounding reference signal transmission from the UE based on the persistent or semi-persistent sounding reference signal configuration, transmit a trigger to the UE to transmit an aperiodic sounding reference signal prior to the first transmission time, and skip an attempt to receive the first persistent or semi-persistent sounding reference signal during the first transmission time based on the transmitting the trigger to the UE to transmit the aperiodic sounding reference signal. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
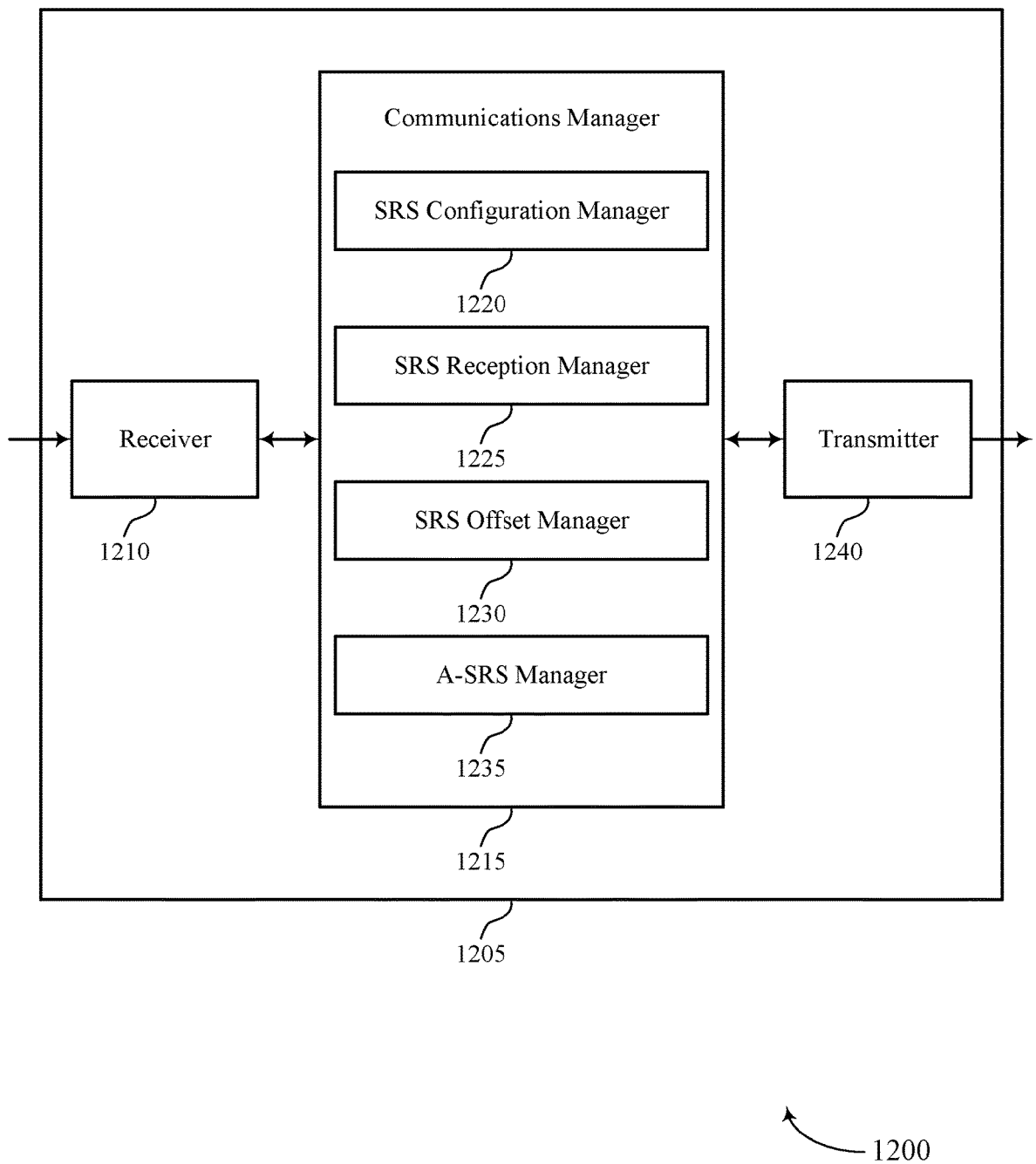

FIG. 12 shows a block diagram 1200 of a device 1205 that supports techniques for managing sounding reference signal transmissions in shared radio frequency spectrum in accordance with aspects of the present disclosure. The device 1205 may be an example of aspects of a device 1105, or a base station 105 as described herein. The device 1205 may include a receiver 1210, a communications manager 1215, and a transmitter 1240. The device 1205 may also include a processor. Each of these components may be in communication with one another (e.g., via one or more buses).

The receiver 1210 may receive information such as packets, user data, or control information associated with various information channels (e.g., control channels, data channels, and information related to techniques for managing sounding reference signal transmissions in shared radio frequency spectrum, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a SRS configuration manager 1220, a SRS reception manager 1225, a SRS offset manager 1230, and an A-SRS manager 1235. The communications manager 1215 may be an example of aspects of the communications manager 1410 described herein.

The SRS configuration manager 1220 may identify a sounding reference signal configuration for receiving one or more sounding reference signals from a UE, the sounding reference signal configuration providing periodic intervals for sounding reference signal transmissions, a first offset value from a starting time of each periodic interval that indicates a first transmission time within each periodic interval that is available for the sounding reference signal transmissions, and at least a second offset value from the starting time of each of the periodic intervals or from the first transmission time that indicates a second transmission time within each periodic interval that is available for sounding reference signal transmissions if a first listen-before-talk procedure for the first transmission time is unsuccessful.

The SRS reception manager 1225 may monitor the first transmission time for a first sounding reference signal from the UE and monitor, responsive to the first sounding reference signal being undetected during the first transmission time, at least the second transmission time for the first sounding reference signal from the UE.

Additionally or alternatively, the SRS configuration manager 1220 may identify a sounding reference signal configuration for receiving a sounding reference signal from a UE, the sounding reference signal configuration providing periodic intervals for sounding reference signal transmissions. The SRS offset manager 1230 may determine a first offset value as a random selection from a set of available offset values, where the first offset value indicates a first transmission time from a starting time of each of the periodic intervals that is available for sounding reference signal transmissions. The SRS reception manager 1225 may monitor for one or more sounding reference signal transmissions from the UE at the first transmission time within one or more of the periodic intervals based on the determining.

Additionally or alternatively, the SRS configuration manager 1220 may identify a sounding reference signal configuration for receiving a sounding reference signal from a UE, the sounding reference signal configuration providing periodic intervals for sounding reference signal transmissions, an offset value from a starting time of each periodic interval that indicates one or more times during each periodic interval that are available for sounding reference signal transmissions, and an initial offset value from a starting time of an initial periodic interval for transmitting an initial sounding reference signal from the UE. The SRS offset manager 1230 may determine a first transmission time within the initial periodic interval for receiving the initial sounding reference signal based on the initial offset value. The SRS reception manager 1225 may receive the initial sounding reference signal from the UE at the first transmission time.

Additionally or alternatively, the SRS configuration manager 1220 may identify a sounding reference signal configuration for receiving a sounding reference signal from a user equipment, the sounding reference signal configuration providing periodic intervals for sounding reference signal transmissions, a first cyclic prefix length for sounding reference signal transmissions within a channel occupancy time of the base station, and a second cyclic prefix length for sounding reference signal transmissions outside of the channel occupancy time of the base station and transmit the sounding reference signal configuration to the UE. The SRS offset manager 1230 may determine a first transmission time for receiving a first sounding reference signal based on the sounding reference signal configuration. The SRS reception manager 1225 may receive the first sounding reference signal during the first transmission time, where the first sounding reference signal uses the first cyclic prefix length when the first transmission time is within the channel occupancy time of the base station, or uses the second cyclic prefix length when the first transmission time is outside of the channel occupancy time of the base station.

Additionally or alternatively, the SRS configuration manager 1220 may identify a persistent or semi-persistent sounding reference signal configuration for receiving a sounding reference signal from a UE, the persistent or semi-persistent sounding reference signal configuration providing periodic intervals for persistent or semi-persistent sounding reference signal transmissions. The SRS offset manager 1230 may determine a first transmission time for a first persistent or semi-persistent sounding reference signal transmission from the UE based on the persistent or semi-persistent sounding reference signal configuration. The A-SRS manager 1235 may transmit a trigger to the UE to transmit an aperiodic sounding reference signal prior to the first transmission time and skip an attempt to receive the first persistent or semi-persistent sounding reference signal during the first transmission time based on the transmitting the trigger to the UE to transmit the aperiodic sounding reference signal.

The transmitter 1240 may transmit signals generated by other components of the device 1205. In some examples, the transmitter 1240 may be collocated with a receiver 1210 in a transceiver module. For example, the transmitter 1240 may be an example of aspects of the transceiver 1420 described with reference to FIG. 14. The transmitter 1240 may utilize a single antenna or a set of antennas.

Figure 13:
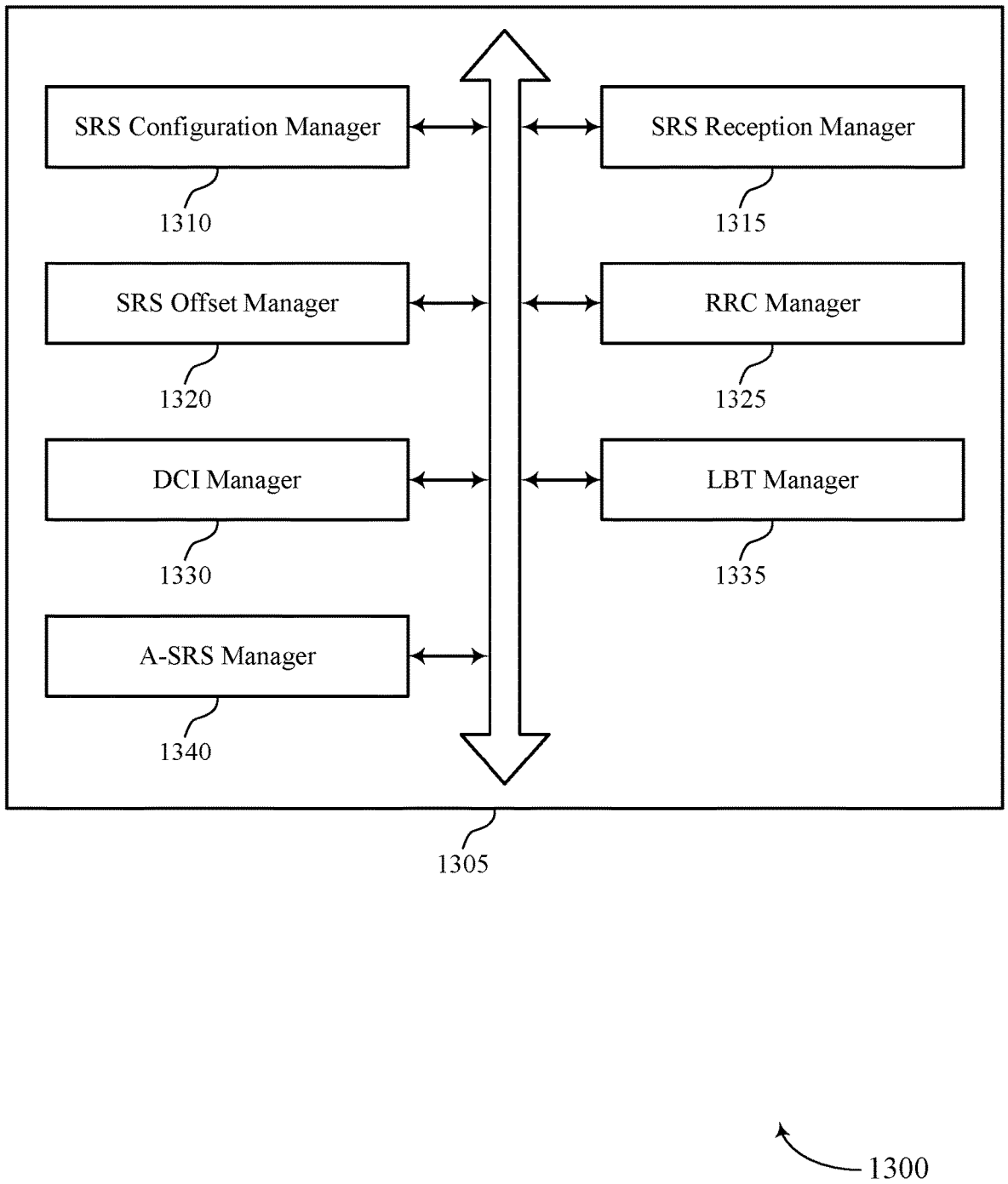
FIG. 13 shows a block diagram of a communications manager that supports techniques for managing sounding reference signal transmissions in shared radio frequency spectrum in accordance with aspects of the present disclosure.

FIG. 13 shows a block diagram 1300 of a communications manager 1305 that supports techniques for managing sounding reference signal transmissions in shared radio frequency spectrum in accordance with aspects of the present disclosure. The communications manager 1305 may be an example of aspects of a communications manager 1115, a communications manager 1215, or a communications manager 1410 described herein. The communications manager 1305 may include a SRS configuration manager 1310, a SRS reception manager 1315, a SRS offset manager 1320, a RRC manager 1325, a DCI manager 1330, a LBT manager 1335, and an A-SRS manager 1340. Each of these modules may communicate, directly or indirectly, with one another (e.g., via one or more buses).

The SRS configuration manager 1310 may identify a sounding reference signal configuration for receiving one or more sounding reference signals from a UE, the sounding reference signal configuration providing periodic intervals for sounding reference signal transmissions, a first offset value from a starting time of each periodic interval that indicates a first transmission time within each periodic interval that is available for the sounding reference signal transmissions, and at least a second offset value from the starting time of each of the periodic intervals or from the first transmission time that indicates a second transmission time within each periodic interval that is available for sounding reference signal transmissions if a first listen-before-talk procedure for the first transmission time is unsuccessful.

In some examples, the SRS configuration manager 1310 may identify a sounding reference signal configuration for receiving a sounding reference signal from a UE, the sounding reference signal configuration providing periodic intervals for sounding reference signal transmissions.

In some examples, the SRS configuration manager 1310 may identify a sounding reference signal configuration for receiving a sounding reference signal from a UE, the sounding reference signal configuration providing periodic intervals for sounding reference signal transmissions, an offset value from a starting time of each periodic interval that indicates one or more times during each periodic interval that are available for sounding reference signal transmissions, and an initial offset value from a starting time of an initial periodic interval for transmitting an initial sounding reference signal from the UE.

In some examples, the SRS configuration manager 1310 may identify a sounding reference signal configuration for receiving a sounding reference signal from a user equipment, the sounding reference signal configuration providing periodic intervals for sounding reference signal transmissions, a first cyclic prefix length for sounding reference signal transmissions within a channel occupancy time of the base station, and a second cyclic prefix length for sounding reference signal transmissions outside of the channel occupancy time of the base station.

In some examples, the SRS configuration manager 1310 may transmit the sounding reference signal configuration to the UE.

In some examples, the SRS configuration manager 1310 may identify a persistent or semi-persistent sounding reference signal configuration for receiving a sounding reference signal from a UE, the persistent or semi-persistent sounding reference signal configuration providing periodic intervals for persistent or semi-persistent sounding reference signal transmissions.

In some examples, the SRS configuration manager 1310 may provide the UE with a seed value for use in randomly selecting the first offset value from the set of available offset values, and where the seed value determines which offset value of the set of available offset values will be determined in the random selection. In some cases, the sounding reference signal configuration further provides a list of offsets that indicates at least the second offset value. In some cases, a same seed value is provided to each of a set of UEs in a group of UEs to provide that each UE in the group of UEs uses a same first offset value and transmits a sounding reference signal at the first transmission time within one or more of the periodic intervals. In some cases, the seed value is determined based on one or more of a cell identification of the base station, a configured identification of the UE, a time index value, or any combinations thereof.

In some cases, the sounding reference signal configuration further provides a frequency resource of a set of available frequency resources that are available for sounding reference signal transmissions, and where at least one other UE transmits a concurrent sounding reference signal in a different frequency resource of the set of available frequency resources during the first transmission time.

In some cases, the first cyclic prefix length is determined based on a first difference between a duration of one or more symbols allocated to provide a first gap in communications before transmitting the first sounding reference signal and a maximum first listen-before-talk procedure duration, and where the second cyclic prefix length is determined based on a second difference between a duration of a number of symbols allocated to provide a second gap in communications before transmitting the first sounding reference signal and a maximum second listen-before-talk procedure duration. In some cases, the second cyclic prefix length is shorter than the first cyclic prefix length.

The SRS reception manager 1315 may monitor the first transmission time for a first sounding reference signal from the UE. In some examples, the SRS reception manager 1315 may monitor, responsive to the first sounding reference signal being undetected during the first transmission time, at least the second transmission time for the first sounding reference signal from the UE.

In some examples, the SRS reception manager 1315 may monitor for one or more sounding reference signal transmissions from the UE at the first transmission time within one or more of the periodic intervals based on the determining. In some examples, the SRS reception manager 1315 may receive the initial sounding reference signal from the UE at the first transmission time.

In some examples, the SRS reception manager 1315 may receive the first sounding reference signal during the first transmission time, where the first sounding reference signal uses the first cyclic prefix length when the first transmission time is within the channel occupancy time of the base station, or uses the second cyclic prefix length when the first transmission time is outside of the channel occupancy time of the base station.

In some examples, the SRS reception manager 1315 may discontinue monitoring for the first sounding reference signal from the UE responsive to detecting the first sounding reference signal during one of the first transmission time or the second transmission time.

The SRS offset manager 1320 may determine a first offset value as a random selection from a set of available offset values, where the first offset value indicates a first transmission time from a starting time of each of the periodic intervals that is available for sounding reference signal transmissions.

In some examples, the SRS offset manager 1320 may determine a first transmission time within the initial periodic interval for receiving the initial sounding reference signal based on the initial offset value. In some examples, the SRS offset manager 1320 may determine a first transmission time for receiving a first sounding reference signal based on the sounding reference signal configuration. In some examples, the SRS offset manager 1320 may determine a first transmission time for a first persistent or semi-persistent sounding reference signal transmission from the UE based on the persistent or semi-persistent sounding reference signal configuration.

In some cases, the periodic intervals correspond to sounding reference signal slot periods defined by a number of slots in each sounding reference signal slot period, where the first offset value indicates a number of slots from a starting time of each periodic interval, and where at least the second offset value corresponds to one or more additional slot offsets that identify additional slots within the sounding reference signal slot period available for the sounding reference signal transmissions. In some cases, one of more of the first offset value or second offset value is determined based on a random selection from a set of available offset values.

In some cases, the sounding reference signal configuration further provides one or more additional offset values that are added to the first offset value to determine at least a second transmission time within each of the periodic intervals that is available for sounding reference signal transmissions if a first listen-before-talk procedure at the UE for the first transmission time is unsuccessful.

The A-SRS manager 1340 may transmit a trigger to the UE to transmit an aperiodic sounding reference signal prior to the first transmission time. In some examples, the A-SRS manager 1340 may skip an attempt to receive the first persistent or semi-persistent sounding reference signal during the first transmission time based on the transmitting the trigger to the UE to transmit the aperiodic sounding reference signal. In some cases, the persistent or semi-persistent sounding reference signal configuration further provides an aperiodic sounding reference signal resource set index, and where the skipping the attempt to receive the first persistent or semi-persistent sounding reference signal is based on the aperiodic sounding reference signal being transmitted using resources identified in the aperiodic sounding reference signal resource set index.

In some cases, the persistent or semi-persistent sounding reference signal configuration further provides an aperiodic sounding reference signal widow, and where the skipping the attempt to receive the first persistent or semi-persistent sounding reference signal is based on the aperiodic sounding reference signal being transmitted within the aperiodic sounding reference signal widow in advance of the first transmission time. In some cases, the aperiodic sounding reference signal widow corresponds to a predetermined number of slots ahead of a first slot associated with the first transmission time. In some cases, the aperiodic sounding reference signal is within a channel occupancy time of the base station for a shared radio frequency spectrum band, and the first transmission time is outside of the channel occupancy time of the base station for the shared radio frequency spectrum band.

The RRC manager 1325 may transmit the sounding reference signal configuration to the UE in radio resource control signaling.

The DCI manager 1330 may transmit, to the UE, downlink control information that indicates allocated resources for one or more of an uplink shared channel transmission, an uplink control channel transmission, or any combinations thereof, and where a starting time of the allocated resources is aligned with the first transmission time.

The LBT manager 1335 may manage contention-based channel access. In some cases, a first listen-before-talk procedure is used by the UE for transmitting the first sounding reference signal when the first transmission time is within the channel occupancy time of the base station, and a second listen-before-talk procedure is used by the UE for transmitting the first sounding reference signal when the first transmission time is outside of the channel occupancy time of the base station, and where the first listen-before-talk procedure is shorter than the second listen-before-talk procedure. In some cases, the first listen-before-talk procedure is a one-shot listen-before-talk procedure, and the second listen-before-talk procedure is a category 4 listen-before-talk procedure.

Figure 14:
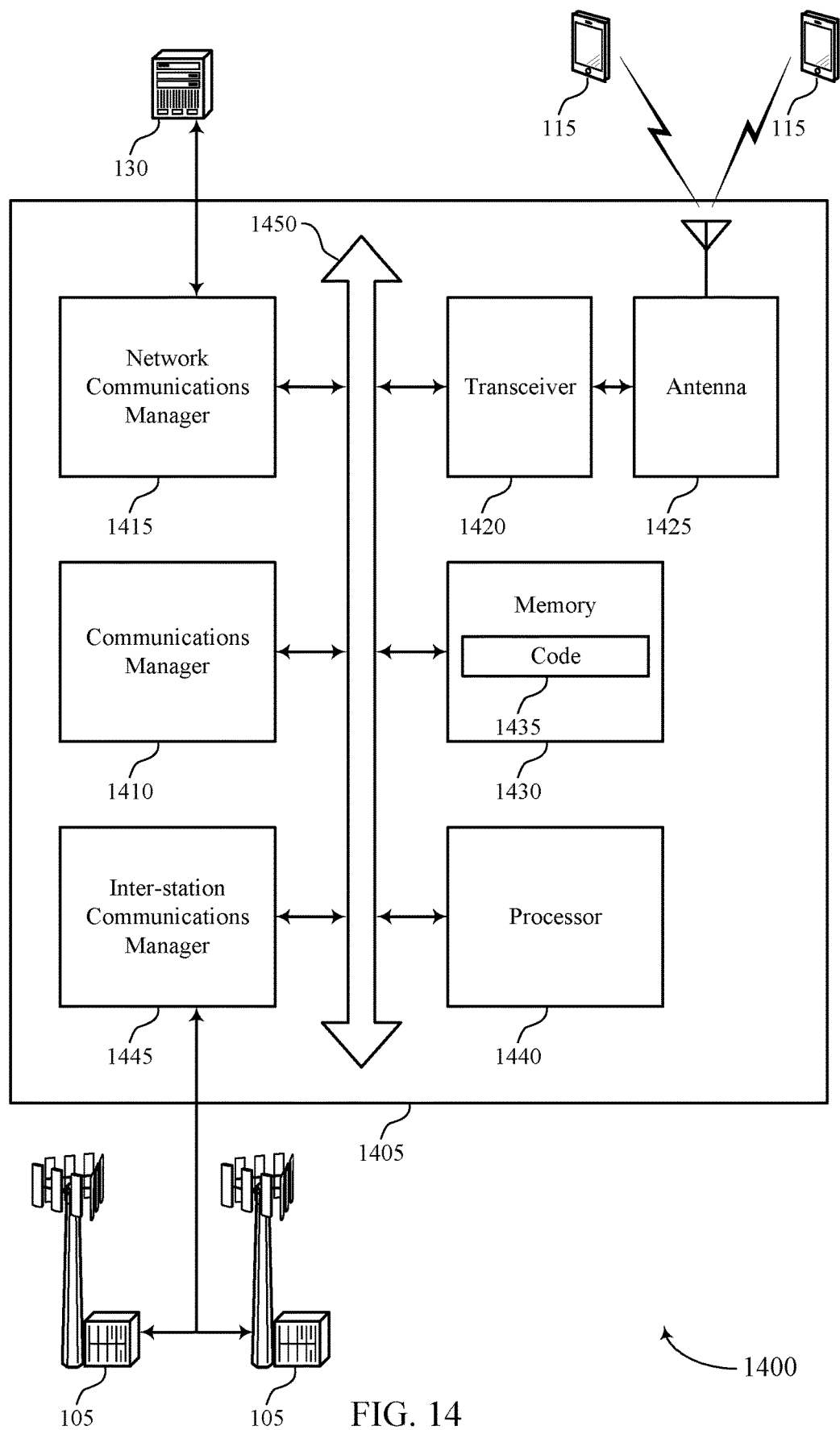
FIG. 14 shows a diagram of a system including a device that supports techniques for managing sounding reference signal transmissions in shared radio frequency spectrum in accordance with aspects of the present disclosure.

FIG. 14 shows a diagram of a system 1400 including a device 1405 that supports techniques for managing sounding reference signal transmissions in shared radio frequency spectrum in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may identify a sounding reference signal configuration for receiving one or more sounding reference signals from a UE, the sounding reference signal configuration providing periodic intervals for sounding reference signal transmissions, a first offset value from a starting time of each periodic interval that indicates a first transmission time within each periodic interval that is available for the sounding reference signal transmissions, and at least a second offset value from the starting time of each of the periodic intervals or from the first transmission time that indicates a second transmission time within each periodic interval that is available for sounding reference signal transmissions if a first listen-before-talk procedure for the first transmission time is unsuccessful, monitor the first transmission time for a first sounding reference signal from the UE, and monitor, responsive to the first sounding reference signal being undetected during the first transmission time, at least the second transmission time for the first sounding reference signal from the UE.

The communications manager 1410 may also identify a sounding reference signal configuration for receiving a sounding reference signal from a UE, the sounding reference signal configuration providing periodic intervals for sounding reference signal transmissions, determine a first offset value as a random selection from a set of available offset values, where the first offset value indicates a first transmission time from a starting time of each of the periodic intervals that is available for sounding reference signal transmissions, and monitor for one or more sounding reference signal transmissions from the UE at the first transmission time within one or more of the periodic intervals based on the determining.

The communications manager 1410 may also identify a sounding reference signal configuration for receiving a sounding reference signal from a UE, the sounding reference signal configuration providing periodic intervals for sounding reference signal transmissions, an offset value from a starting time of each periodic interval that indicates one or more times during each periodic interval that are available for sounding reference signal transmissions, and an initial offset value from a starting time of an initial periodic interval for transmitting an initial sounding reference signal from the UE, determine a first transmission time within the initial periodic interval for receiving the initial sounding reference signal based on the initial offset value, and receive the initial sounding reference signal from the UE at the first transmission time.

The communications manager 1410 may also identify a sounding reference signal configuration for receiving a sounding reference signal from a user equipment, the sounding reference signal configuration providing periodic intervals for sounding reference signal transmissions, a first cyclic prefix length for sounding reference signal transmissions within a channel occupancy time of the base station, and a second cyclic prefix length for sounding reference signal transmissions outside of the channel occupancy time of the base station, transmit the sounding reference signal configuration to the UE, determine a first transmission time for receiving a first sounding reference signal based on the sounding reference signal configuration, and receive the first sounding reference signal during the first transmission time, where the first sounding reference signal uses the first cyclic prefix length when the first transmission time is within the channel occupancy time of the base station, or uses the second cyclic prefix length when the first transmission time is outside of the channel occupancy time of the base station.

The communications manager 1410 may also identify a persistent or semi-persistent sounding reference signal configuration for receiving a sounding reference signal from a UE, the persistent or semi-persistent sounding reference signal configuration providing periodic intervals for persistent or semi-persistent sounding reference signal transmissions, determine a first transmission time for a first persistent or semi-persistent sounding reference signal transmission from the UE based on the persistent or semi-persistent sounding reference signal configuration, transmit a trigger to the UE to transmit an aperiodic sounding reference signal prior to the first transmission time, and skip an attempt to receive the first persistent or semi-persistent sounding reference signal during the first transmission time based on the transmitting the trigger to the UE to transmit the aperiodic sounding reference signal.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting techniques for managing sounding reference signal transmissions in shared radio frequency spectrum).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. In some cases, the code 1435 may include instructions to implement the functions of FIGS. 20 to 24. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
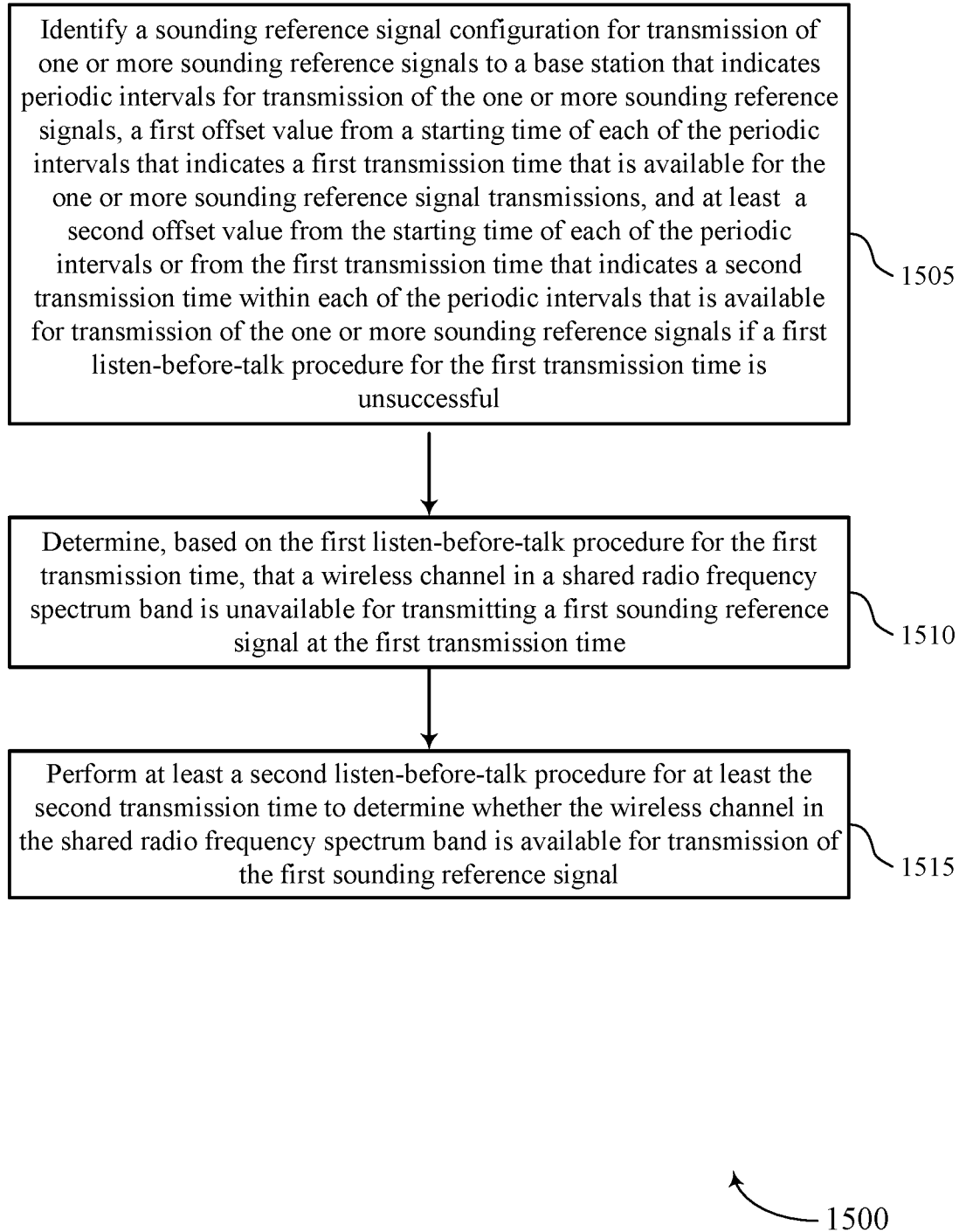
FIGS. 15 through 24 show flowcharts illustrating methods that support techniques for managing sounding reference signal transmissions in shared radio frequency spectrum in accordance with aspects of the present disclosure.

FIG. 15 shows a flowchart illustrating a method 1500 that supports techniques for managing sounding reference signal transmissions in shared radio frequency spectrum in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may identify a sounding reference signal configuration for transmission of one or more sounding reference signals to a base station that indicates periodic intervals for transmission of the one or more sounding reference signals, a first offset value from a starting time of each of the periodic intervals that indicates a first transmission time that is available for the one or more sounding reference signal transmissions, and at least a second offset value from the starting time of each of the periodic intervals or from the first transmission time that indicates a second transmission time within each of the periodic intervals that is available for sounding reference signal transmissions if a first listen-before-talk procedure for the first transmission time is unsuccessful. The operations of 1505 may be performed according to the methods described herein. In some examples, aspects of the operations of 1505 may be performed by a SRS configuration manager as described with reference to FIGS. 7 through 10.

At 1510, the UE may determine, based on the first listen-before-talk procedure for the first transmission time, that a wireless channel in a shared radio frequency spectrum band is unavailable for transmission of a first sounding reference signal at the first transmission time. The operations of 1510 may be performed according to the methods described herein. In some examples, aspects of the operations of 1510 may be performed by a LBT manager as described with reference to FIGS. 7 through 10.

At 1515, the UE may perform at least a second listen-before-talk procedure for at least the second transmission time to determine whether the wireless channel in the shared radio frequency spectrum band is available for transmission of the first sounding reference signal. The operations of 1515 may be performed according to the methods described herein. In some examples, aspects of the operations of 1515 may be performed by a LBT manager as described with reference to FIGS. 7 through 10.

Figure 16:
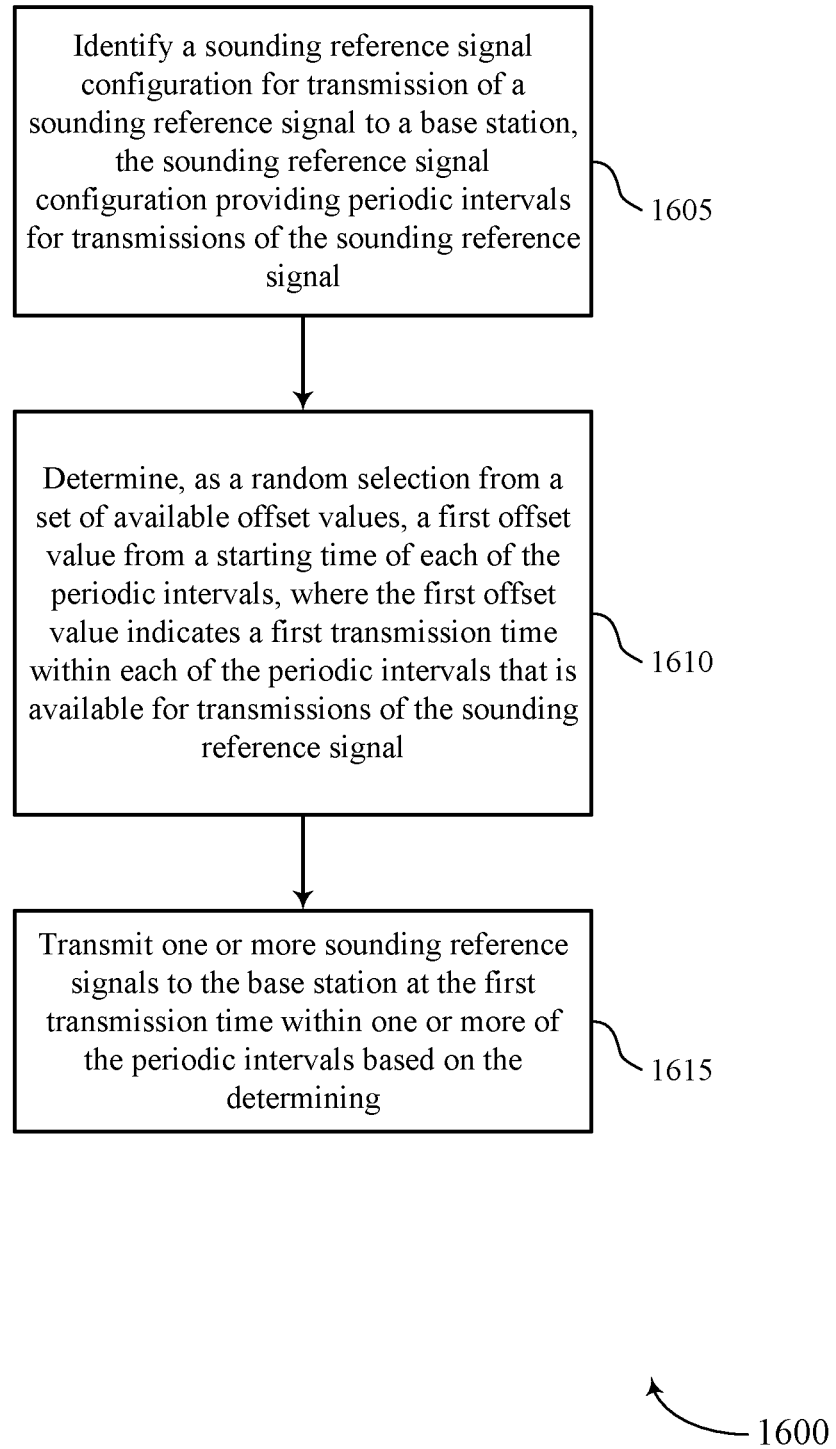

FIG. 16 shows a flowchart illustrating a method 1600 that supports techniques for managing sounding reference signal transmissions in shared radio frequency spectrum in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may identify a sounding reference signal configuration for transmission of a sounding reference signal to a base station, the sounding reference signal configuration providing periodic intervals for transmissions of the sounding reference signal. The operations of 1605 may be performed according to the methods described herein. In some examples, aspects of the operations of 1605 may be performed by a SRS configuration manager as described with reference to FIGS. 7 through 10.

At 1610, the UE may determine, as a random selection from a set of available offset values, a first offset value from a starting time of each of the periodic intervals, where the first offset value indicates a first transmission time within each of the periodic intervals that is available for transmissions of the sounding reference signal. The operations of 1610 may be performed according to the methods described herein. In some examples, aspects of the operations of 1610 may be performed by a SRS offset manager as described with reference to FIGS. 7 through 10.

At 1615, the UE may transmit one or more sounding reference signals to the base station at the first transmission time within one or more of the periodic intervals based on the determining. The operations of 1615 may be performed according to the methods described herein. In some examples, aspects of the operations of 1615 may be performed by a LBT manager as described with reference to FIGS. 7 through 10.

Figure 17:
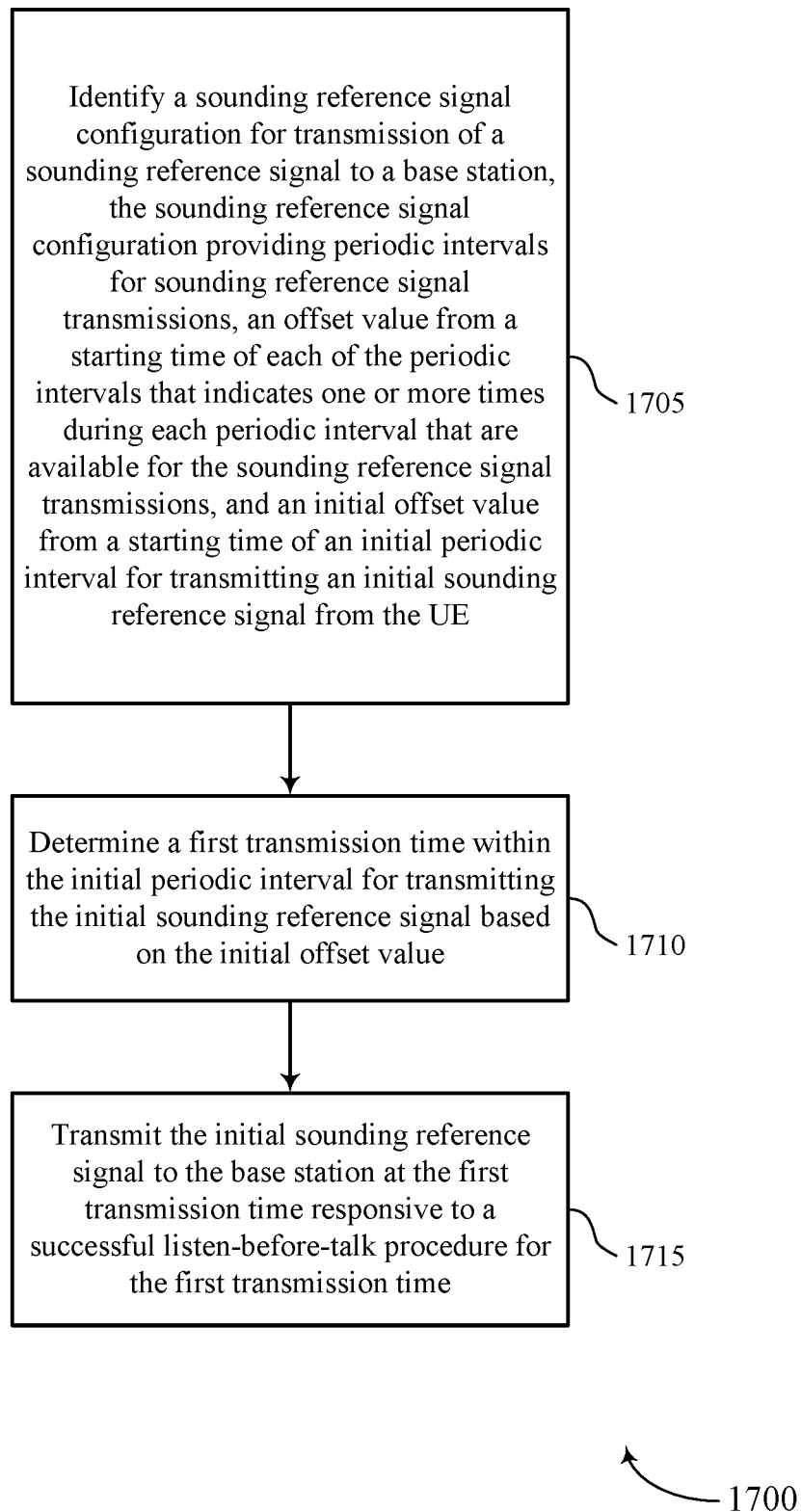

FIG. 17 shows a flowchart illustrating a method 1700 that supports techniques for managing sounding reference signal transmissions in shared radio frequency spectrum in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may identify a sounding reference signal configuration for transmission of a sounding reference signal to a base station, the sounding reference signal configuration providing periodic intervals for sounding reference signal transmissions, an offset value from a starting time of each of the periodic intervals that indicates one or more times during each periodic interval that are available for the sounding reference signal transmissions, and an initial offset value from a starting time of an initial periodic interval for transmitting an initial sounding reference signal from the UE. The operations of 1705 may be performed according to the methods described herein. In some examples, aspects of the operations of 1705 may be performed by a SRS configuration manager as described with reference to FIGS. 7 through 10.

At 1710, the UE may determine a first transmission time within the initial periodic interval for transmitting the initial sounding reference signal based on the initial offset value. The operations of 1710 may be performed according to the methods described herein. In some examples, aspects of the operations of 1710 may be performed by a SRS offset manager as described with reference to FIGS. 7 through 10.

At 1715, the UE may transmit the initial sounding reference signal to the base station at the first transmission time responsive to a successful listen-before-talk procedure for the first transmission time. The operations of 1715 may be performed according to the methods described herein. In some examples, aspects of the operations of 1715 may be performed by a LBT manager as described with reference to FIGS. 7 through 10.

Figure 18:
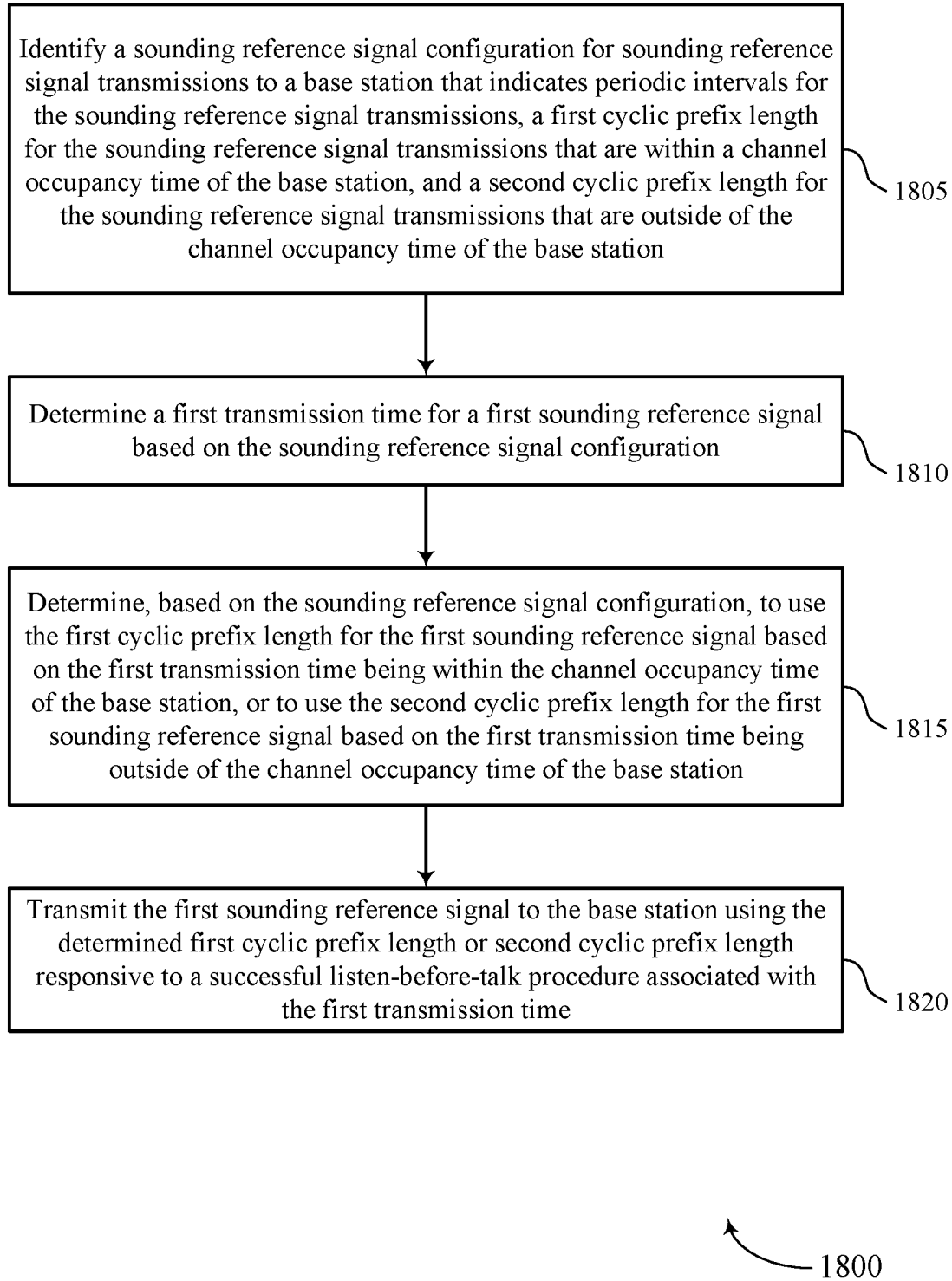

FIG. 18 shows a flowchart illustrating a method 1800 that supports techniques for managing sounding reference signal transmissions in shared radio frequency spectrum in accordance with aspects of the present disclosure. The operations of method 1800 may be implemented by a UE 115 or its components as described herein. For example, the operations of method 1800 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1805, the UE may identify a sounding reference signal configuration for sounding reference signal transmissions to a base station that indicates periodic intervals for the sounding reference signal transmissions, a first cyclic prefix length for the sounding reference signal transmissions that are within a channel occupancy time of the base station, and a second cyclic prefix length for the sounding reference signal transmissions that are outside of the channel occupancy time of the base station. The operations of 1805 may be performed according to the methods described herein. In some examples, aspects of the operations of 1805 may be performed by a SRS configuration manager as described with reference to FIGS. 7 through 10.

At 1810, the UE may determine a first transmission time for transmission of a first sounding reference signal based on the sounding reference signal configuration. The operations of 1810 may be performed according to the methods described herein. In some examples, aspects of the operations of 1810 may be performed by a SRS offset manager as described with reference to FIGS. 7 through 10.

At 1815, the UE may determine, based on the sounding reference signal configuration, to use the first cyclic prefix length for the first sounding reference signal based on the first transmission time being within the channel occupancy time of the base station, or to use the second cyclic prefix length for the first sounding reference signal based on the first transmission time being outside of the channel occupancy time of the base station. The operations of 1815 may be performed according to the methods described herein. In some examples, aspects of the operations of 1815 may be performed by a cyclic prefix manager as described with reference to FIGS. 7 through 10.

At 1820, the UE may transmit the first sounding reference signal to the base station using the determined first cyclic prefix length or second cyclic prefix length responsive to a successful listen-before-talk procedure associated with the first transmission time. The operations of 1820 may be performed according to the methods described herein. In some examples, aspects of the operations of 1820 may be performed by a LBT manager as described with reference to FIGS. 7 through 10.

Figure 19:
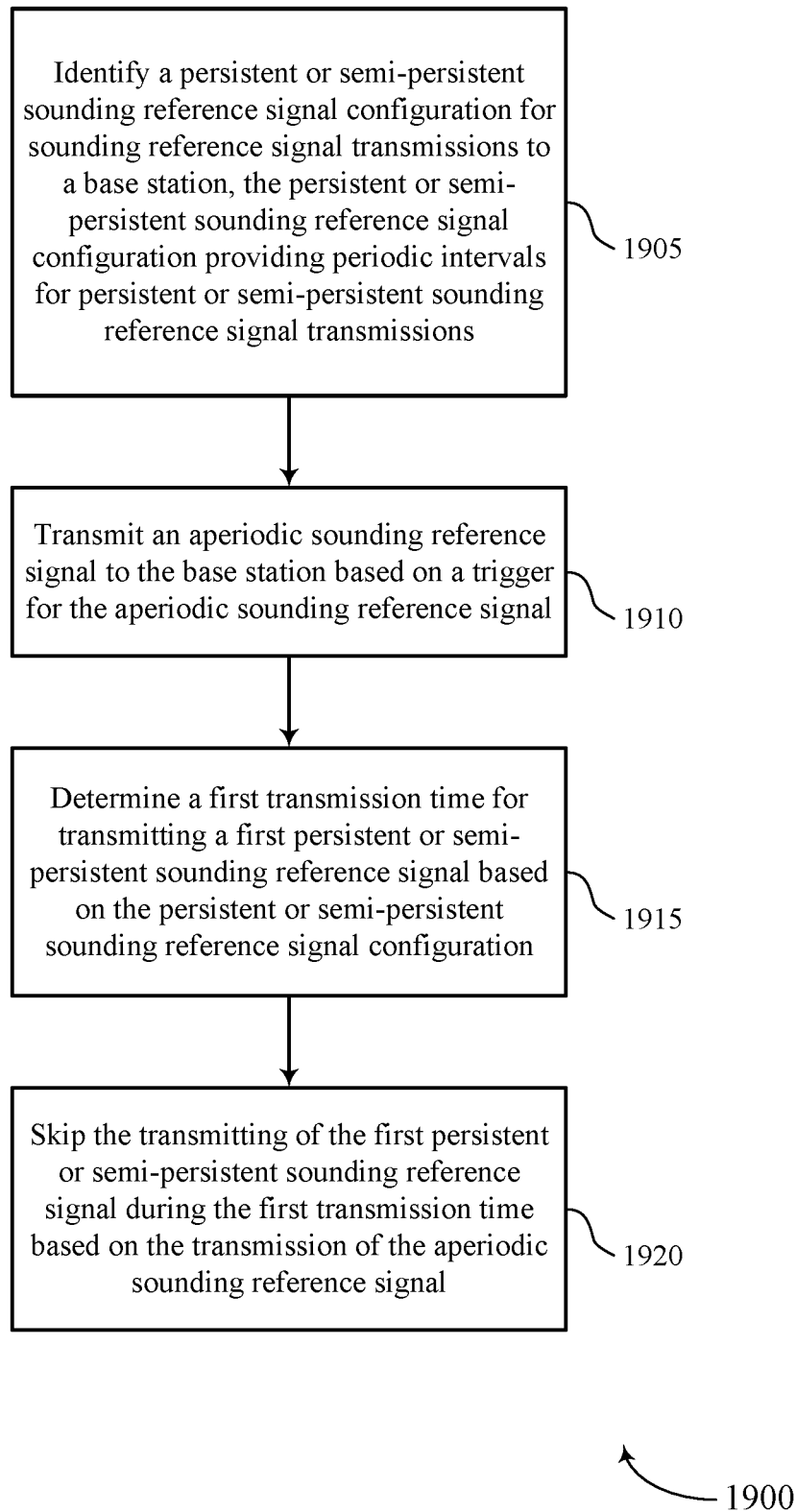

FIG. 19 shows a flowchart illustrating a method 1900 that supports techniques for managing sounding reference signal transmissions in shared radio frequency spectrum in accordance with aspects of the present disclosure. The operations of method 1900 may be implemented by a UE 115 or its components as described herein. For example, the operations of method 1900 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1905, the UE may identify a persistent or semi-persistent sounding reference signal configuration for sounding reference signal transmissions to a base station, the persistent or semi-persistent sounding reference signal configuration providing periodic intervals for persistent or semi-persistent sounding reference signal transmissions. The operations of 1905 may be performed according to the methods described herein. In some examples, aspects of the operations of 1905 may be performed by a SRS configuration manager as described with reference to FIGS. 7 through 10.

At 1910, the UE may transmit an aperiodic sounding reference signal to the base station based on a trigger for the aperiodic sounding reference signal. The operations of 1910 may be performed according to the methods described herein. In some examples, aspects of the operations of 1910 may be performed by an A-SRS manager as described with reference to FIGS. 7 through 10.

At 1915, the UE may determine a first transmission time for transmitting a first persistent or semi-persistent sounding reference signal based on the persistent or semi-persistent sounding reference signal configuration. The operations of 1915 may be performed according to the methods described herein. In some examples, aspects of the operations of 1915 may be performed by a SRS offset manager as described with reference to FIGS. 7 through 10.

At 1920, the UE may skip the transmitting of the first persistent or semi-persistent sounding reference signal during the first transmission time based on the transmission of the aperiodic sounding reference signal. The operations of 1920 may be performed according to the methods described herein. In some examples, aspects of the operations of 1920 may be performed by an A-SRS manager as described with reference to FIGS. 7 through 10.

Figure 20:
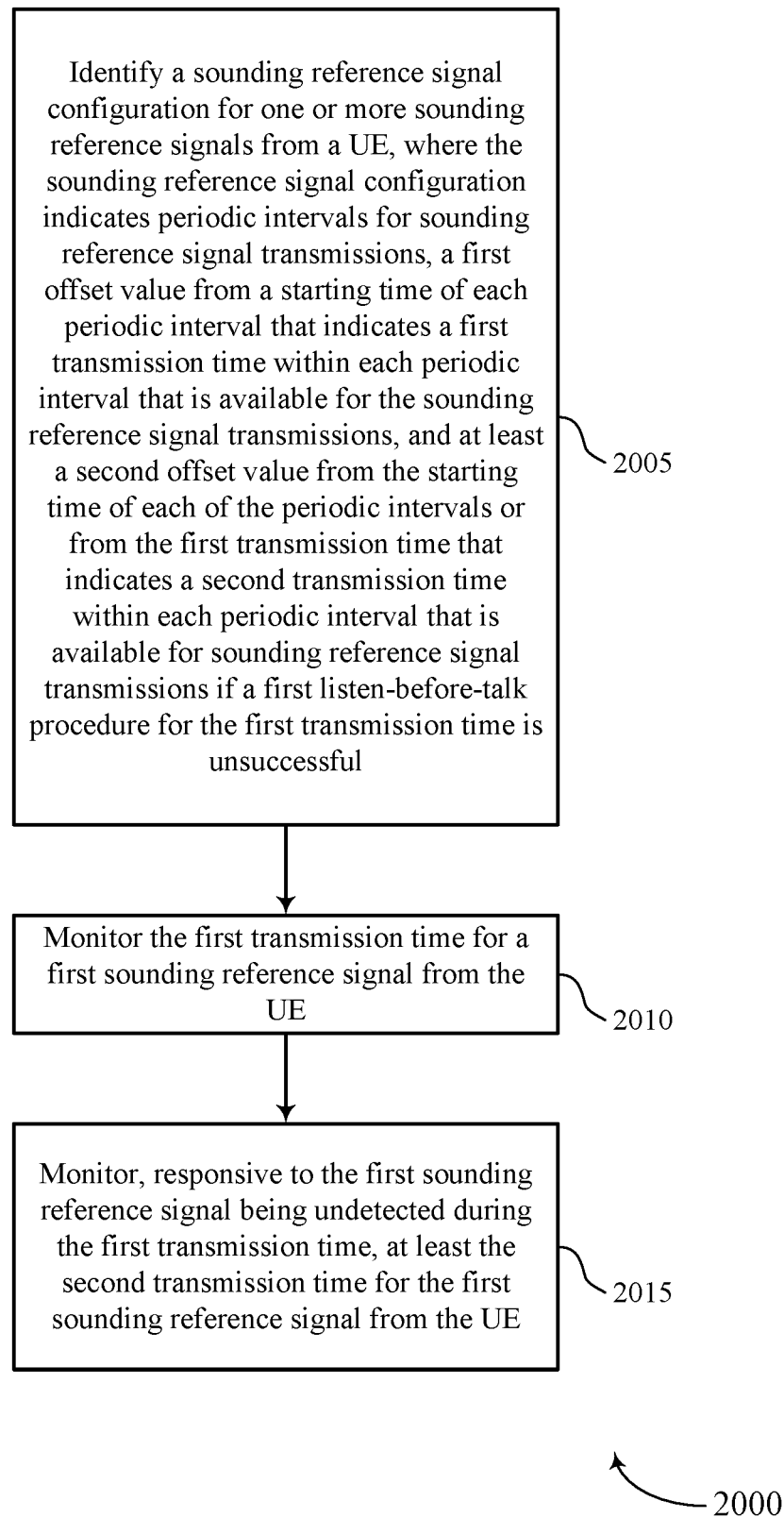

FIG. 20 shows a flowchart illustrating a method 2000 that supports techniques for managing sounding reference signal transmissions in shared radio frequency spectrum in accordance with aspects of the present disclosure. The operations of method 2000 may be implemented by a base station 105 or its components as described herein. For example, the operations of method 2000 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2005, the base station may identify a sounding reference signal configuration for one or more sounding reference signals from a UE, where the sounding reference signal configuration indicates periodic intervals for sounding reference signal transmissions, a first offset value from a starting time of each periodic interval that indicates a first transmission time within each periodic interval that is available for the sounding reference signal transmissions, and at least a second offset value from the starting time of each of the periodic intervals or from the first transmission time that indicates a second transmission time within each periodic interval that is available for sounding reference signal transmissions if a first listen-before-talk procedure for the first transmission time is unsuccessful. The operations of 2005 may be performed according to the methods described herein. In some examples, aspects of the operations of 2005 may be performed by a SRS configuration manager as described with reference to FIGS. 11 through 14.

At 2010, the base station may monitor the first transmission time for a first sounding reference signal from the UE. The operations of 2010 may be performed according to the methods described herein. In some examples, aspects of the operations of 2010 may be performed by a SRS reception manager as described with reference to FIGS. 11 through 14.

At 2015, the base station may monitor, responsive to the first sounding reference signal being undetected during the first transmission time, at least the second transmission time for the first sounding reference signal from the UE. The operations of 2015 may be performed according to the methods described herein. In some examples, aspects of the operations of 2015 may be performed by a SRS reception manager as described with reference to FIGS. 11 through 14.

Figure 21:
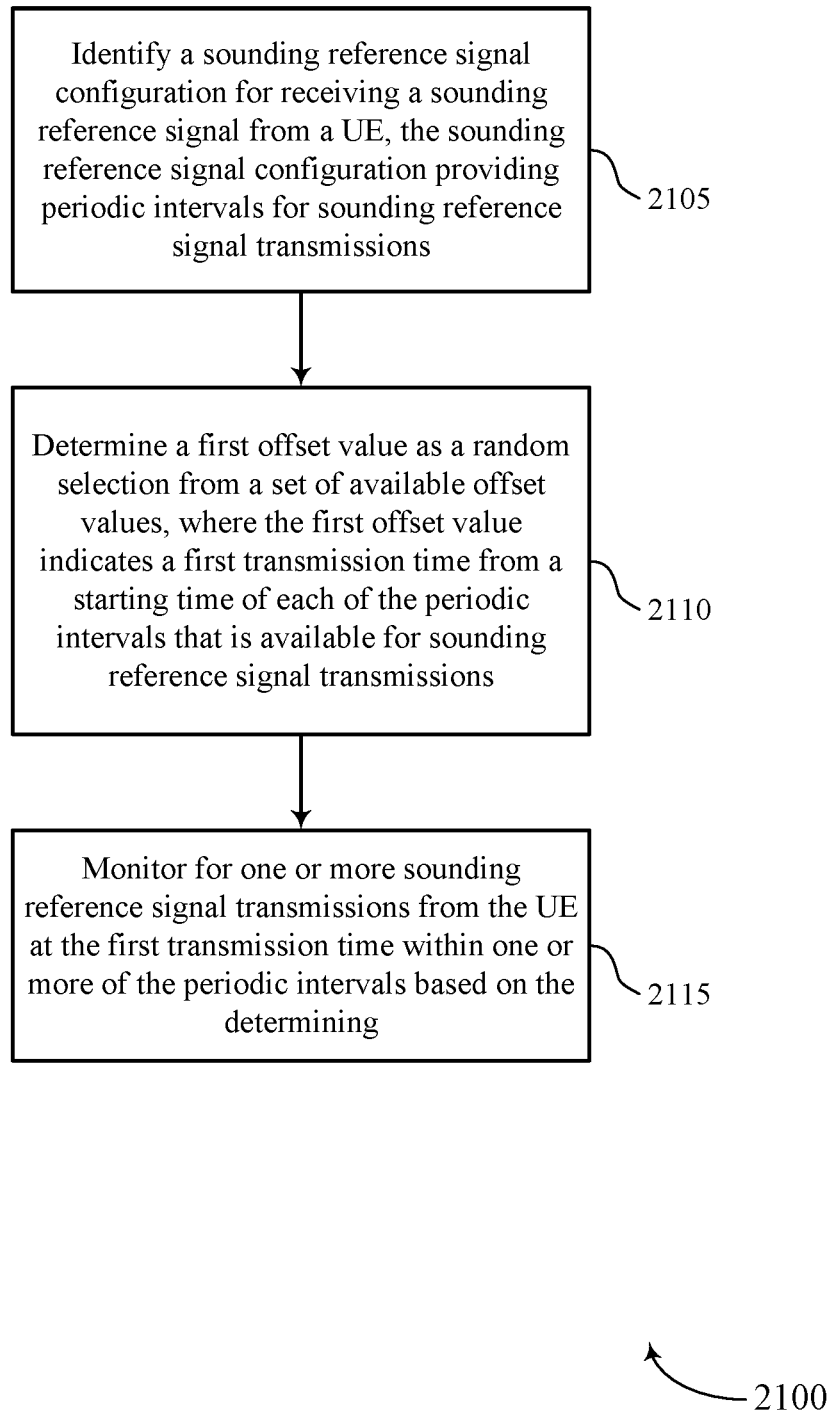

FIG. 21 shows a flowchart illustrating a method 2100 that supports techniques for managing sounding reference signal transmissions in shared radio frequency spectrum in accordance with aspects of the present disclosure. The operations of method 2100 may be implemented by a base station 105 or its components as described herein. For example, the operations of method 2100 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2105, the base station may identify a sounding reference signal configuration for receiving a sounding reference signal from a UE, the sounding reference signal configuration providing periodic intervals for sounding reference signal transmissions. The operations of 2105 may be performed according to the methods described herein. In some examples, aspects of the operations of 2105 may be performed by a SRS configuration manager as described with reference to FIGS. 11 through 14.

At 2110, the base station may determine a first offset value as a random selection from a set of available offset values, where the first offset value indicates a first transmission time from a starting time of each of the periodic intervals that is available for sounding reference signal transmissions. The operations of 2110 may be performed according to the methods described herein. In some examples, aspects of the operations of 2110 may be performed by a SRS offset manager as described with reference to FIGS. 11 through 14.

At 2115, the base station may monitor for one or more sounding reference signal transmissions from the UE at the first transmission time within one or more of the periodic intervals based on the determining. The operations of 2115 may be performed according to the methods described herein. In some examples, aspects of the operations of 2115 may be performed by a SRS reception manager as described with reference to FIGS. 11 through 14.

Figure 22:
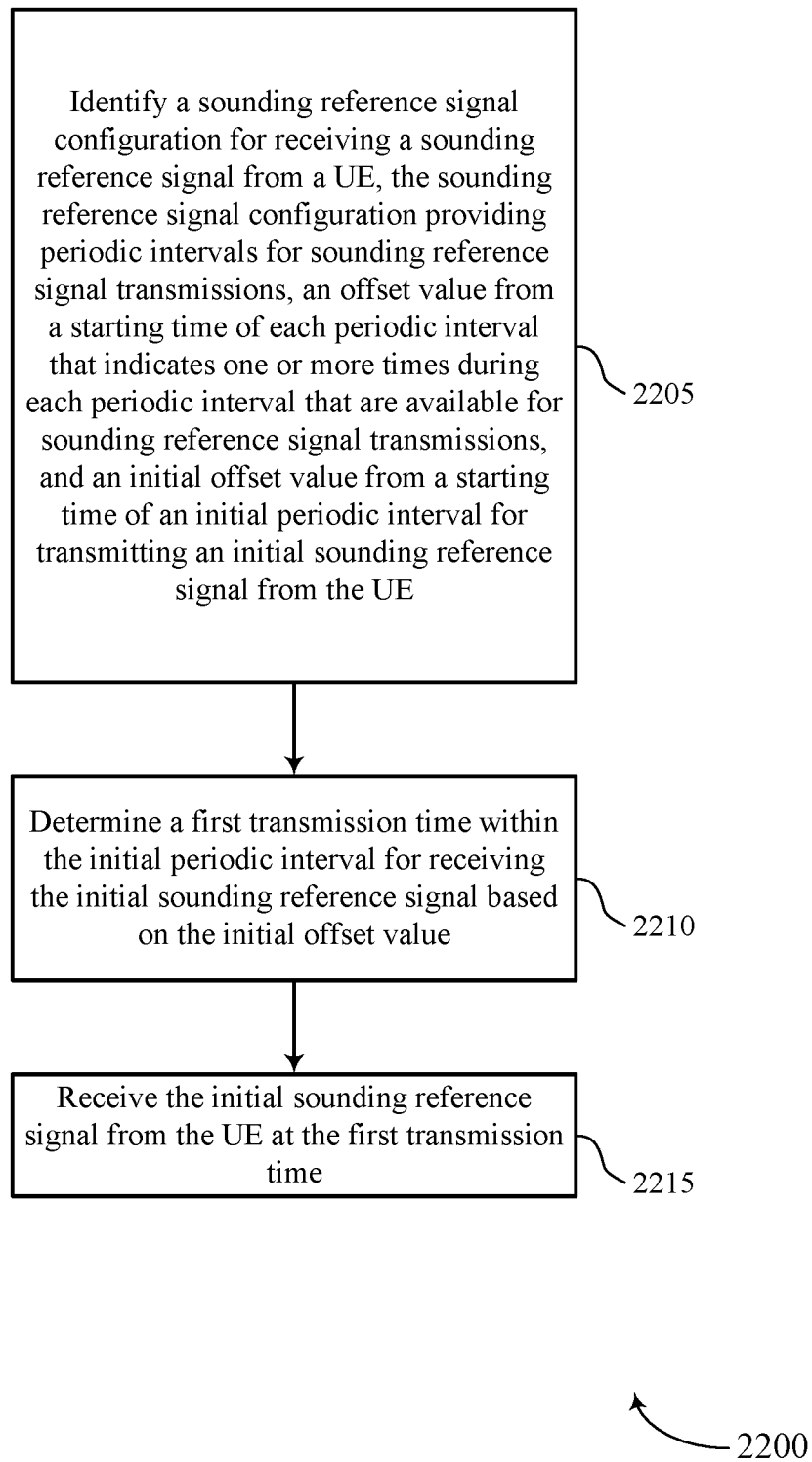

FIG. 22 shows a flowchart illustrating a method 2200 that supports techniques for managing sounding reference signal transmissions in shared radio frequency spectrum in accordance with aspects of the present disclosure. The operations of method 2200 may be implemented by a base station 105 or its components as described herein. For example, the operations of method 2200 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2205, the base station may identify a sounding reference signal configuration for receiving a sounding reference signal from a UE, the sounding reference signal configuration providing periodic intervals for sounding reference signal transmissions, an offset value from a starting time of each periodic interval that indicates one or more times during each periodic interval that are available for sounding reference signal transmissions, and an initial offset value from a starting time of an initial periodic interval for transmitting an initial sounding reference signal from the UE. The operations of 2205 may be performed according to the methods described herein. In some examples, aspects of the operations of 2205 may be performed by a SRS configuration manager as described with reference to FIGS. 11 through 14.

At 2210, the base station may determine a first transmission time within the initial periodic interval for receiving the initial sounding reference signal based on the initial offset value. The operations of 2210 may be performed according to the methods described herein. In some examples, aspects of the operations of 2210 may be performed by a SRS offset manager as described with reference to FIGS. 11 through 14.

At 2215, the base station may receive the initial sounding reference signal from the UE at the first transmission time. The operations of 2215 may be performed according to the methods described herein. In some examples, aspects of the operations of 2215 may be performed by a SRS reception manager as described with reference to FIGS. 11 through 14.

Figure 23:
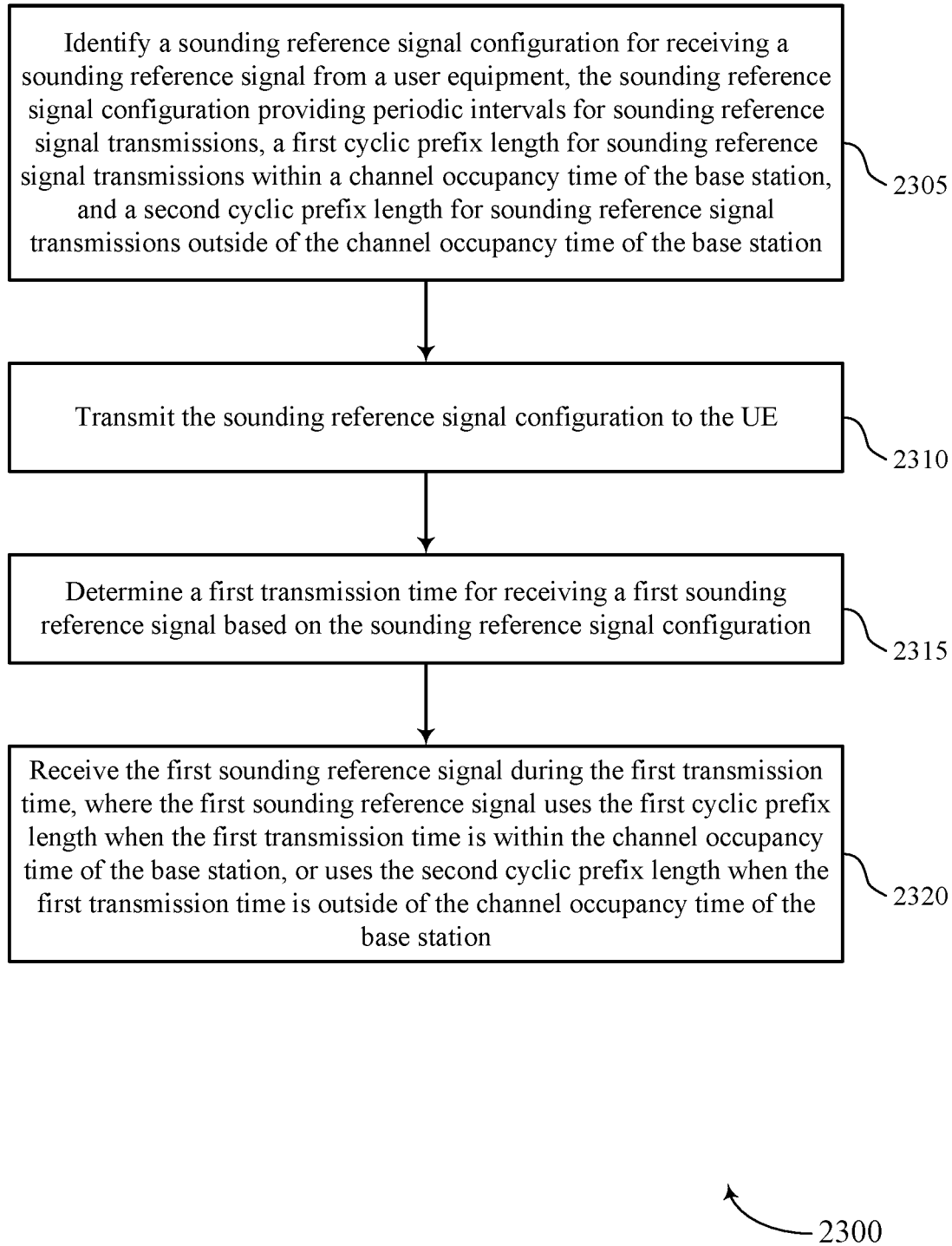

FIG. 23 shows a flowchart illustrating a method 2300 that supports techniques for managing sounding reference signal transmissions in shared radio frequency spectrum in accordance with aspects of the present disclosure. The operations of method 2300 may be implemented by a base station 105 or its components as described herein. For example, the operations of method 2300 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2305, the base station may identify a sounding reference signal configuration for receiving a sounding reference signal from a user equipment, the sounding reference signal configuration providing periodic intervals for sounding reference signal transmissions, a first cyclic prefix length for sounding reference signal transmissions within a channel occupancy time of the base station, and a second cyclic prefix length for sounding reference signal transmissions outside of the channel occupancy time of the base station. The operations of 2305 may be performed according to the methods described herein. In some examples, aspects of the operations of 2305 may be performed by a SRS configuration manager as described with reference to FIGS. 11 through 14.

At 2310, the base station may transmit the sounding reference signal configuration to the UE. The operations of 2310 may be performed according to the methods described herein. In some examples, aspects of the operations of 2310 may be performed by a SRS configuration manager as described with reference to FIGS. 11 through 14.

At 2315, the base station may determine a first transmission time for receiving a first sounding reference signal based on the sounding reference signal configuration. The operations of 2315 may be performed according to the methods described herein. In some examples, aspects of the operations of 2315 may be performed by a SRS offset manager as described with reference to FIGS. 11 through 14.

At 2320, the base station may receive the first sounding reference signal during the first transmission time, where the first sounding reference signal uses the first cyclic prefix length when the first transmission time is within the channel occupancy time of the base station, or uses the second cyclic prefix length when the first transmission time is outside of the channel occupancy time of the base station. The operations of 2320 may be performed according to the methods described herein. In some examples, aspects of the operations of 2320 may be performed by a SRS reception manager as described with reference to FIGS. 11 through 14.

Figure 24:
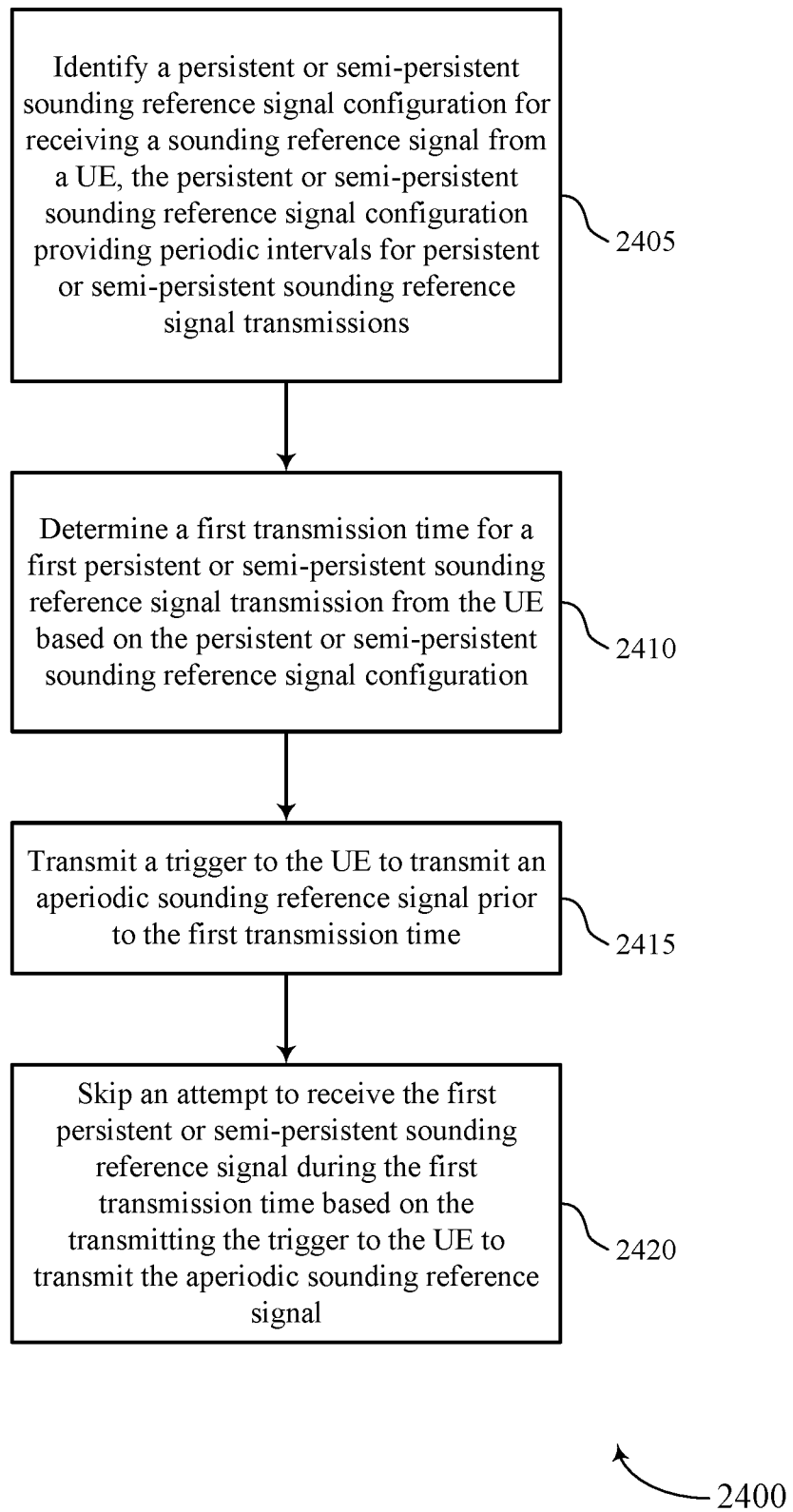

FIG. 24 shows a flowchart illustrating a method 2400 that supports techniques for managing sounding reference signal transmissions in shared radio frequency spectrum in accordance with aspects of the present disclosure. The operations of method 2400 may be implemented by a base station 105 or its components as described herein. For example, the operations of method 2400 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2405, the base station may identify a persistent or semi-persistent sounding reference signal configuration for receiving a sounding reference signal from a UE, the persistent or semi-persistent sounding reference signal configuration providing periodic intervals for persistent or semi-persistent sounding reference signal transmissions. The operations of 2405 may be performed according to the methods described herein. In some examples, aspects of the operations of 2405 may be performed by a SRS configuration manager as described with reference to FIGS. 11 through 14.

At 2410, the base station may determine a first transmission time for a first persistent or semi-persistent sounding reference signal transmission from the UE based on the persistent or semi-persistent sounding reference signal configuration. The operations of 2410 may be performed according to the methods described herein. In some examples, aspects of the operations of 2410 may be performed by a SRS offset manager as described with reference to FIGS. 11 through 14.

At 2415, the base station may transmit a trigger to the UE to transmit an aperiodic sounding reference signal prior to the first transmission time. The operations of 2415 may be performed according to the methods described herein. In some examples, aspects of the operations of 2415 may be performed by an A-SRS manager as described with reference to FIGS. 11 through 14.

At 2420, the base station may skip an attempt to receive the first persistent or semi-persistent sounding reference signal during the first transmission time based on the transmitting the trigger to the UE to transmit the aperiodic sounding reference signal. The operations of 2420 may be performed according to the methods described herein. In some examples, aspects of the operations of 2420 may be performed by an A-SRS manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies.

While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying a sounding reference signal configuration for transmission of one or more sounding reference signals that indicates periodic intervals for transmission of the one or more sounding reference signals, and at least two time offset values associated with each periodic interval, the at least two time offset values including a first offset value from a starting time of each periodic interval that indicates a first transmission time that is available for the one or more sounding reference signal transmissions, and a second offset value from the starting time of each periodic interval or from the first transmission time that indicates a second transmission time within each periodic interval, wherein the second transmission time, within a first periodic interval, is available for transmission of the one or more sounding reference signals if a first listen-before-talk procedure for the first transmission time of the first periodic interval is unsuccessful, and wherein one or more of the first offset value or the second offset value is determined based at least in part on a random selection from a set of available offset values;
    determining, based at least in part on the first listen-before-talk procedure for the first transmission time, that a wireless channel in a shared radio frequency spectrum band is unavailable for transmission of a first sounding reference signal at the first transmission time; and
    performing at least a second listen-before-talk procedure for at least the second transmission time of the first periodic interval to determine whether the wireless channel in the shared radio frequency spectrum band is available for transmission of the first sounding reference signal.

2. The method of claim 1, further comprising:
    transmitting the first sounding reference signal at the second transmission time responsive to a successful second listen-before-talk procedure, or transmitting the first sounding reference signal at a third transmission time indicated by a third offset value responsive to an unsuccessful second listen-before-talk procedure.

3. The method of claim 2, wherein the identifying the sounding reference signal configuration further comprises:
    receiving a list of offsets that provides at least the second offset value and the third offset value, and wherein the second offset value and third offset value indicate time offsets relative to the first offset value.

4. The method of claim 1, wherein the periodic intervals correspond to sounding reference signal slot periods defined by a number of slots in each sounding reference signal slot period, wherein the first offset value corresponds to a first number of slots from a starting slot of each sounding reference signal slot period, and wherein at least the second offset value corresponds to one or more additional slot offsets that identify additional slots within each of the sounding reference signal slot periods available for sounding reference signal transmissions.

5. The method of claim 1, wherein the sounding reference signal configuration is received in radio resource control signaling.

6. The method of claim 1, wherein the random selection for determining the first offset value or the second offset value comprises:
identifying, as part of the sounding reference signal configuration, a seed value for use in randomly selecting the first offset value from the set of available offset values, and wherein the seed value determines which offset value of the set of available offset values will be determined in the random selection.

7. The method of claim 6, wherein the seed value is a same seed value as is provided to one or more other UEs in a group of UEs, and wherein the seed value is determined based at least in part on one or more of a cell identification, a configured identification of the UE, a time index value, or any combinations thereof.

8. The method of claim 7, wherein the sounding reference signal configuration further indicates a frequency resource of a set of available frequency resources that are available for transmitting the one or more sounding reference signals.

9. The method of claim 1, wherein the sounding reference signal configuration further indicates an initial offset value from a starting time of an initial periodic interval for transmitting an initial sounding reference signal from the UE.

10. The method of claim 1, further comprising:
receiving a trigger to transmit an aperiodic sounding reference signal;
transmitting the aperiodic sounding reference signal responsive to the trigger; and
skipping one or more of the periodic intervals for transmission of the one or more sounding reference signals that occur within an aperiodic sounding reference signal widow that starts after transmission of the aperiodic sounding reference signal.

11. A method for wireless communication at a user equipment (UE), comprising:
identifying a sounding reference signal configuration for sounding reference signal transmissions that indicates periodic intervals for the sounding reference signal transmissions, a first cyclic prefix length for the sounding reference signal transmissions that are within a channel occupancy time of an access network entity, and a second cyclic prefix length for the sounding reference signal transmissions that are outside of the channel occupancy time of the access network entity, wherein the first cyclic prefix length provides a longer cyclic prefix time duration than the second cyclic prefix length;
determining a first transmission time for a first sounding reference signal based at least in part on the sounding reference signal configuration;
determining, based at least in part on the sounding reference signal configuration, to use the first cyclic prefix length for the first sounding reference signal based at least in part on the first transmission time being within the channel occupancy time of the access network entity, or to use the second cyclic prefix length for the first sounding reference signal based at least in part on the first transmission time being outside of the channel occupancy time of the access network entity; and
transmitting the first sounding reference signal using the determined first cyclic prefix length or second cyclic prefix length responsive to a successful listen-before-talk procedure associated with the first transmission time.

12. The method of claim 11, wherein a first listen-before-talk procedure is used for transmitting the first sounding reference signal when the first transmission time is within the channel occupancy time of the access network entity, and a second listen-before-talk procedure is used for transmitting the first sounding reference signal when the first transmission time is outside of the channel occupancy time of the access network entity, and wherein the first listen-before-talk procedure is shorter than the second listen-before-talk procedure.

13. The method of claim 12, wherein the first cyclic prefix length is determined based at least in part on a first difference between a duration of one or more symbols allocated to provide a first gap in communications before transmitting the first sounding reference signal and a maximum first listen-before-talk procedure duration, and wherein the second cyclic prefix length is determined based at least in part on a second difference between a duration of a number of symbols allocated to provide a second gap in communications before transmitting the first sounding reference signal and a maximum second listen-before-talk procedure duration.

14. The method of claim 12, wherein the first listen-before-talk procedure is a one-shot listen-before-talk procedure, and the second listen-before-talk procedure is a category 4 listen-before-talk procedure.

15. A method for wireless communication at an access network entity, comprising:
identifying a sounding reference signal configuration for one or more sounding reference signals from a user equipment (UE), wherein the sounding reference signal configuration indicates periodic intervals for the one or more sounding reference signals, and at least two time offset values associated with each periodic interval, the at least two time offset values including a first offset value from a starting time of each periodic interval that indicates a first transmission time that is available for the one or more sounding reference signal transmissions, and a second offset value from the starting time of each periodic interval or from the first transmission time that indicates a second transmission time within each periodic interval, wherein the second transmission time, within a first periodic interval, is available for transmission of the one or more sounding reference signals if a first listen-before-talk procedure for the first transmission time of the first periodic interval is unsuccessful, and wherein one or more of the first offset value or second offset value is determined based at least in part on a random selection from a set of available offset values;
monitoring the first transmission time for a first sounding reference signal from the UE; and
monitoring, responsive to the first sounding reference signal being undetected during the first transmission time of the first periodic interval, at least the second transmission time within the first periodic interval for the first sounding reference signal from the UE.

16. The method of claim 15, further comprising:
discontinuing monitoring for the first sounding reference signal from the UE responsive to detecting the first sounding reference signal during one of the first transmission time or the second transmission time.

17. The method of claim 16, wherein the sounding reference signal configuration further provides a list of offsets that indicates at least the second offset value.

18. The method of claim 15, wherein the periodic intervals correspond to sounding reference signal slot periods defined by a number of slots in each sounding reference signal slot period, wherein the first offset value indicates a number of slots from a starting time of each periodic interval, and wherein at least the second offset value corresponds to one or more additional slot offsets that identify additional slots within the sounding reference signal slot period available for the sounding reference signal transmissions.

19. The method of claim 15, wherein the sounding reference signal configuration is transmitted from the access network entity to the UE in radio resource control signaling.

20. An apparatus for wireless communication at a user equipment (UE), comprising:
a processor,
memory in electronic communication with the processor; and
instructions stored in the memory and executable by the processor to cause the apparatus to:
identify a sounding reference signal configuration for transmission of one or more sounding reference signals that indicates periodic intervals for transmission of the one or more sounding reference signals, and at least two time offset values associated with each periodic interval, the at least two time offset values including a first offset value from a starting time of each periodic interval that indicates a first transmission time that is available for the one or more sounding reference signal transmissions, and a second offset value from the starting time of each periodic interval or from the first transmission time that indicates a second transmission time within each periodic interval, wherein the second transmission time, within a first periodic interval, is available for transmission of the one or more sounding reference signals if a first listen-before-talk procedure for the first transmission time of the first periodic interval is unsuccessful, and wherein one or more of the first offset value or the second offset value is determined based at least in part on a random selection from a set of available offset values;
determine, based at least in part on the first listen-before-talk procedure for the first transmission time, that a wireless channel in a shared radio frequency spectrum band is unavailable for transmission of a first sounding reference signal at the first transmission time; and
perform at least a second listen-before-talk procedure for at least the second transmission time of the first periodic interval to determine whether the wireless channel in the shared radio frequency spectrum band is available for transmission of the first sounding reference signal.

21. The apparatus of claim 20, wherein the instructions are further executable by the processor to cause the apparatus to:
transmit the first sounding reference signal at the second transmission time responsive to a successful second listen-before-talk procedure, or transmit the first sounding reference signal at a third transmission time indicated by a third offset value responsive to an unsuccessful second listen-before-talk procedure.

22. The apparatus of claim 20, wherein the periodic intervals correspond to sounding reference signal slot periods defined by a number of slots in each sounding reference signal slot period, wherein the first offset value corresponds to a first number of slots from a starting slot of each sounding reference signal slot period, and wherein at least the second offset value corresponds to one or more additional slot offsets that identify additional slots within each of the sounding reference signal slot periods available for sounding reference signal transmissions.

23. The apparatus of claim 20, wherein the instructions are further executable by the processor to cause the apparatus to:
identify, as part of the sounding reference signal configuration, a seed value for use in randomly selecting the first offset value from the set of available offset values, and wherein the seed value determines which offset value of the set of available offset values will be determined in the random selection.

24. The apparatus of claim 20, wherein the sounding reference signal configuration further indicates a frequency resource of a set of available frequency resources that are available for transmitting the one or more sounding reference signals.

25. The apparatus of claim 20, wherein the sounding reference signal configuration further indicates an initial offset value from a starting time of an initial periodic interval for transmission of an initial sounding reference signal from the UE.

26. The apparatus of claim 20, wherein the instructions are further executable by the processor to cause the apparatus to:
receive a trigger to transmit an aperiodic sounding reference signal;
transmit the aperiodic sounding reference signal responsive to the trigger; and
skip one or more of the periodic intervals for transmission of the one or more sounding reference signals that occur within an aperiodic sounding reference signal widow that starts after transmission of the aperiodic sounding reference signal.

* * * * *